(12) United States Patent
Tachikawa

(10) Patent No.: US 8,730,666 B2
(45) Date of Patent: May 20, 2014

(54) ELECTRONIC DEVICE

(75) Inventor: Tadanori Tachikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 12/662,227

(22) Filed: Apr. 6, 2010

(65) Prior Publication Data

US 2010/0259891 A1  Oct. 14, 2010

(30) Foreign Application Priority Data

Apr. 14, 2009 (JP) ................................ 2009-098493

(51) Int. Cl.
*G06F 1/16* (2006.01)
*H05K 5/00* (2006.01)
*H05K 7/00* (2006.01)

(52) U.S. Cl.
USPC .................................................... 361/679.55

(58) Field of Classification Search
USPC ........................... 361/679.02, 679.55, 679.56
See application file for complete search history.

(56) References Cited

U.S. PATENT DOCUMENTS

| | | | | |
|---|---|---|---|---|
| 5,115,884 | A * | 5/1992 | Falco ............................. | 181/156 |
| 5,166,868 | A * | 11/1992 | Stanton et al. ................. | 361/814 |
| 5,448,495 | A * | 9/1995 | Liu ............................ | 361/679.58 |
| 5,610,992 | A * | 3/1997 | Hickman ....................... | 381/386 |
| 5,689,574 | A * | 11/1997 | Heirich et al. ................. | 381/354 |
| 5,699,438 | A * | 12/1997 | Smith et al. .................... | 381/386 |
| 6,081,421 | A * | 6/2000 | Markow et al. ........... | 361/679.09 |
| 6,198,626 | B1 * | 3/2001 | Nakajima et al. ........ | 361/679.55 |
| 6,505,705 | B1 * | 1/2003 | Espiritu et al. ................. | 181/150 |
| 6,597,794 | B2 * | 7/2003 | Cole et al. ...................... | 381/333 |
| 6,661,650 | B2 * | 12/2003 | Nakajima et al. ........ | 361/679.09 |
| 7,088,838 | B2 * | 8/2006 | Rye et al. ....................... | 381/336 |
| 7,426,114 | B2 | 9/2008 | Nakatani et al. | |
| 7,624,840 | B2 * | 12/2009 | Konno et al. .................. | 181/199 |
| 7,643,643 | B2 * | 1/2010 | Miyamoto ..................... | 381/306 |
| 7,677,353 | B2 * | 3/2010 | Shinohara et al. ............. | 181/150 |
| 8,005,517 | B2 * | 8/2011 | Kang et al. .................. | 455/575.1 |
| 8,055,003 | B2 * | 11/2011 | Mittleman et al. ............. | 381/345 |
| 2002/0186530 | A1 * | 12/2002 | Nakajima et al. ............. | 361/683 |
| 2004/0240689 | A1 * | 12/2004 | Miyamoto ..................... | 381/306 |
| 2007/0115619 | A1 * | 5/2007 | Wang et al. .................... | 361/679 |
| 2007/0165386 | A1 | 7/2007 | Nakatani et al. | |
| 2009/0050402 | A1 * | 2/2009 | Shinohara et al. ............. | 181/207 |
| 2010/0092022 | A1 * | 4/2010 | Hopkinson et al. ............ | 381/391 |

FOREIGN PATENT DOCUMENTS

| | | |
|---|---|---|
| JP | 11-252222 | 9/1999 |
| JP | 2002-189530 | 7/2002 |
| JP | 2006-262195 | 9/2006 |
| JP | 2007-188311 | 7/2007 |
| JP | 2007-201789 | 8/2007 |

OTHER PUBLICATIONS

Japanese Office Action for Application No. 2009-098493 issued Aug. 14, 2012.

* cited by examiner

*Primary Examiner* — Adrian S Wilson

(74) *Attorney, Agent, or Firm* — Staas & Halsey LLP

(57) ABSTRACT

An electronic device includes a speaker, a board that includes a speaker placement section in which the speaker is disposed and a double-faced adhesive tape that surrounds the speaker placement section of the board and adheres to an edge of a back surface opposite to a sound emitting surface of the speaker so as to cause the board to support the speaker.

7 Claims, 58 Drawing Sheets

ELECTRONIC DEVICE

CROSS-REFERENCE TO RELATED APPLICATION

This application is based upon and claims the benefit of priority of the prior Japanese Patent Application No. 2009-098493, filed on Apr. 14, 2009, the entire contents of which are incorporated herein by reference.

FIELD

The embodiment discussed herein is related to an electronic device having a speaker.

BACKGROUND

For example, a notebook personal computer (hereinafter abbreviated as "notebook PC") has various components such as electronic components including a CPU and storage devices represented by a hard disk drive unit (hereinafter abbreviated as "HDD unit"). In recent years, the notebook PC generally further includes a speaker.

The speaker is a vibrating object that emits sound by vibration. This vibration of the speaker may be transmitted to and thereby adversely affect other components. In particular, the HDD unit has a mechanically moving part and is one of the components to be protected from vibration. As for the speaker, at present, an increase in sound volume is desired while there is a demand for downsizing of the device and thus, how to prevent transmission of the vibration of the speaker to other components is a problem.

Incidentally, there has been proposed a structure that prevents leakage of sound by disposing an elastic member around the circumference of the sound emitting surface of the speaker. However, this proposal describes the structure that effectively transmits the sound from the speaker by preventing leakage of the sound and provides no viewpoint of preventing vibration.

For example, see Japanese Patent Laid-open Publications No. 2007-201789 and No. 2002-189530.

SUMMARY

According to an aspect of the invention, an electronic device includes: a speaker; a board that includes a speaker placement section in which the speaker is disposed; and a double-faced adhesive tape that surrounds the speaker placement section of the board and adheres to an edge of a back surface opposite to a sound emitting surface of the speaker so as to cause the board to support the speaker.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present application will be described as follows.

Appearance

Figure 1:
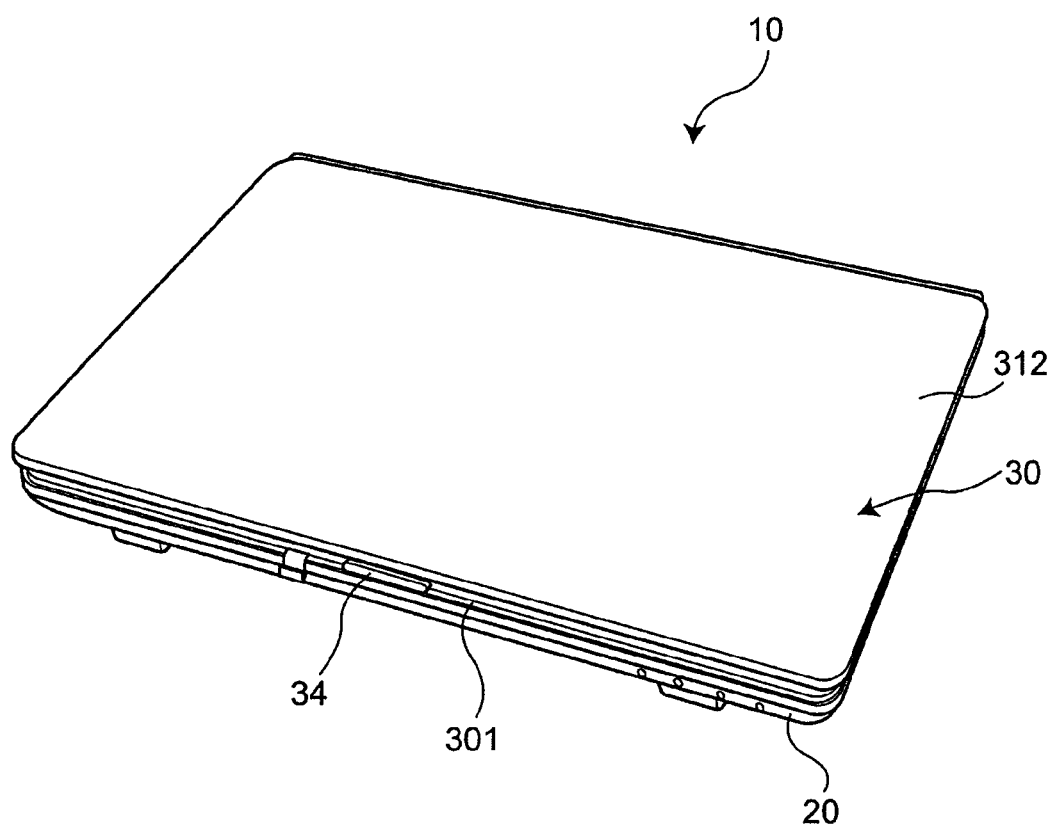
FIG. 1 is a perspective diagram of a notebook PC in a closed state.
Figure 2:
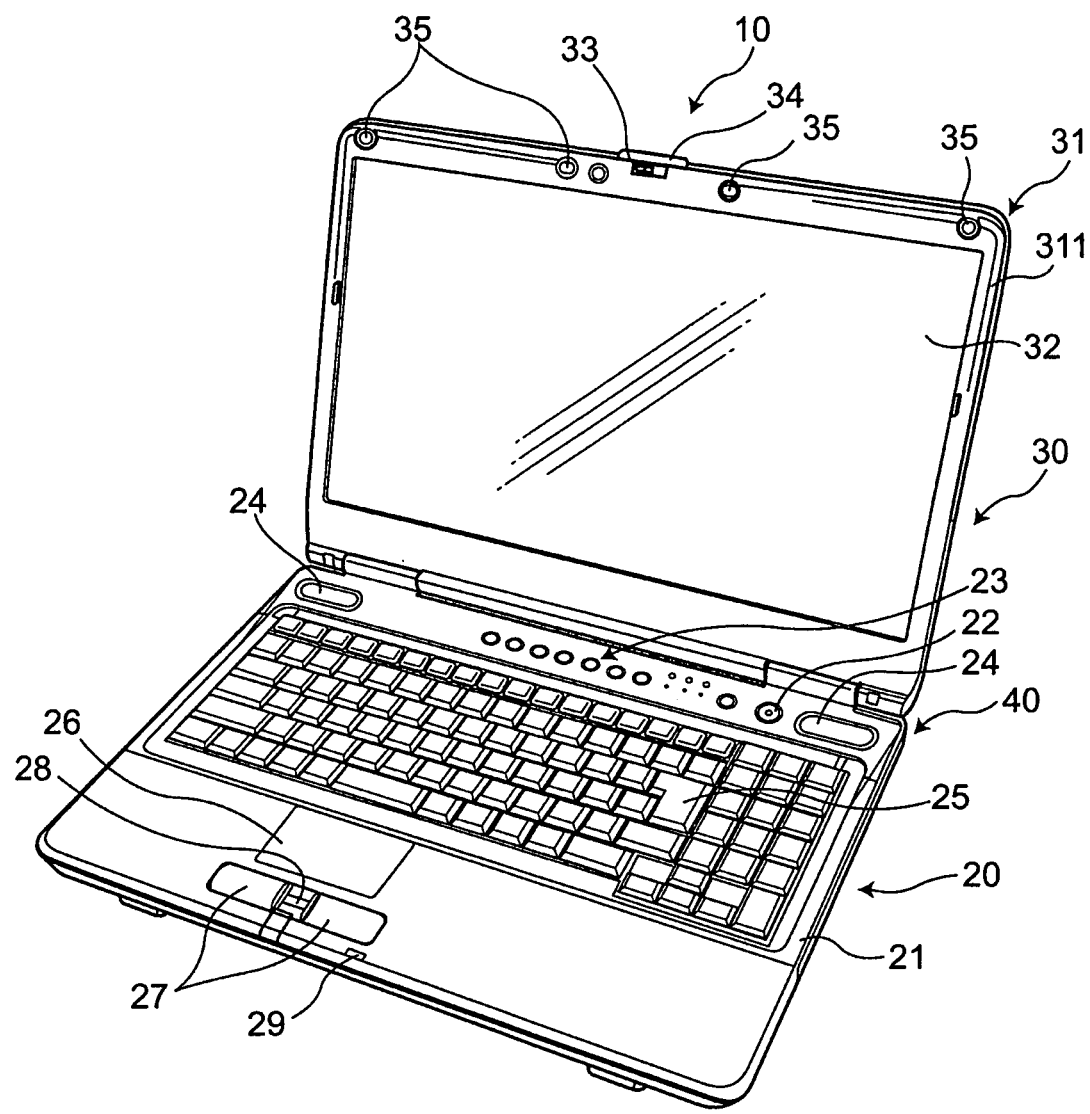
FIG. 2 is a perspective diagram of the notebook PC illustrated in FIG. 1 in an open state.
Figure 3:
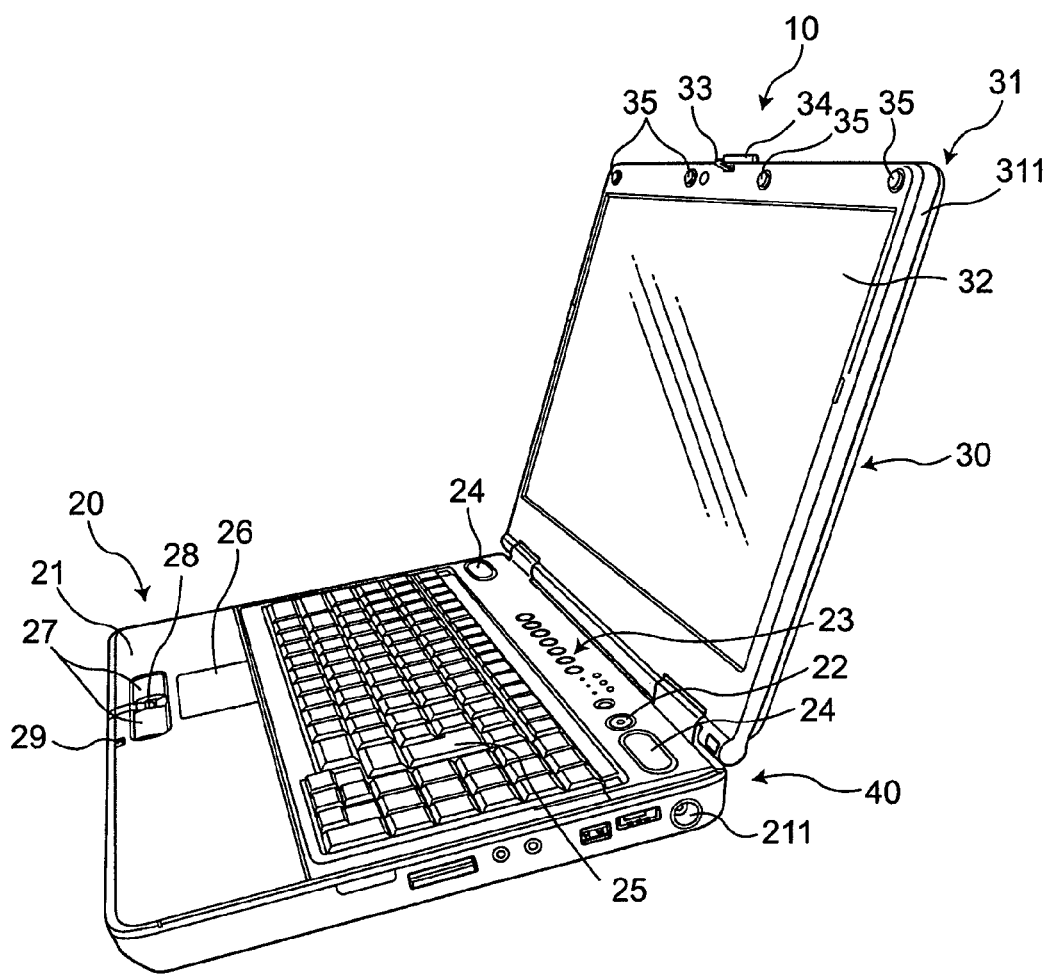
FIG. 3 is a perspective diagram illustrating a right flank of the notebook PC in the open state.
Figure 4:
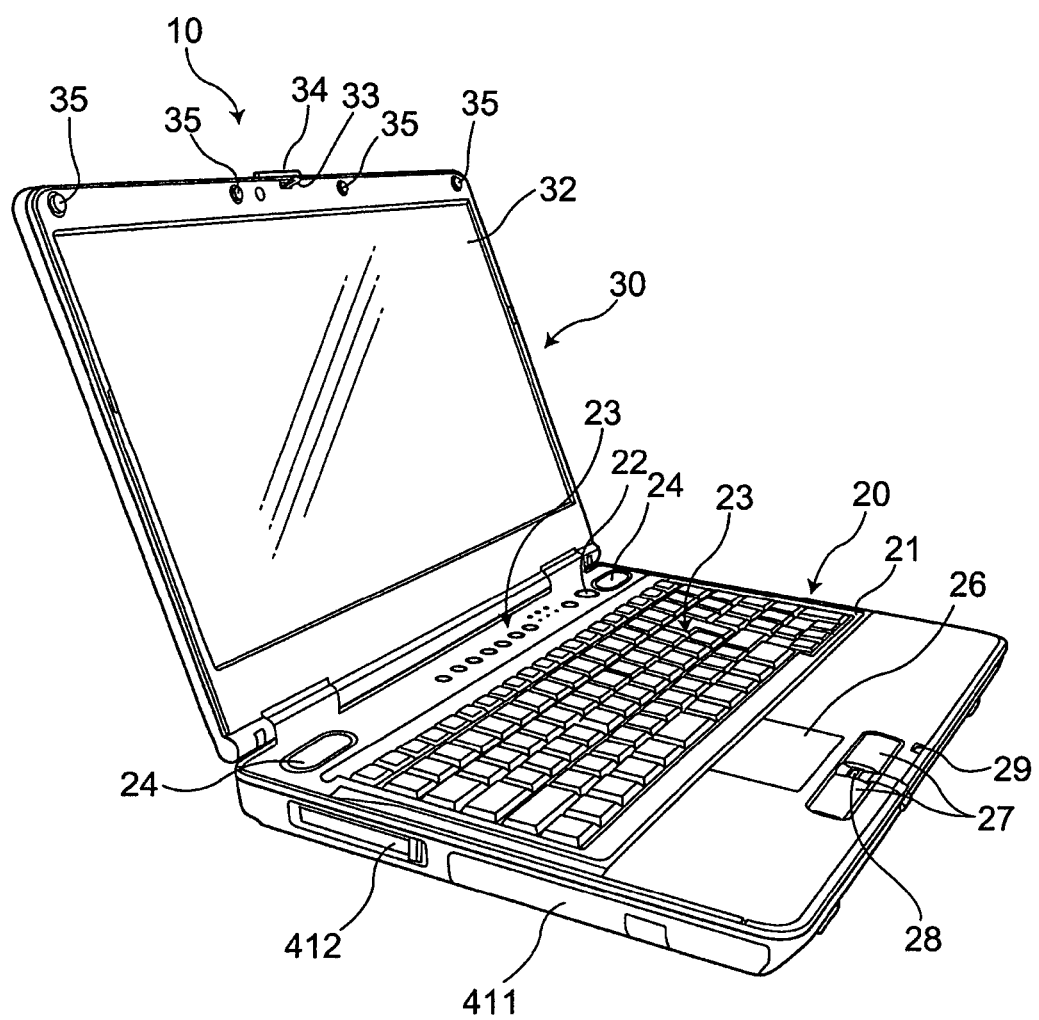
FIG. 4 is a perspective diagram illustrating a left flank of the notebook PC in the open state.
Figure 5:
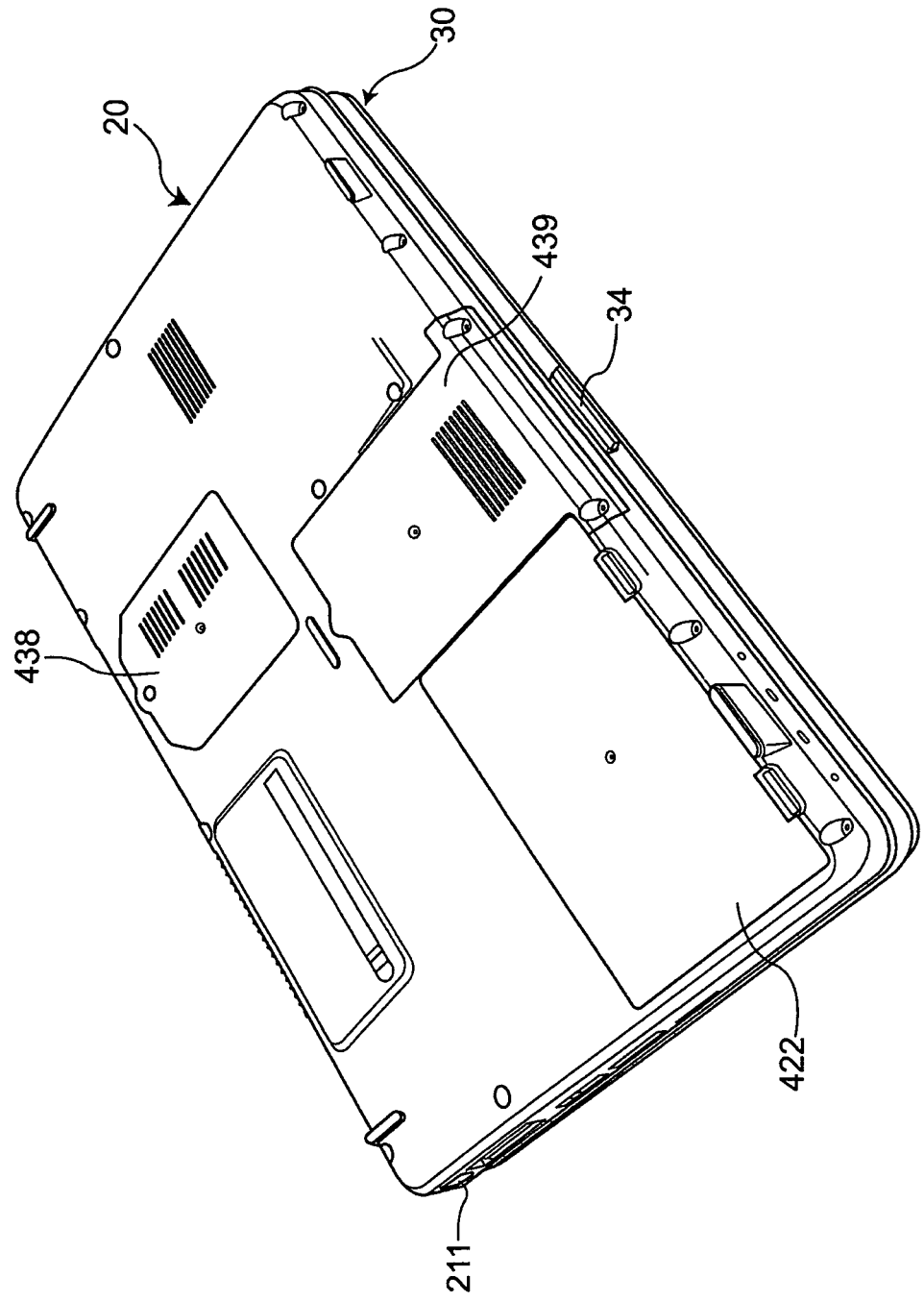
FIG. 5 is a perspective diagram of an undersurface of the notebook PC in the open state.
Figure 6:
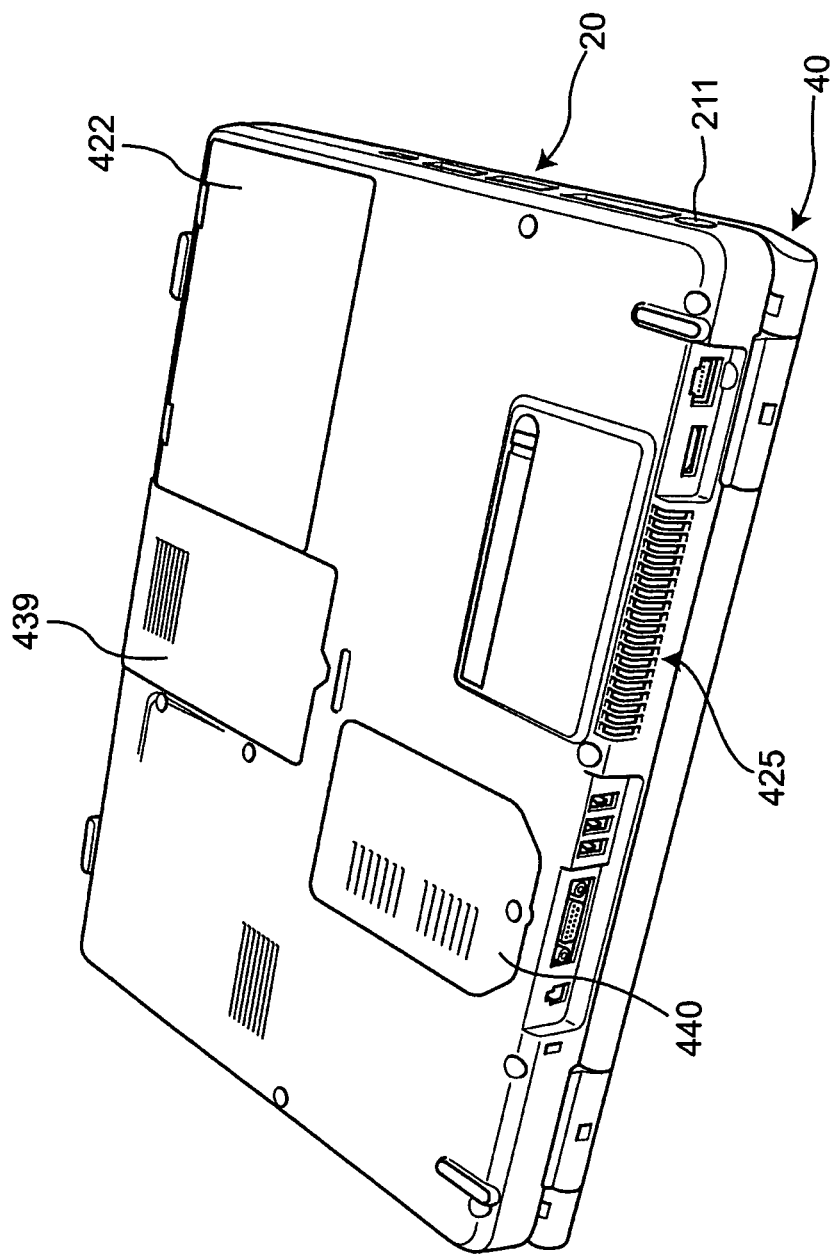
FIG. 6 is a perspective diagram of the undersurface of the notebook PC in the open state viewed from another angle.

FIG. 1 is a perspective diagram of a notebook personal computer (notebook PC) 10 in a closed state, which is one embodiment of the electronic device. FIG. 2 is a perspective diagram of the notebook PC 10 illustrated in FIG. 1 in an open state. Further, FIG. 3 and FIG. 4 are perspective diagrams illustrating the right flank and the left flank of the notebook PC 10 in the open state, respectively. Furthermore, FIG. 5 and FIG. 6 are perspective diagrams of the undersurface of the notebook PC 10 in the open state viewed from different angles.

Here, with reference to FIG. 1 through FIG. 6, the appearance of the notebook PC 10 serving as one embodiment will be described.

The notebook PC 10 has an operational unit 20 and a display unit 30. The display unit 30 has a rotation axis 40 on a rearward side of the operational unit 20, and is rotated on the rotation axis 40 between the closed state in which the display unit 30 is laid on the operational unit 20 as illustrated in FIG. 1 and the open state in which the display unit 30 is opened with respect to the operational unit 20 as illustrated in FIG. 2. In order to shift the display unit 30 from the closed state to the open state, a front-end face 301 side of the display unit 30 in the closed state is lifted and the display unit 30 is rotated about the rotation axis 40. The front-end face 301 of the display unit 30 in this closed state is a top face of the display unit 30 in the open state in which the display unit 30 is opened at the right angle (in the following, this state is sometimes merely referred to as the open state without providing a specific explanation). Here, the rotation axis 40 has a structure to allow rotation of the display unit 30 accompanied by friction, and the display unit 30 maintains, in a state in which the display unit 30 is opened with respect to the operational unit 20 at an arbitrary angle, this angle of opening. As illustrated in FIG. 1, the operational unit 20 and the display unit 30 each have an external form of an approximately rectangular solid.

The operational unit 20 contains a CPU chip and the like and is mounted with many components such as a circuit board with a processing function and a hard disk drive unit (HDD unit) that stores information. The CPU chip is a heat-producing component whose operation is accompanied by heat and therefore, there is mounted a radiating module having a fan and the like to cool the CPU chip with air.

Provided backward of the top face of the operational unit 20 are a power button 22 and various function buttons 23. Further, in an enclosure 21 of the operational unit 20, a pair of sound outlets 24 on the left and right are formed. Speakers are respectively disposed inside these pair of sound outlets 24 on the left and right, and sound from these speakers is emitted from the sound outlets 24 to the outside.

Further, arranged in the center of the top face of the operational unit 20 is a keyboard 25 for inputting various kinds of information and instructions into this notebook PC 10.

Furthermore, provided forward of the keyboard 25 are a track pad 26, left and right operation buttons 27 for the track pad 26, and a fingerprint sensor 28 between the left and right operation buttons 27.

The track pad 26 is used for moving a cursor on a display screen 32 that will be described later, according to operation of moving a finger on the track pad 26. Further, the left and right operation buttons 27 are equivalent to left and right buttons of a mouse (not illustrated), respectively, and have a role of designating an icon or the like overlapping the cursor moved to an arbitrary position on the display screen 32 and causing the display screen 32 to display a menu screen. Furthermore, the fingerprint sensor 28 is intended for security use such as activating the notebook PC only when a fingerprint that matches with a registered fingerprint is detected.

Moreover, on a frontward side of the top face of the operational unit 20, a locking hole 29 is provided in the enclosure 21 of the operational unit 20. Into the locking hole 29, a hook 33 provided on an upper part of the front face of the display unit 30 (described later) in the open state is inserted and locked when the notebook PC 10 is shifted from the open state (see FIG. 2) to the closed state (see FIG. 1). By this locking, the display unit 30 maintains the closed state in which the display unit 30 is laid on the operational unit 20 so as to prevent unintentional opening. There is a locking release button 34 protruding from the front-end face 301 (top face in the open state) in the closed state of the display unit 30. When this locking release button 34 is pushed toward the front-end face (top face) 301, the hook 33 moves to an unlocked position (described later) in a manner of interlocking with this push of the locking release button 34, and releasing the locking in the locking hole 29. Here, the display unit 30 is opened to be in the state illustrated in FIG. 2 through lifting of the front-end face (top face) 301 side while the push of the locking release button 34 is maintained.

Further, on the right flank of the operational unit 20 illustrated in FIG. 3, there is formed a power-supply port 211 into which a connector of an AC adaptor (not illustrated) that converts AC power into DC power and supplies the DC power to the notebook PC 10 is to be inserted. Inside the power-supply port 211, there is disposed a power-supply connector to be mated with the connector of the AC adaptor. When the connector of the AC adaptor is inserted into the power-supply port 211 and mated with the power-supply connector, the notebook PC 10 is supplied with power and operates with this power. Furthermore, the notebook PC 10 has a built-in battery that is charged by receiving the power supplied by the AC adaptor. This battery is removably attached to the operational unit 20, which will be described later. The notebook PC 10 may keep running with only the power of the battery. Incidentally, the AC adaptor generally includes: an AC-DC conversion section; a first cable section to be connected between the AC-DC conversion section and a commercial power-supply outlet and having a tip provided with a plug to be inserted into this outlet; and a second cable section to be connected between the AC-DC conversion section and the notebook PC 10 and having a tip provided with a connector to be inserted into the power-supply connector of the power-supply port 211.

Besides the power-supply port 211, a port for a USB connector, jacks for audio microphone/earphone and the like also are formed on the right flank of the operational unit 20.

On the left flank of the operational unit 20 illustrated in FIG. 4, an external face 411 of a CD/DVD drive unit and a card slot 412 are provided.

Further, on the underside of the operational unit 20 illustrated in FIG. 5 and FIG. 6, there are provided: a cover section 422 of the battery; a lid 439 that covers an opening in which the HDD unit is housed; and a lid 438 that covers an opening in which there is disposed a connector into which a memory board is inserted. Furthermore, air discharge openings 425 (see FIG. 6) are so formed as to extend from the underside to the back face of the enclosure 21 of the operational unit 20 and discharge air from an internal fan. On the back face of the operational unit 20, some connectors and the like are arranged.

Spreading on the front face of the display unit 30 in the open state is the display screen 32 serving as a display panel for displaying images according to instructions of the operational unit 20. The edge of the display screen 32 is covered with a front cover 311 forming a part of an enclosure 31 of the display unit 30.

The enclosure 31 of the display unit 30 includes the front cover 311 and a rear cover 312 (see FIG. 1) that covers the back of the display screen. The display screen 32 serving as a display panel is interposed between the front cover 311 and the rear cover 312 and housed in the enclosure 31. The front cover 311 forms a front housing. In addition, the rear cover 312 forms a rear housing of the enclosure 31 of the display unit 30.

The hook 33 protrudes from the upper part of the front face of the display unit 30 in the open state. As described above, the hook 33 goes into the locking hole 29 provided in the enclosure 21 of the operational unit 20 to be locked therein in the closed state. Further, the locking release button 34 protrudes from the top face (front-end face in the closed state) 301 of the display unit 30 in the open state (see FIG. 1). When the locking release button 34 is pushed toward the top face (front-end face in the closed state) 301 in the open state, the hook 33 moves to a position where locking in the locking hole 29 is released. Therefore, the display unit 30 is opened as illustrated in FIG. 2 by rotating the display unit 30 to lift the front-end face 301 of the display unit 30 while maintaining the press of the lift locking release button 34 when the display unit 30 is in the closed state illustrated in FIG. 1.

In addition, plural pads 35 are arranged on the upper part of the front face of the display unit 30 in the open state. The pads 35 abut on the top face of the operational unit 20 when the display unit 30 is laid on the operational unit 20.

HDD Cover Attachment Structure

Figure 7:
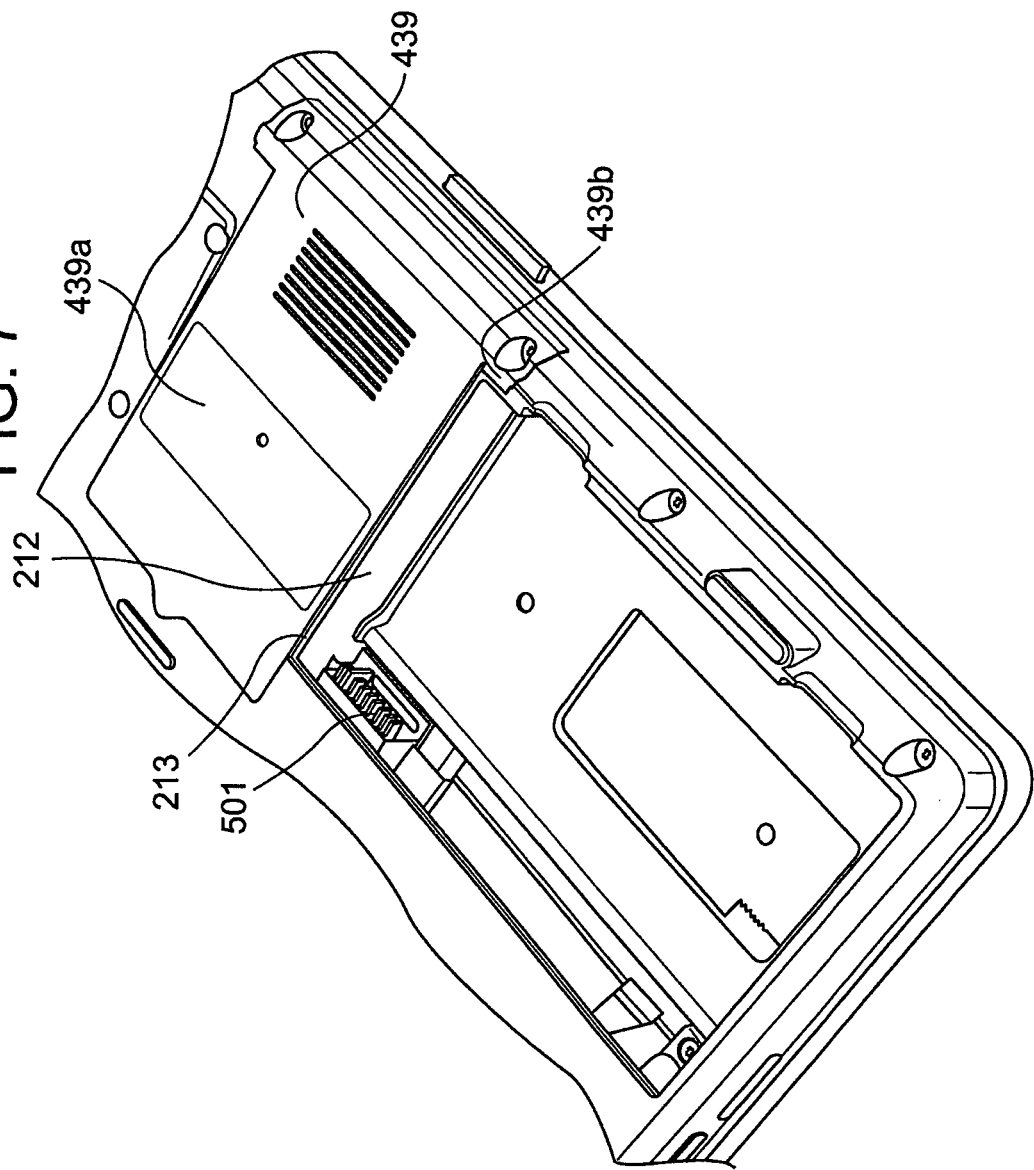
FIG. 7 is a diagram that illustrates a battery housing opening formed on an undersurface of the operational unit from which a battery is removed.

FIG. 7 is a diagram that illustrates a battery housing opening 212 formed on an undersurface of the operational unit 20 (see FIG. 5 and FIG. 6) from which a battery 420 is removed.

Figure 8:
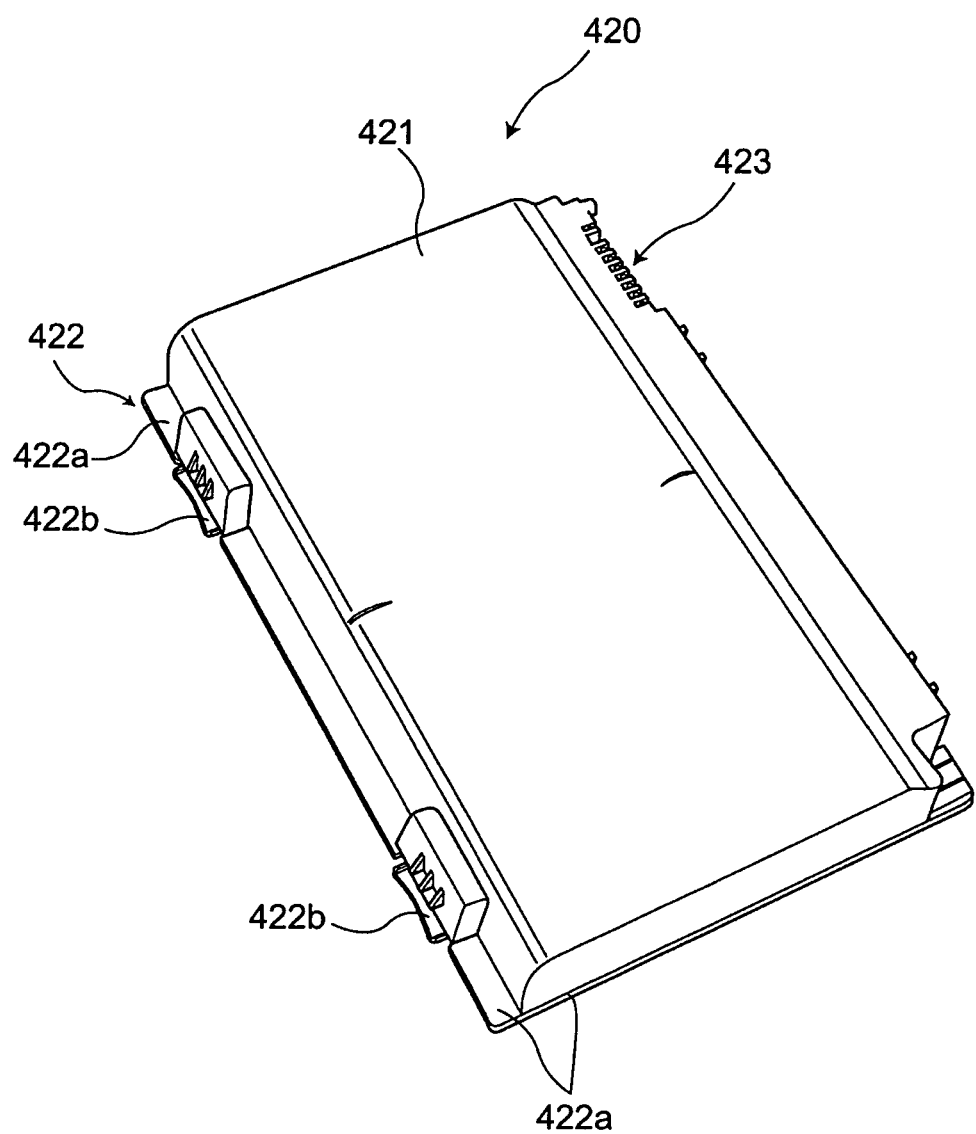
FIG. 8 is a diagram that illustrates the removed battery upside down.

Further, FIG. 8 is a diagram that illustrates the removed battery 420 upside down.

FIG. 7 depicts the battery housing opening 212 formed on the undersurface of the enclosure 21 of the operational unit 20. The battery 420 includes a main section 421 and a cover section 422. A battery cell is housed in this main section 421. The battery 420 is a unit that is removably inserted into the battery housing opening 212. The main section 421 is housed in the battery housing opening 212. A connector 501 is exposed within the battery housing opening 412 and couples to a connector 423 disposed in the main section 421 of the battery 420 illustrated in FIG. 8. The battery 420 is charged via these connectors 501 and 423, and power accumulated in the battery 420 is supplied via these connectors 501 and 423 to each section of the notebook PC 10.

The cover section 422 spreads above the main section 421 and forms a part of the outer face of the enclosure 21. The cover section 422 has a brim section 422a that protrudes from the main section 421 and extends along the circumference of the main section 421. Meanwhile, the enclosure 21 has a support edge 213 that extends along the battery housing opening 212 on a stage lower than the undersurface of the enclosure 21. When the main section 421 of the battery 420 is housed in the battery housing opening 212, the brim section 422a of the battery 420 is supported by the support edge 213 formed around the battery housing opening 212 and locked in the battery housing opening 212 by a locking section 422b.

On the undersurface of the enclosure 21 of the operational unit 20, there is formed an HDD unit housing opening 414 (see FIG. 10) which is adjacent to the battery housing opening 212a and in which an HDD unit 430 is housed.

The HDD unit 430 housed in the HDD unit housing opening 414 (see FIG. 10) is covered with a lid 439 (see FIG. 7). The lid 439 includes a covering section 439a that covers the HDD unit 430 housed in the HDD unit housing opening 414 and an extending section 439b that extends toward the battery housing opening 414.

Figure 9:
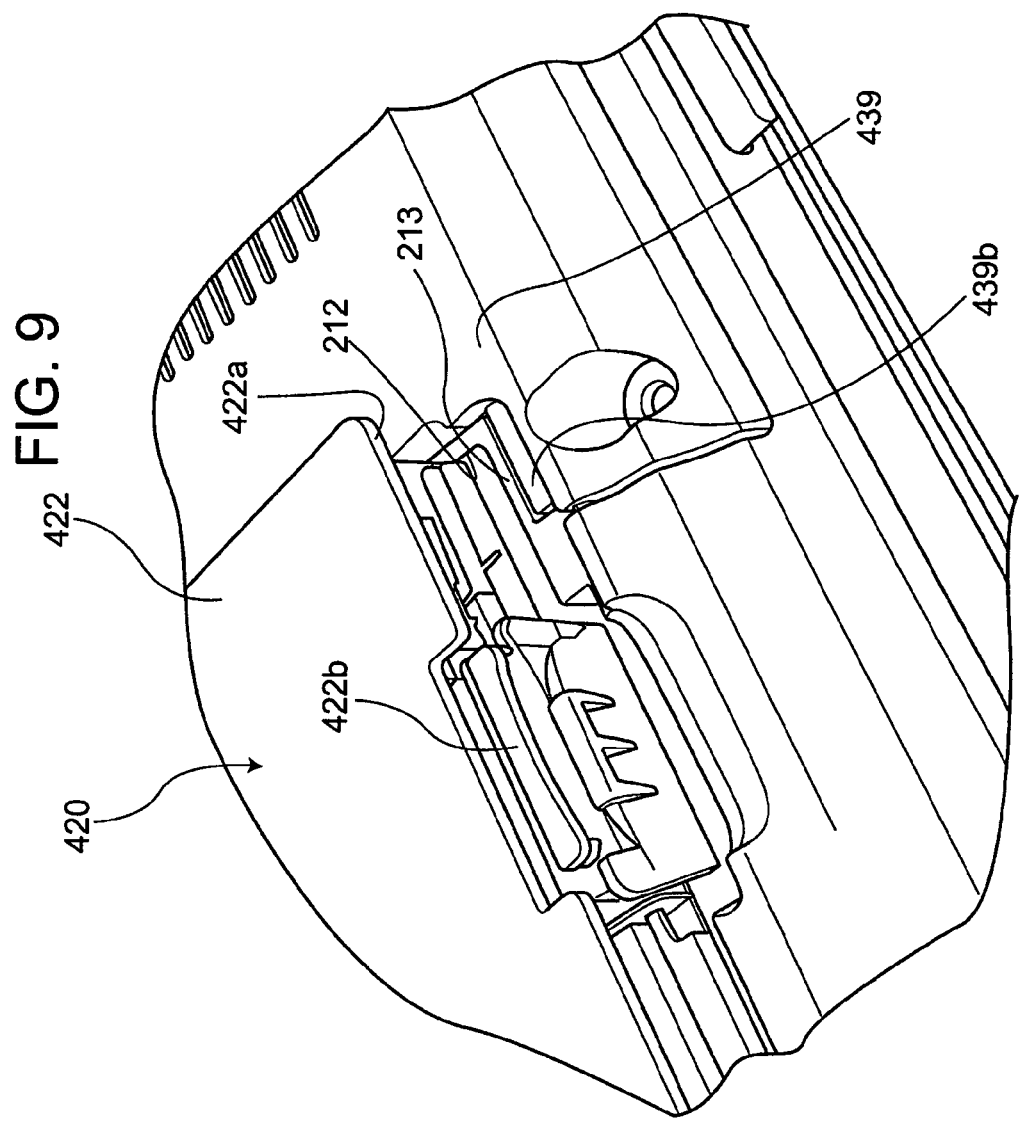
FIG. 9 is an enlarged perspective diagram that illustrates a part around an extending section of a lid that covers an HDD unit.

FIG. 9 is an enlarged perspective diagram that illustrates a part around the extending section 439b of the lid 439 that covers the HDD unit 430. FIG. 9 illustrates a state in which the battery 420 is slightly lifted from the battery housing opening 212.

The extending section 439b of the lid 439 is adjacent to and flush with the support edge 213 formed around the battery housing opening 212. The battery 420 is housed in the battery housing opening 212 so that the brim section 422a which is a peripheral part of the cover section 422 of the battery 420 covers both the support edge 213 and the extending section 439b.

Therefore, the lid 439 is not removed as long as the battery 420 is housed in the battery housing opening 412. Accordingly, the HDD unit 430 housed in the HDD unit housing 414 (see FIG. 10) on the inner side of the lid 439 also is not removed from the HDD unit housing 414. For this reason, the battery 420 is always removed prior to removal of the HDD unit 430. Thanks to this structure, damage to the HDD unit 430 and damage to information stored in the HDD unit 430 due to removal of the HDD unit 430 being energized are prevented.

Figure 10:
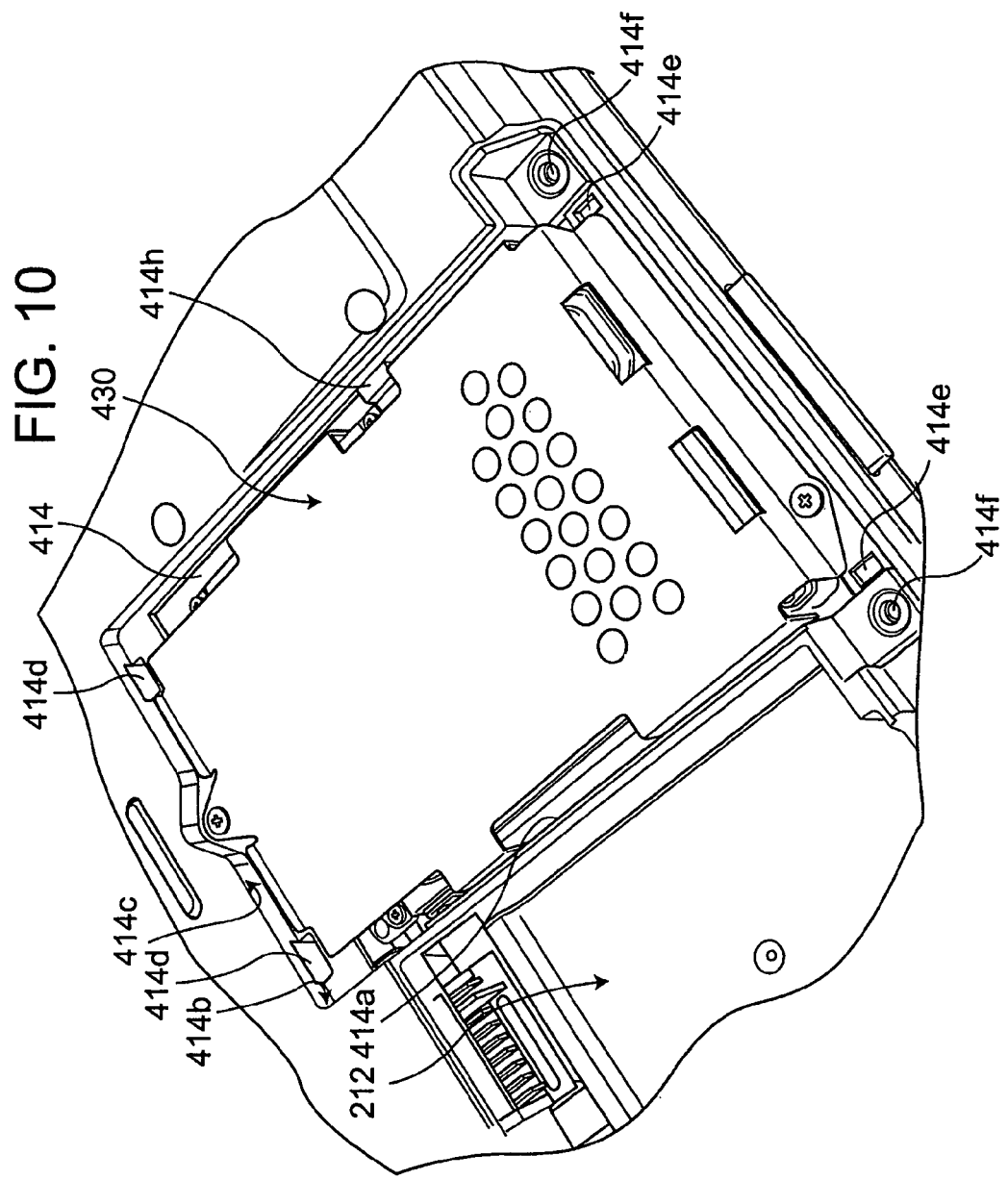
FIG. 10 is a diagram that illustrates the HDD unit in a state of being housed in an HDD unit housing opening.
Figure 11:
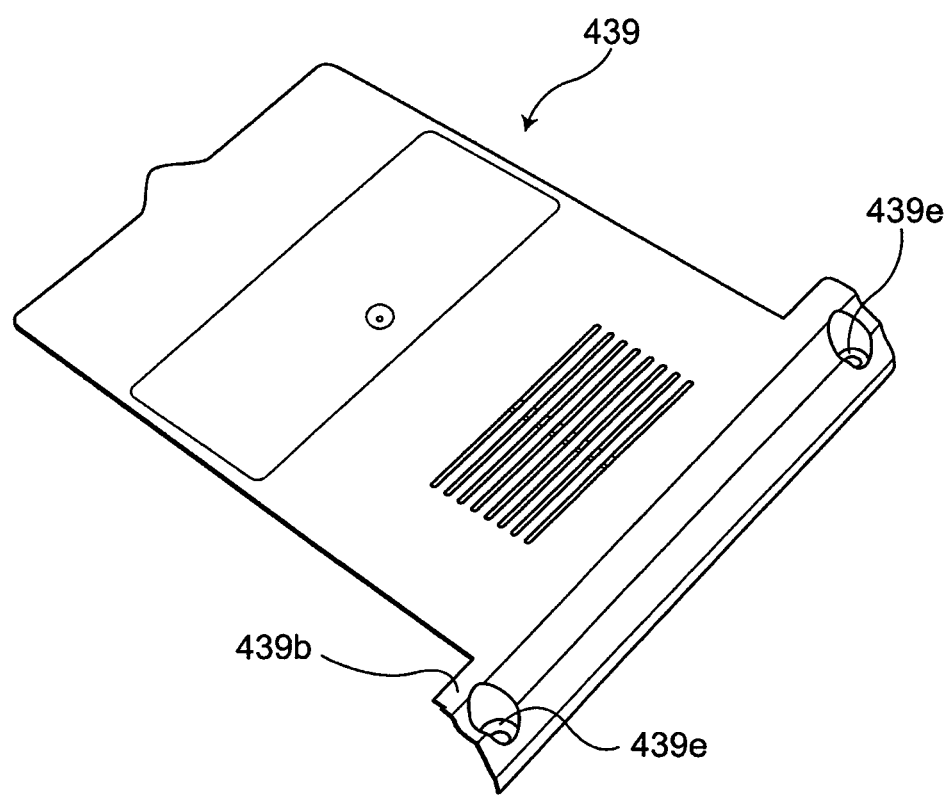
FIG. 11 is a perspective diagram that illustrates the lid removed from the HDD unit housing opening.
Figure 12:
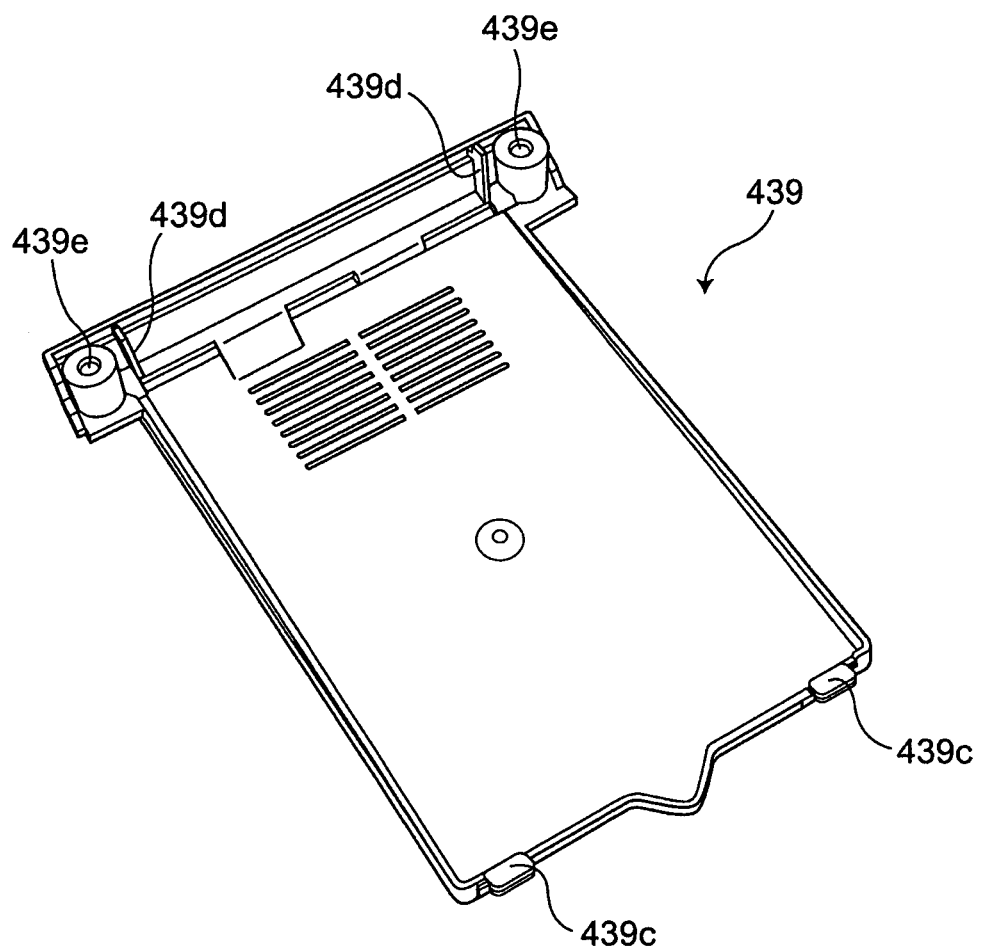
FIG. 12 is a perspective diagram that illustrates an inner side of the lid.

FIG. 10 is a diagram that illustrates the HDD unit 430 in the state of being housed in the HDD unit housing opening 414. FIG. 11 is a perspective diagram that illustrates the lid 439 removed from the HDD unit housing opening 414. FIG. 12 is a perspective diagram that illustrates the inner side of the lid 439.

When the lid 439 (see FIG. 5 and FIG. 6) covering the HDD unit housing opening 414 is removed, the HDD unit 430 housed in the HDD unit housing opening 414 appears as illustrated in FIG. 10.

The HDD unit housing opening 414 is formed at a position on the undersurface of the enclosure 21 of the operational unit 20. This position is adjacent to the battery housing opening 212 in which the battery 420 (see FIG. 8) is housed. The HDD unit housing opening 414 includes a side wall 414a adjacent to the battery housing opening 212 and a front wall 414c that shares a corner 414b with the side wall 414a. On the front wall 414c of the HDD unit housing opening 414, two holes 414d in which two tabs 439c (see FIG. 12) formed on the lid 439 are to fit are formed. Further, opposite the tabs 439c in the lid 439, projections 439d are formed to fit in two hollows 414e formed in the HDD unit housing opening 414. Furthermore, in the HDD unit housing opening 414, two screw holes 414f are respectively formed at positions next to the two hollows 414e. In the lid 439, two holes 439e are formed at positions corresponding to the two screw holes 414f. The lid 439 is positioned by the tabs 439c fitting in the holes 414d and the projections 439d fitting in the hollows 414e. The lid 439 is then fixed to cover the HDD unit housing opening 414 by turning screws so that the screws are inserted through the holes 439e into the screw holes 414f. Therefore, the lid 439 in a fixed state is detached in such a manner that the screws fixing the lid 439 are removed and then the side, from which the screws are removed, of the lid 439 is lifted while being turned. Here, the above-described extending section 439b of the lid 439 is formed at a position of the HDD unit housing opening 414, the position corresponding to an end apart from the corner 414b shared by the side wall 414a and the front wall 414c on the battery housing opening 212 side of the HDD unit housing opening 414. In other words, the extending section 439b is formed on the side to be lifted when the lid 439 is removed. Therefore, since the brim section 422a of the battery 420 covers the extending section 439b, removable of the lid 439 before removal of the battery 420 is reliably prevented.

Incidentally, as described above, the HDD unit is employed in the present embodiment. However, the present technique is effective for other types of electronic component such as a memory board and a data communication module.

HDD Unit Attachment Structure

Figure 13:
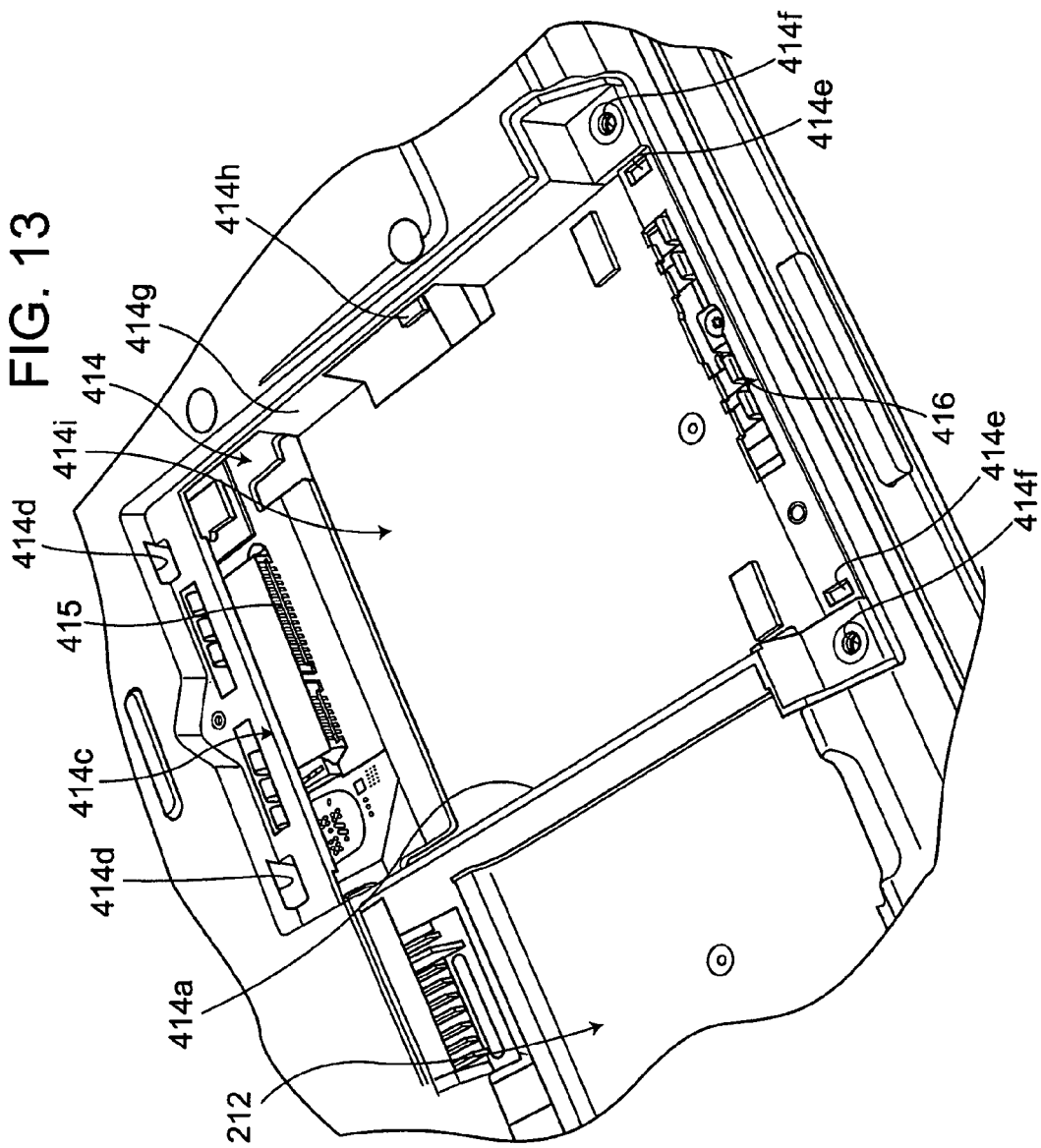
FIG. 13 is a perspective diagram that illustrates the HDD unit housing opening from which the HDD unit is removed.
Figure 14:
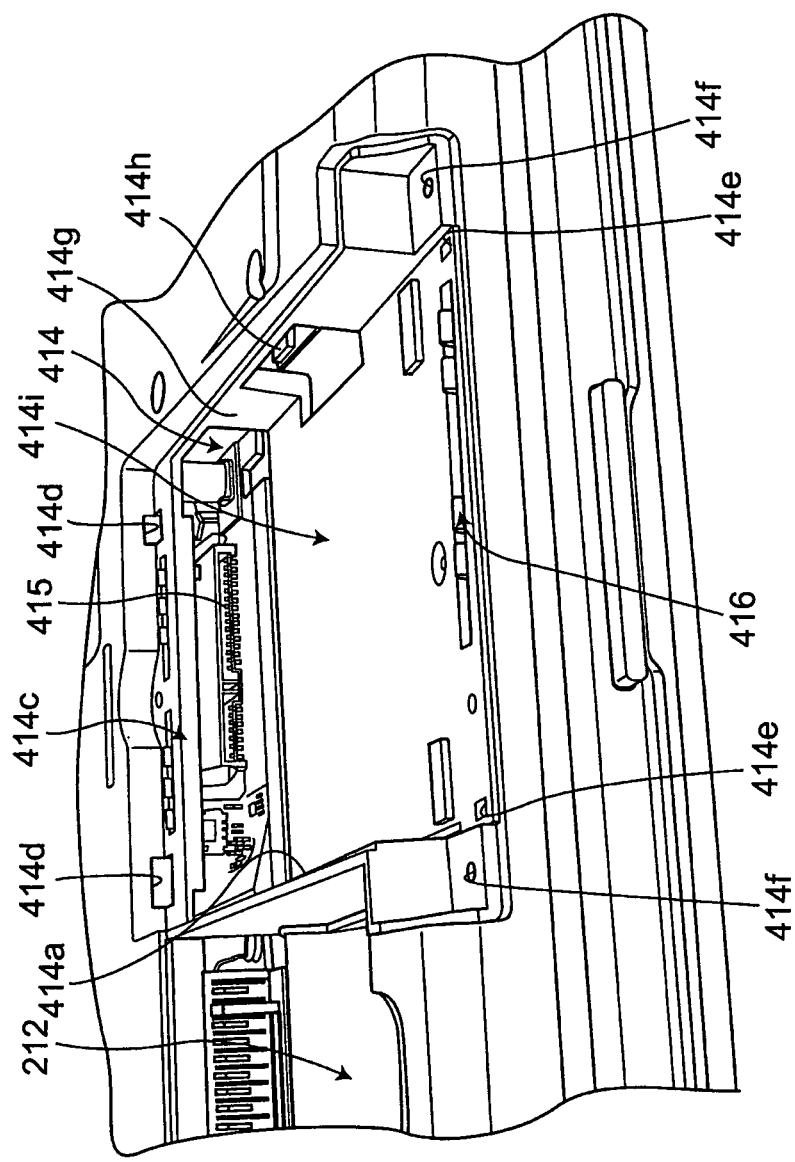
FIG. 14 is a perspective diagram that illustrates the HDD unit housing opening from which the HDD unit is removed, when viewed from another viewpoint.

FIG. 13 and FIG. 14 are perspective diagrams which respectively illustrate the HDD unit housing opening 414 from which the HDD unit is removed, when viewed from different viewpoints.

The HDD unit housing opening 414 further includes a side wall 414g opposite the side wall 414a on the battery housing opening 212 side and a bottom 414i, in addition to the side wall 414a and the front wall 414c described earlier. Further, a connector 415 is disposed on the front wall 414c. Furthermore, on the side wall 414g apart from the battery housing opening 212, there is a projection 414h that protrudes inside the HDD unit housing opening 414. In addition, on an end of the bottom 414i, which end is on the side apart from the front wall 414c, a ground member 416 protrudes from the bottom 414i.

Figure 15:
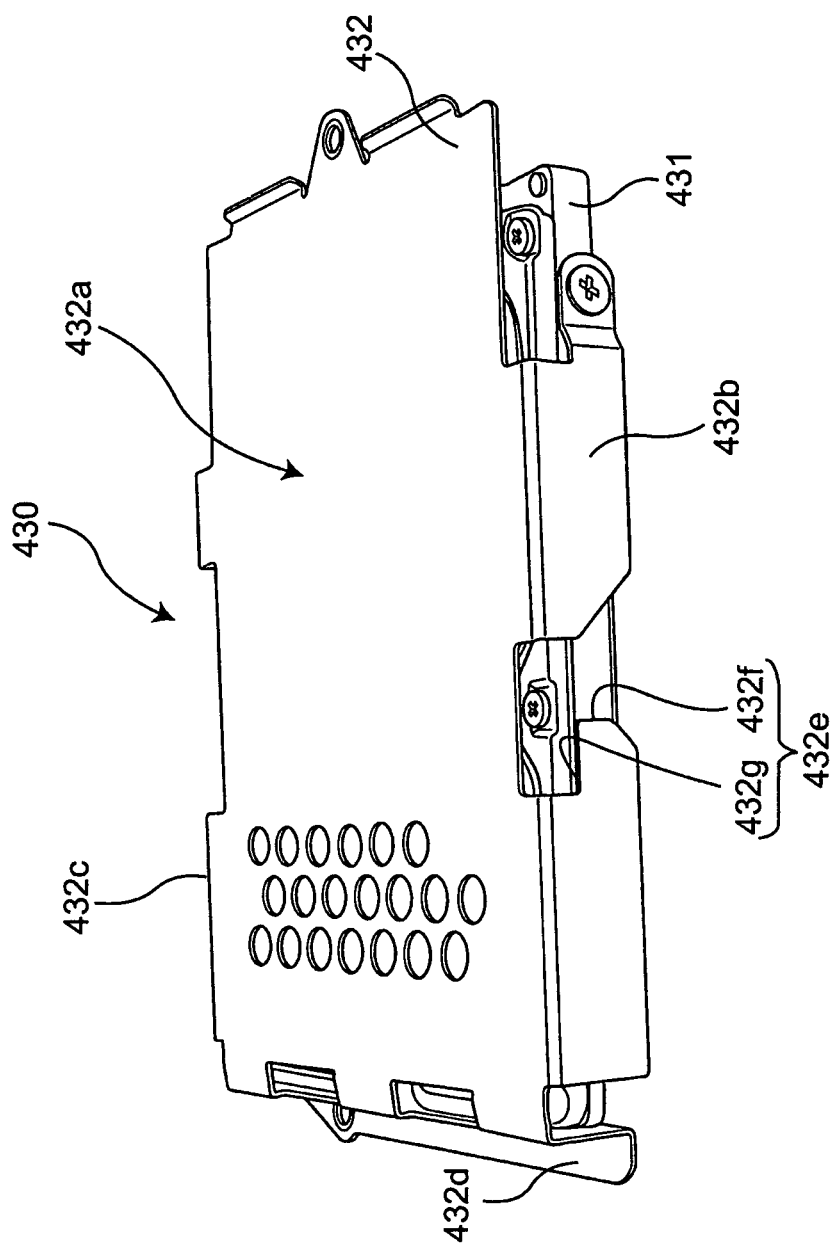
FIG. 15 is a perspective diagram of the HDD unit.
Figure 16:
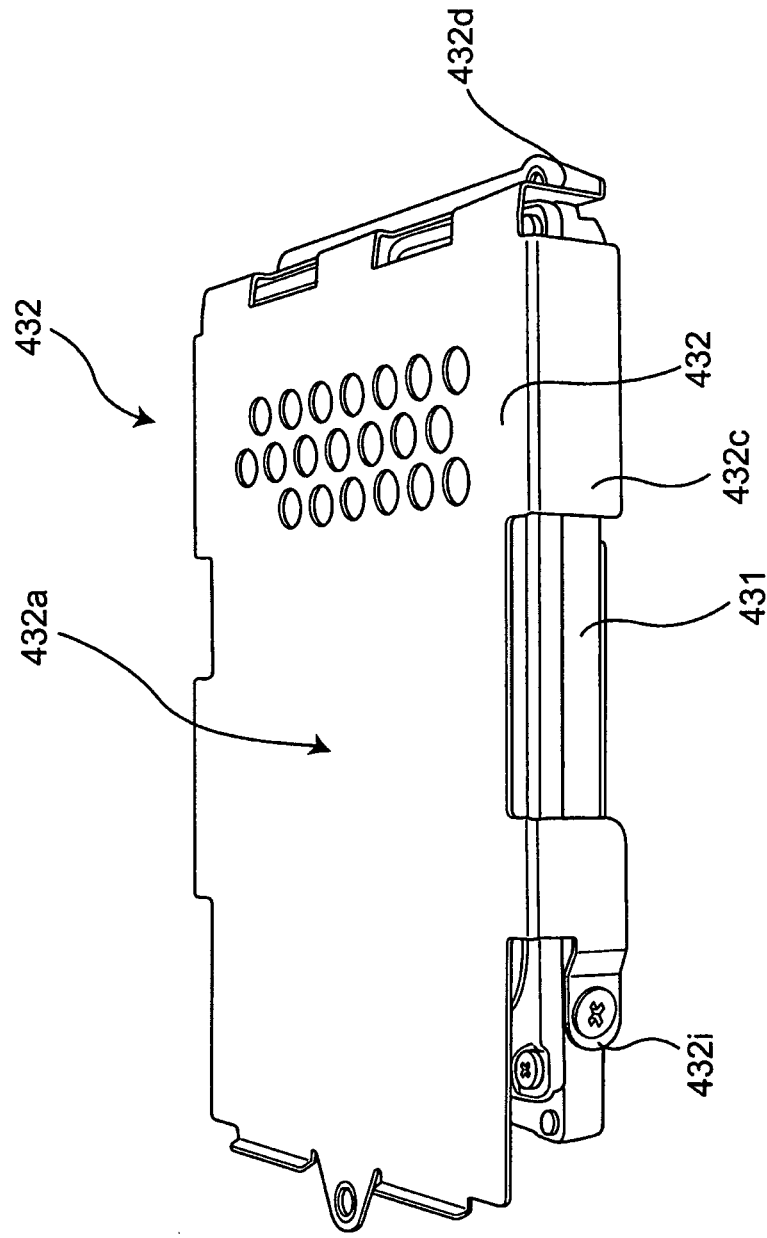
FIG. 16 is a perspective diagram of the HDD unit when viewed from another viewpoint.
Figure 17:
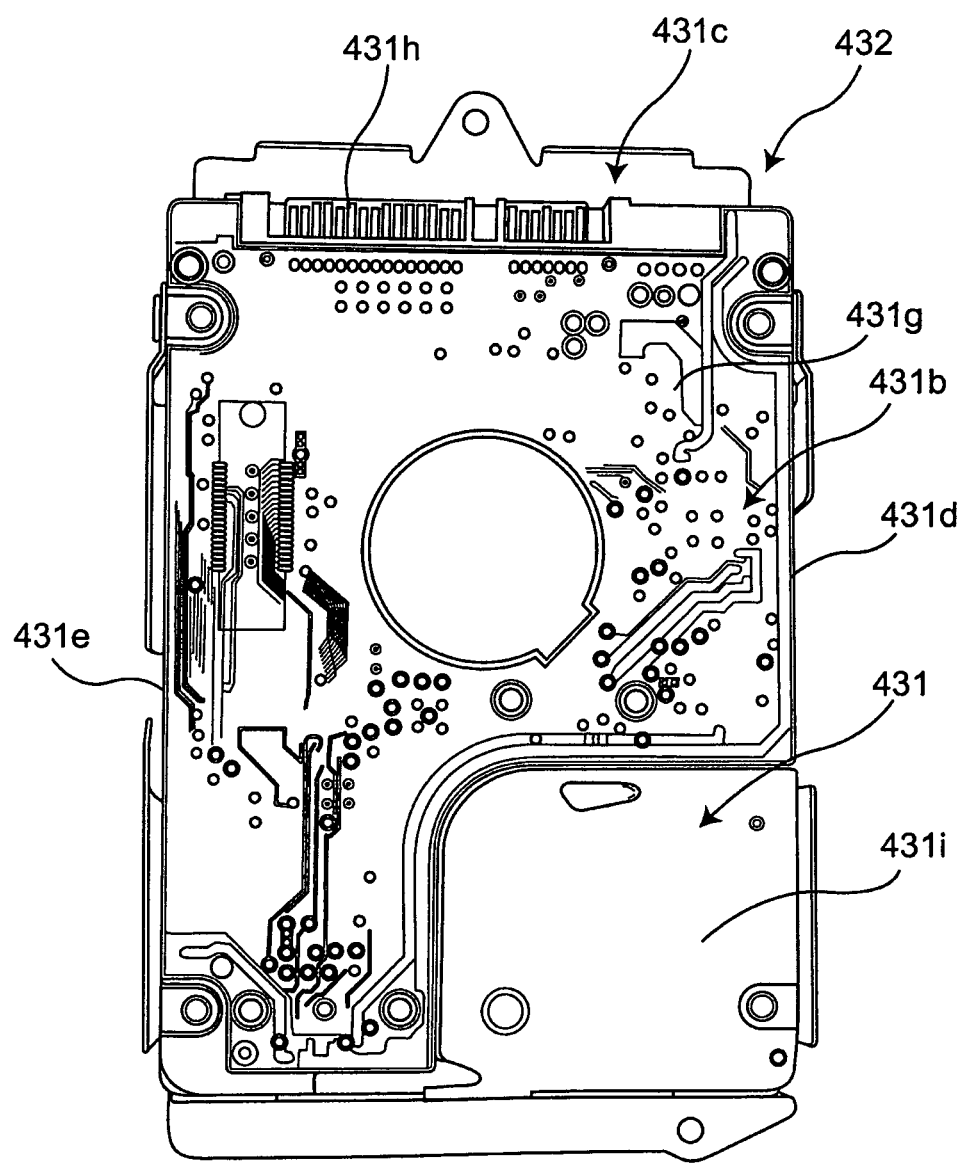
FIG. 17 is a diagram that illustrates an undersurface of the HDD unit.
Figure 18:
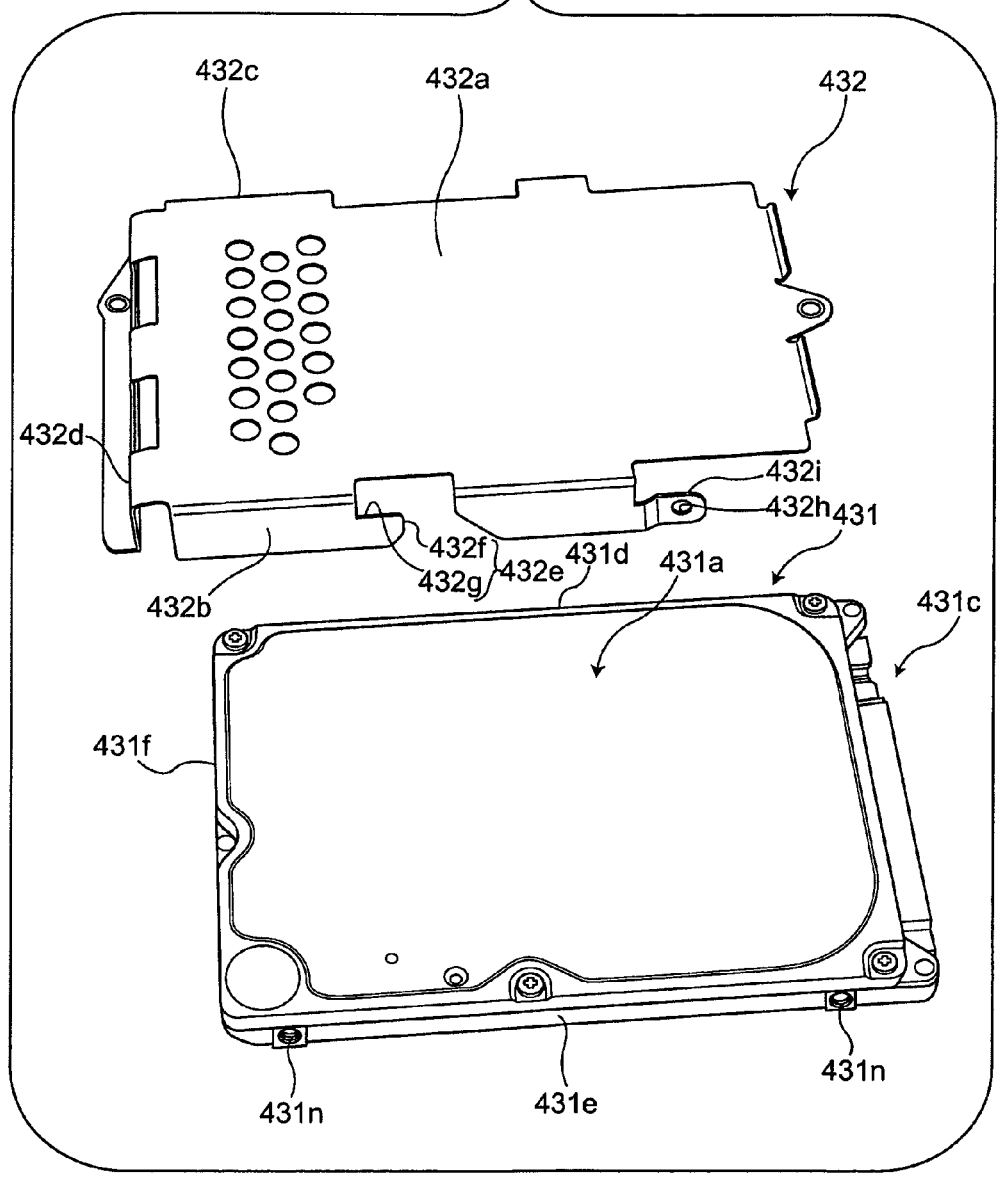
FIG. 18 is a perspective diagram that illustrates an HDD main section and a cover member of the HDD unit separately.
Figure 19:
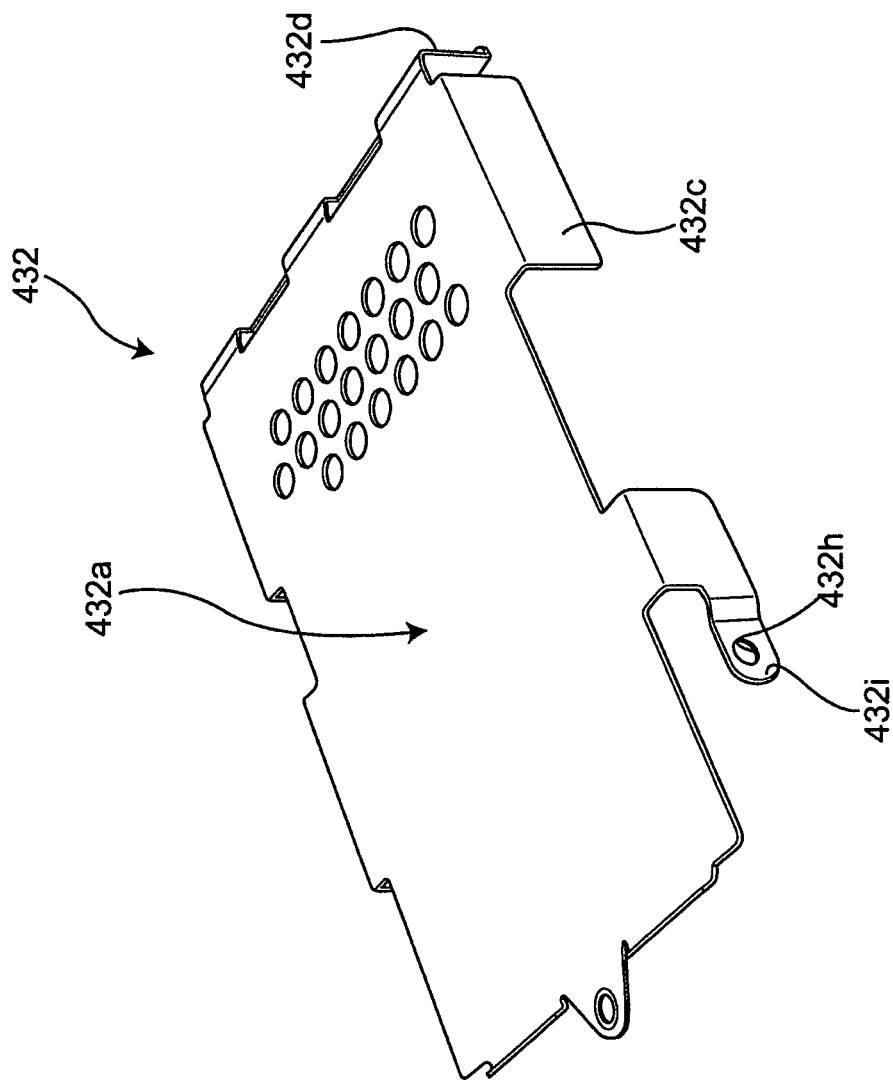
FIG. 19 is a perspective diagram of the cover member of the HDD unit.
Figure 20:
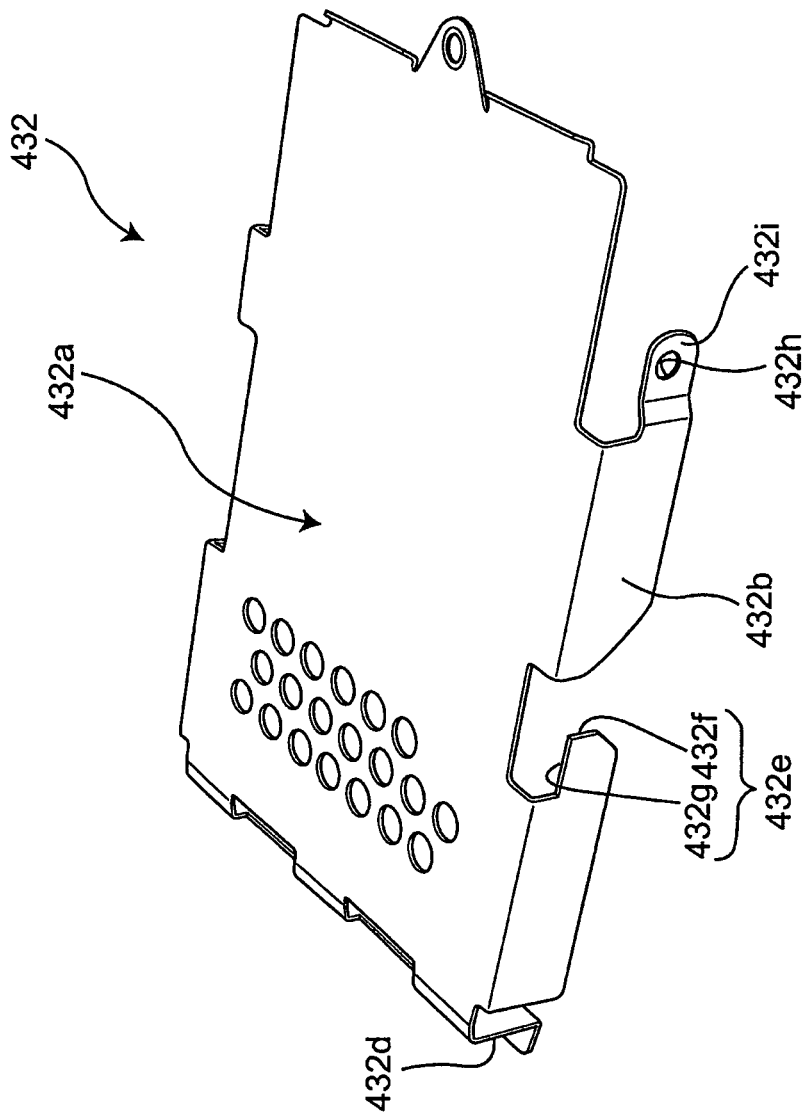
FIG. 20 is a perspective diagram of the cover member of the HDD unit when viewed from another viewpoint.
Figure 21:
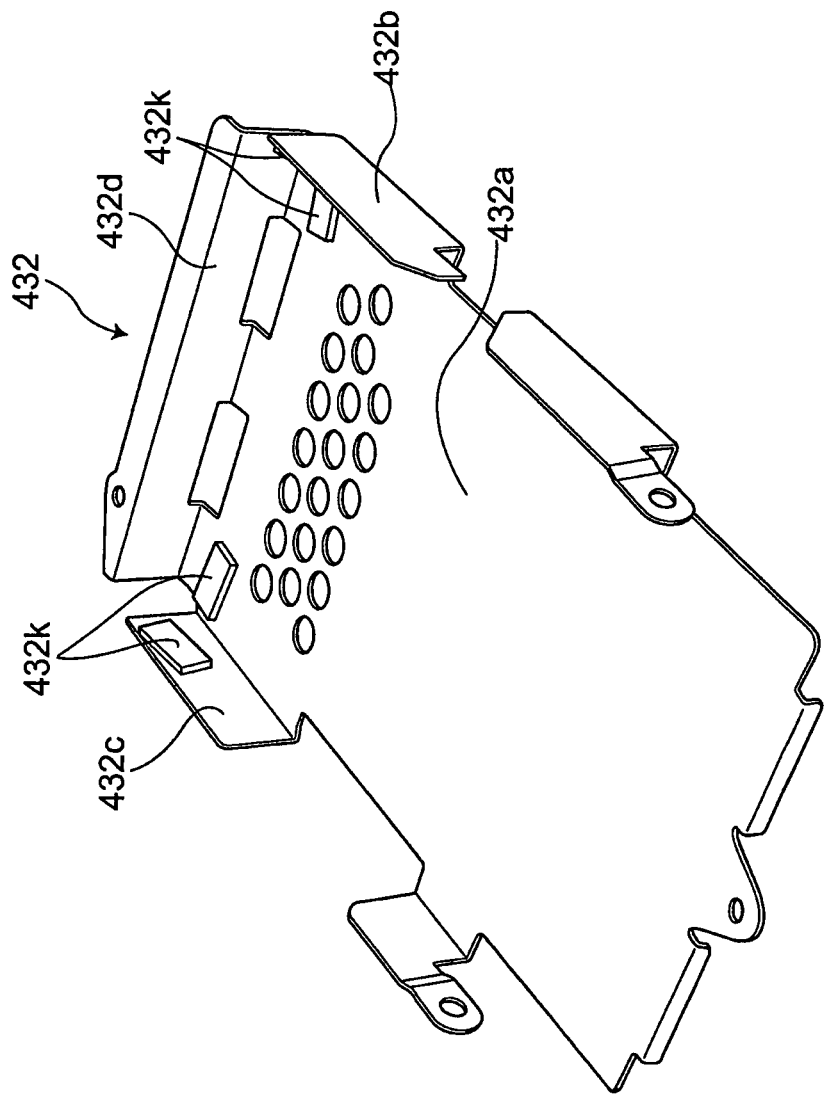
FIG. 21 is a perspective diagram of the cover member of the HDD unit when viewed from yet another viewpoint.

FIG. 15 and FIG. 16 are perspective diagrams that illustrate the HDD unit 430 when viewed from different viewpoints. FIG. 17 is a diagram that illustrates the undersurface of the HDD unit 430. FIG. 18 is a perspective diagram that illustrates an HDD main section 431 and a cover member 432 of the HDD unit 430 separately. FIG. 19, FIG. 20 and FIG. 21 are perspective diagrams of the cover member 432 of the HDD unit 430 when viewed from different viewpoints respectively.

The HDD unit 430 includes the HDD main section 431 and the cover member 432.

The HDD main section 431 has: a first face 431a to be covered by the cover member 432 as illustrated in FIG. 18; and a second face 431b (see FIG. 17) that spreads in parallel with the first face 431a and is to be in contact with the bottom 414i (See FIG. 13 and FIG. 14) of the HDD unit housing opening 414. The HDD main section 431 further has a front-end face 431c, left and right side faces 431d and 431e, and a rear-end face 431f, which surround the first face 431a and the second face 431b.

As illustrated in FIG. 17, a circuit board 431g in a bare state spreads on the second face 431b, and a connector 431h is disposed at the front end of the circuit board 431g. The connector 431h is to be mated with the connector 415 when being placed at the front wall 414c (See FIG. 13 and FIG. 14) of the HDD unit housing opening 414. Of the circuit board 431g spreading on the second face 431b of the HDD main section 431, a part in a width direction extends the full length of the HDD main section 431, while a resin-made base 431i of the HDD main section 431 spreads in a partial area on a rear-end side of the undersurface of the HDD main section 431.

The cover member 432 of the HDD unit 430 is formed by metal plate processing. The cover member 432 has: a covering section 432a that covers the first face 431a (see FIG. 18)

of the HDD main section 431; and left and right bent sections 432b and 432c that are bent along the left and right side faces 431d and 431e of the HDD main section 431. The cover member 432 further has a ground section 432d that is bent along the rear-end face 431f of the HDD main section 431. The ground section 432d is a part that touches the ground member 416 (See FIG. 13 and FIG. 14) that protrudes from the bottom 414i of the HDD unit housing opening 414. Incidentally, the ground member 416 is at a position right outside the rear-end face 431f of the HDD main section 431 of the HDD unit 430 in a state in which the HDD unit 430 is housed in the HDD unit housing opening 414. For this reason, the ground section 432d of the cover member 432 of the HDD unit 430 rides on the ground member 416, resulting in a state of continuity between the ground section 432d and the ground member 416.

In a side face 432b of the cover member 432, a notch 432e shaped like a hook is formed. The notch 432e receives the projection 414h that protrudes inward of the HDD unit housing opening 414 from the right side wall 414g of the HDD unit housing opening 414. The notch 432e includes a first notch portion 432f and a second notch portion 432g. The first notch portion 432f is in such a shape that a receiving entrance is made wide to easily receive the projection 414h. The first notch portion 432f receives the projection 414h when the second face 431b of the HDD main section 431 is made to face the bottom 414i of the HDD unit housing opening 414 and the HDD unit 430 is made to approach the bottom 414i. The HDD unit 430 is moved until the second face 431b of the HDD main section 431 contacts the bottom 414i of the HDD unit housing opening 414, and then moved in a direction in which the front-end face 431c of the HDD main section 431 approaches the front wall 414c of the HDD unit housing opening 414. The second notch portion 432g joins the first notch portion 432f and receives the projection 414h in the movement of the latter half. When the HDD unit 430 is moved in the direction that brings the front-end face 431c of the HDD main section 431 close to the front wall 414c, the connector 431h (see FIG. 17) is mated with the connector 415 of the front wall 414c of the HDD unit housing opening 414. As a result, the HDD unit 430 is supplied with necessary power, and transmission and reception of signals is carried out between the HDD unit 430 and a main unit of the notebook PC 10.

In this way, the HDD unit 431 is moved to the bottom 414i while the second face 431b is directed to the bottom 414i of the HDD unit housing opening 414 and the front-end face 431c of the HDD main section 431 is directed to the front wall 414c of the HDD unit housing opening 414. Here, this is referred as a "first movement." After this first movement, the HDD unit 430 is moved in the direction in which the front-end face 431c approaches the front wall 414c. Here, this is referred as a "second movement." The HDD unit 430 is housed in the HDD unit housing opening 414 through two phases; the first movement and the second movement. The projection 414h and the first notch portion 432f are formed at the positions where the ground member 416 contacts the base 431i of the second face 431b of the HDD main section 431 by the first movement. Therefore, the ground member 416 rubs against only the base 431i of the HDD main section 431 even in the second movement following the first movement. In other words, in the movement for housing the HDD unit 430 in the HDD unit housing opening 414 and in the reverse movement for taking the HDD unit 430 out, the ground member 416 does not touch the circuit board 431g exposed while being disposed. Therefore, contacting with and rubbing against the ground member 416 are avoided and damage to the circuit board 431g is prevented. In other words, by forming the projection 414h and the notch 432c, a member called the ground member 416 is safely disposed at the bottom 414i of the HDD unit housing opening 414. In this way, flexibility in layout of components or members is improved by the projection 414h and the notch 432e.

Here, the projection 414h is formed only on the side wall 414g on the right of the both side faces 414a and 414g on the left and right of the HDD unit housing opening 414, and is not formed on the side wall 414a on the left adjacent to the battery housing opening 212. The HDD unit 430 is comparatively vulnerable to vibration and thus it is desirable to make the HDD unit 430 less susceptible to ambient vibration as much as possible. Forming the projection 414h only on the side wall 414g that is one of the side faces 414a and 414g of the HDD unit housing opening 414 is one of ideas to suppress receipt of vibration. By making only the side wall 414g contact the HDD unit 430 in this way, the amount of vibration transmitted to the HDD unit 430 is suppressed. Regulation of the movement of the HDD unit 430 is sufficiently achieved by the projection 414h and the notch 432e provided only on one side.

As illustrated in FIG. 18, screw holes 431n are formed in each of the side faces 431d and 431e on the left and right of the HDD main section 431. The screw holes 431n are formed at a position closer to the front-end face 431c and at a position closer to the rear-end face 431f. In contrast, as for the cover member 432, only a singe hole 432h for screw fixing is formed in each of the left and right bent sections 432b and 432c. Besides, the hole 432h is formed in an arm 432i provided in each of the left and right bent sections 432b and 432c. The arm 432i is so extended as to have a shape like a cantilever. The cover member 432 is fixed to the HDD main section 431 by being screwed at a single position on the left and a single position on the right, through the use of the holes 432h respectively formed on the left and right and the screw holes 431n on the left and right closer to the front-end face 431c of the HDD main section 431. This also is one of ideas for making transmission of vibration to the HDD main section 431 difficult.

As illustrated in FIG. 21, cushion members 432k are adhered to an inner face on the ground section 432d side of the covering section 432a of the cover member 432 and to an inner face on the ground section 432d side on the left and right bent sections 432b and 432c. These cushion members 432k support a part of the first face 431a of the HDD main section 431 closer to the rear-end face 431f and a part of the left and right bent sections 432b and 432c closer to the rear-end face 431f. Providing these cushion members 432k also is one of ideas for reducing transmission of vibration to the HDD main section 431.

Speaker Attachment Structure

As illustrated in FIG. 2 and FIG. 3 described earlier, the pair of sound outlets 24 are formed on the left and right on the backward side of the top face of the operational unit 20. Speakers (described later) are respectively disposed right inside the sound outlets 24, and sound emitted from these speakers is sent out to the outside through the sound outlets 24.

Figure 22:
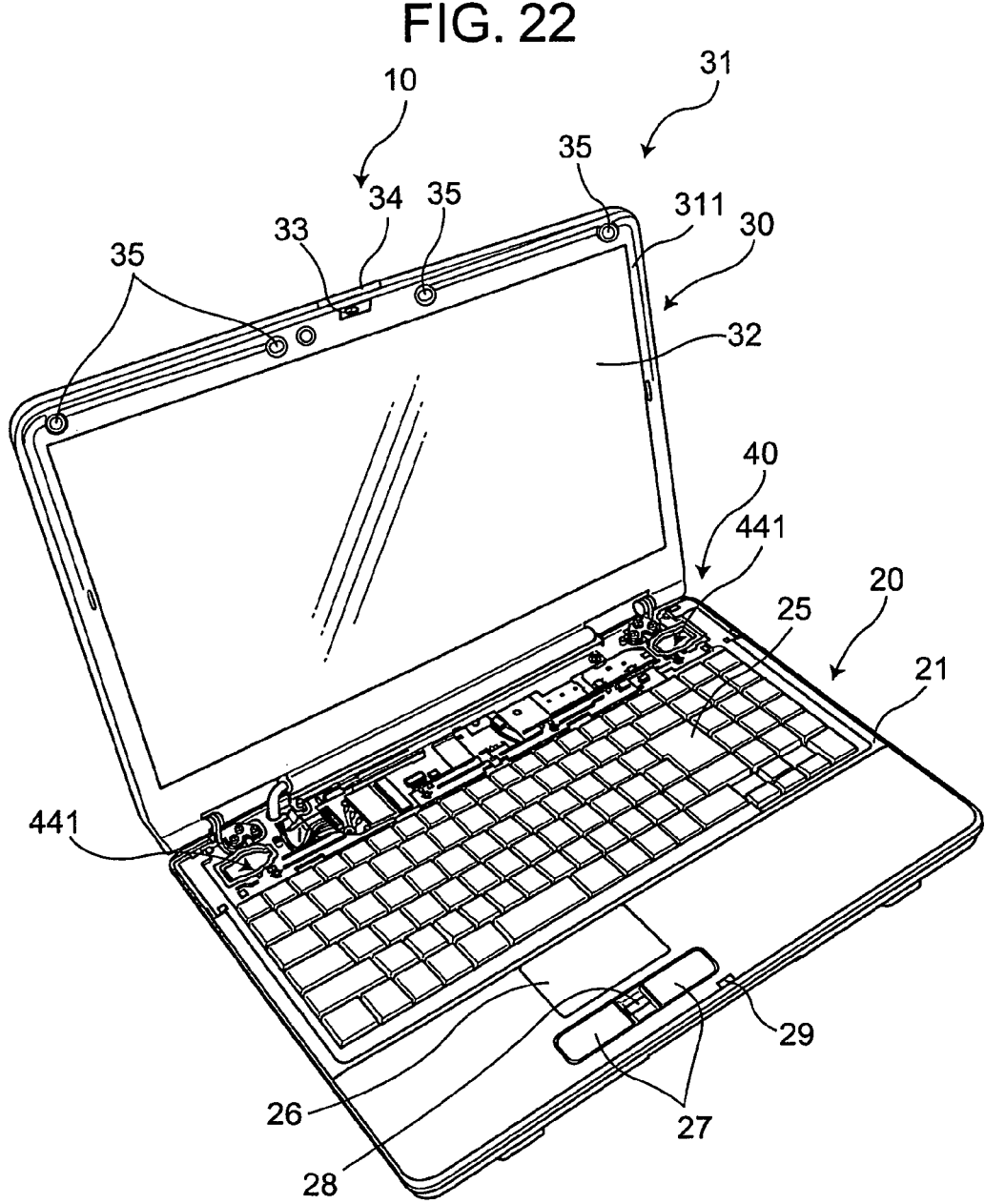
FIG. 22 is a diagram that illustrates the notebook PC in a state in which a cover member on a backward side of the top face of the operational unit is removed and speakers also are removed.

FIG. 22 is a diagram that illustrates the notebook PC 10 in a state in which a cover member on a backward side of the top face of the operational unit 20 is removed and further the speakers also are removed. The power button 22, function buttons 23 and sound outlets 24 illustrated in FIG. 2 and FIG.

3 are provided on this cover member and thus also are removed together with the cover member.

Figure 23:
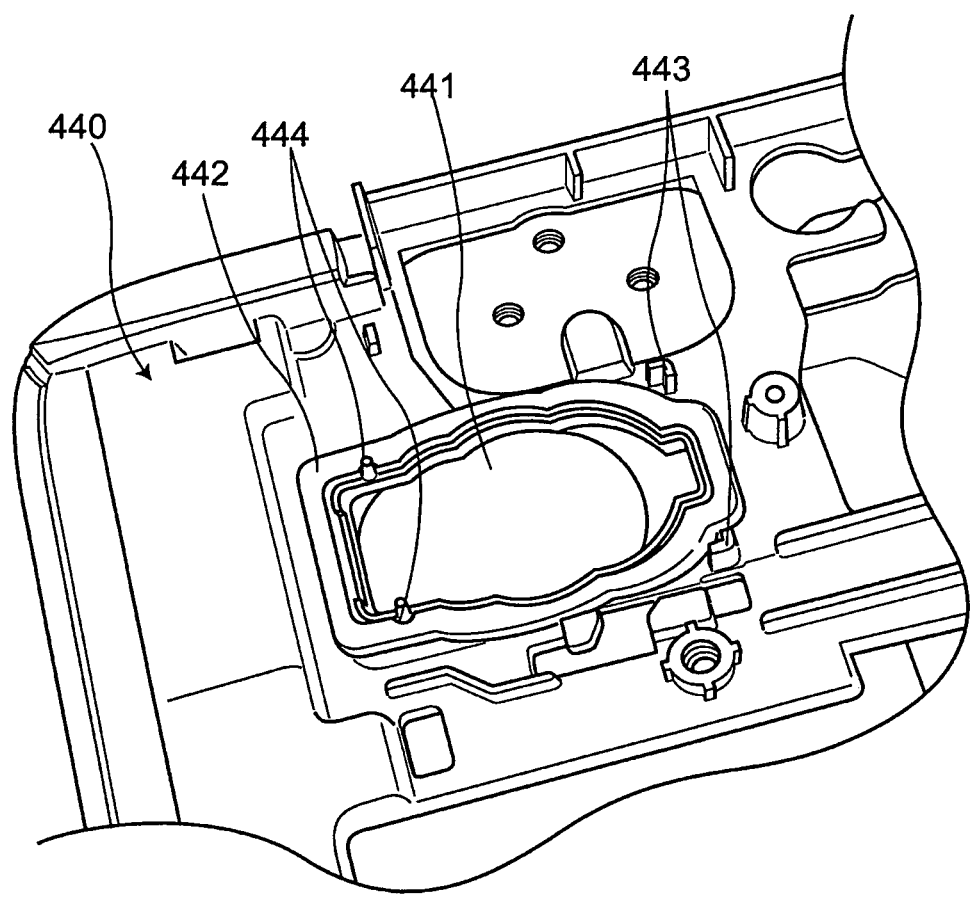
FIG. 23 is an enlarged perspective diagram that illustrates a speaker placement section on the left.
Figure 24:
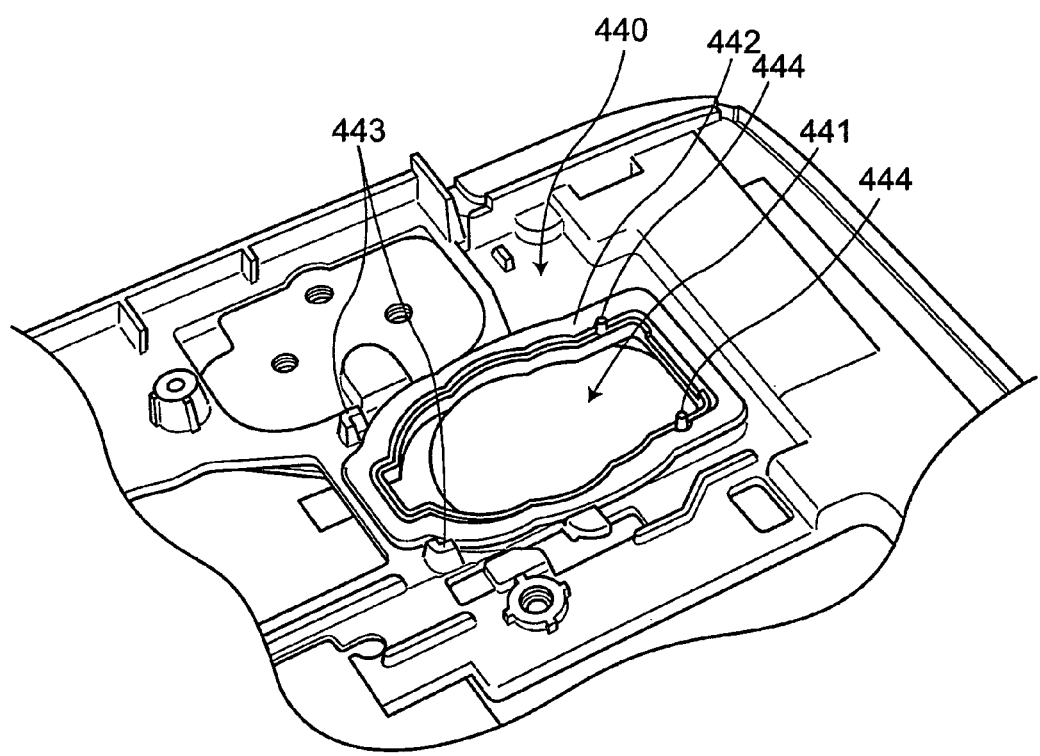
FIG. 24 is an enlarged perspective diagram that illustrates a speaker placement section on the right.

FIG. 23 and FIG. 24 are enlarged perspective diagrams that illustrate a pair of speaker placement sections 441 on the left and right, respectively. FIG. 23 and FIG. 24 illustrate a state in which disassembly is further advanced from the state illustrated in FIG. 22, for example, by removing the keyboard 25 and the display unit 30.

In a board 440, the pair of speaker placement sections 441 are formed on the left and right. As illustrated in FIG. 23 and FIG. 24, the pair of speaker placement sections 441 are oddly-shaped openings formed on the board 440. To a part around each of the openings defining the speaker placement sections 441, an adhesive tape 442 is adhered. The adhesive tape 442 is a double-faced tape of cushion type and has a (circular) shape of seamlessly going around the edge of the opening. In each of the pair of speaker placement sections 441, two standing sections 443 and two standing pins 444 for positioning the speaker (described later) are provided.

Figure 25:
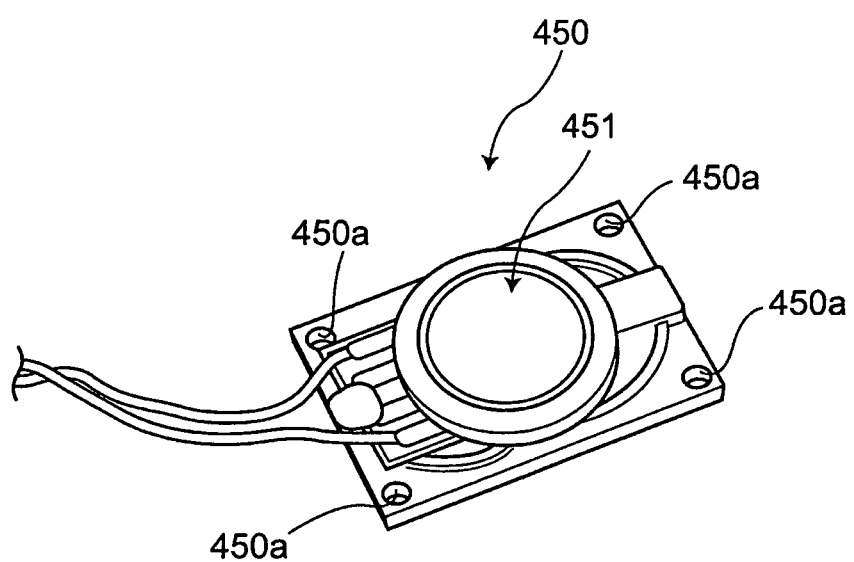
FIG. 25 is a perspective diagram of a speaker when viewed from the back.

FIG. 25 is a perspective diagram of the speaker (450) when viewed from the back.

The speaker 450 has a sound emitting face 452 (see FIG. 26 and FIG. 27) that emits sound by vibration and is provided on a face opposite to a back face 451 illustrated in FIG. 25. The speaker 450 is shaped like a rectangle when viewed from a direction perpendicular to the back face 451 or sound emitting face 452, and holes 450a are formed at four corners of the rectangle. As illustrated in FIG. 25, the back face of the speaker 450 protrudes to form an odd shape, and the opening formed in each of the speaker placement sections 441 of the board 440 is so shaped as to receive the back face of the speaker 450. Further, the opening has a shape for only partially supporting the rim of speaker 450, which will be described below.

Figure 26:
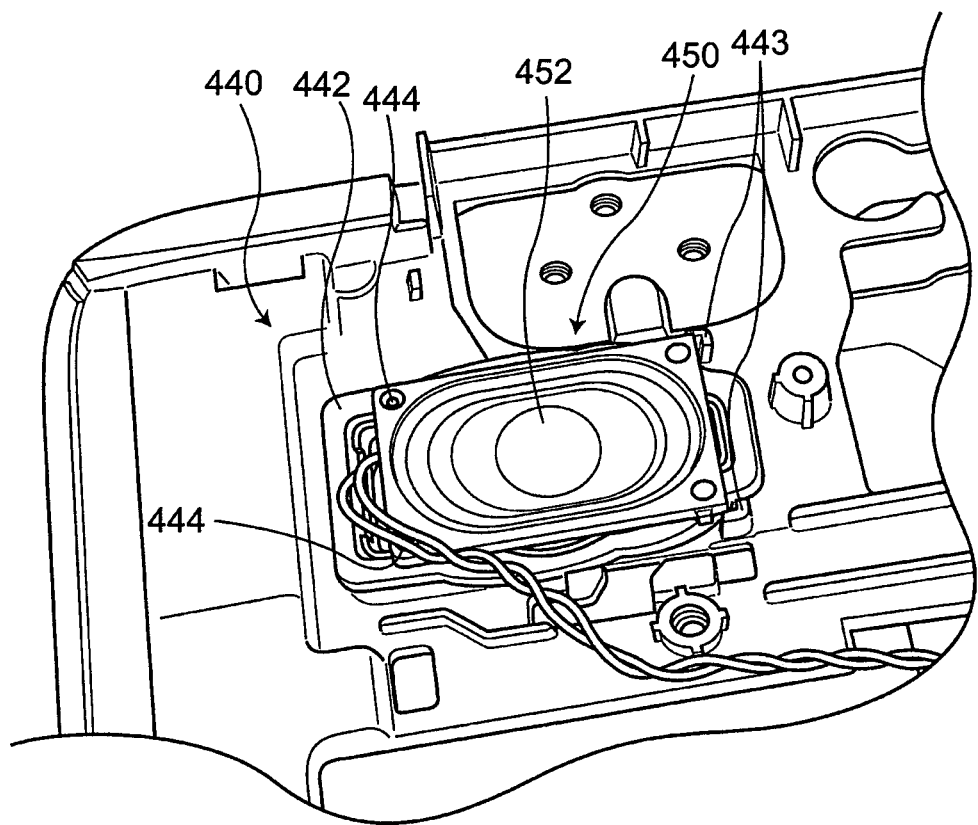
FIG. 26 is an enlarged perspective diagram that illustrates a state in which the speaker is disposed in the speaker placement section on the left.
Figure 27:
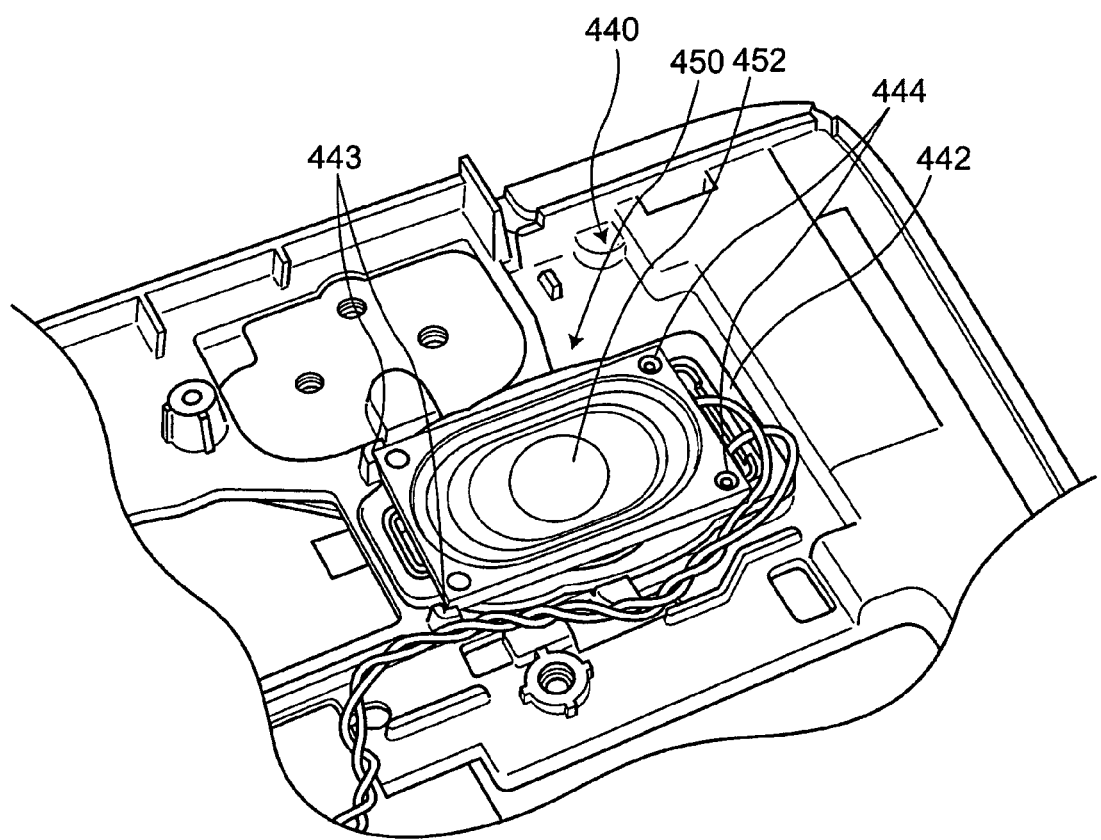
FIG. 27 is an enlarged perspective diagram that illustrates a state in which the speaker is disposed in the speaker placement section on the right.

FIG. 26 and FIG. 27 are enlarged perspective diagrams that illustrate a state in which the speaker 450 is disposed in each of the speaker placement sections 441 on the left and right, respectively.

The speaker 450 is disposed such that the projection on the back face 451 (see FIG. 25) enters the opening and the rim of the back face 451 sits on the double-faced adhesive tape 442. Further, the speaker 450 is positioned when the two corners of the rectangle are pressed against the standing sections 443 and the standing pins 444 are inserted into two of the four holes 450a.

Here, the oddly shaped opening is formed in each of the speaker placement sections 441, and the double-faced adhesive tape 442 is so disposed as to trace the edge of the oddly shaped opening. Therefore, the rim of the back face of the speaker 450 disposed in the speaker placement section 441 intermittently overlaps the double-faced adhesive tape 442 while going around. To be more specific, the four corners of the rectangle of the speaker 450 overlap the double-faced adhesive tape 442 and a central part of each of the four sides of the rectangle does not overlap the double-faced adhesive tape 442 because the double-faced adhesive tape 442 goes along a track outside the speaker 450. In this way, by using the double-faced adhesive tape 442 serving as a cushion, transmission of vibration of the speaker 450 to the board 440 is made difficult. At the same time, by making support of the speaker 450 intermittent, the transmission of the vibration to the board 440 is made further difficult.

Figure 28:
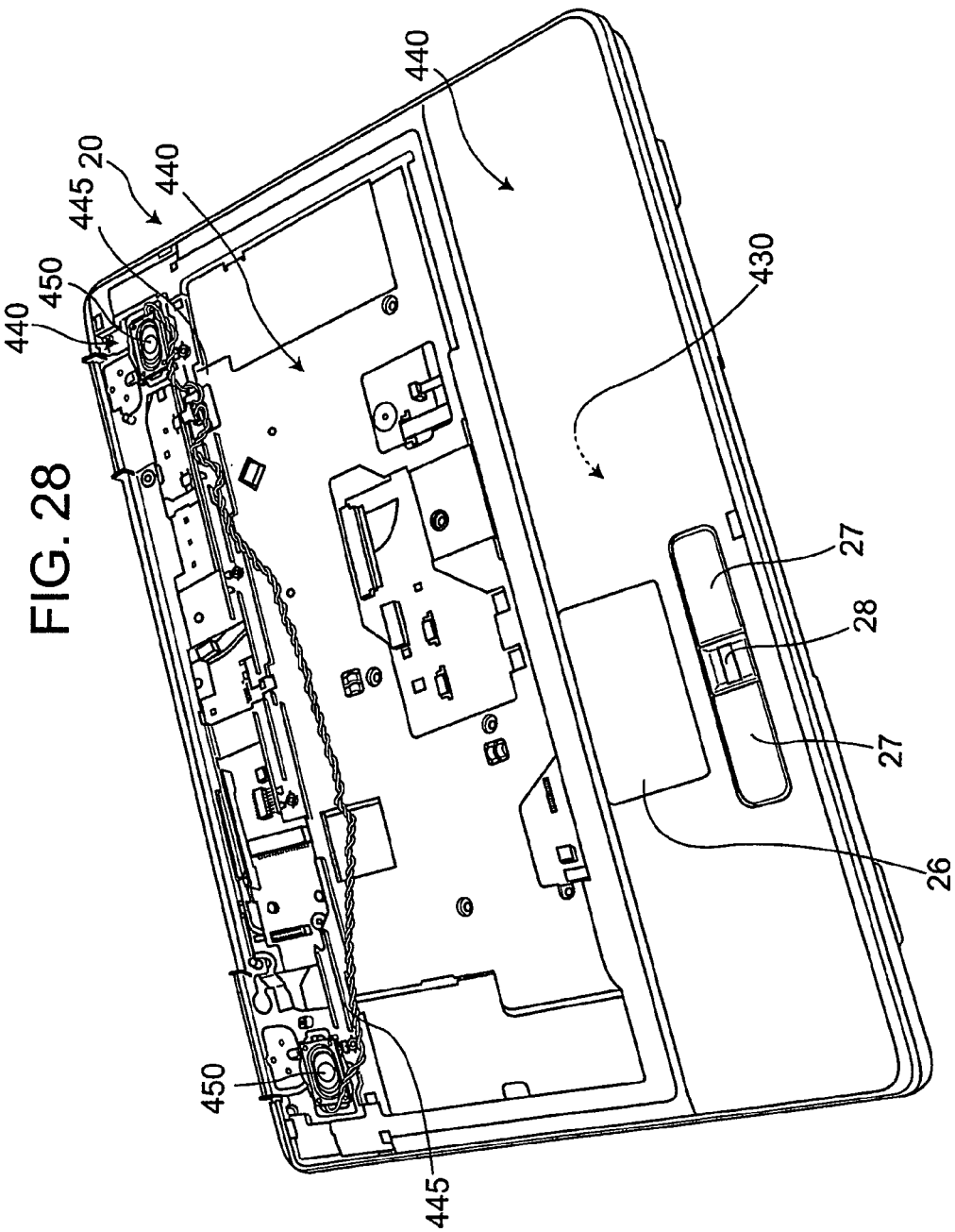
FIG. 28 is a diagram that illustrates the top face of the operational unit in a state in which both the cover member that covers the speakers and the like and a keyboard are removed.
Figure 29:
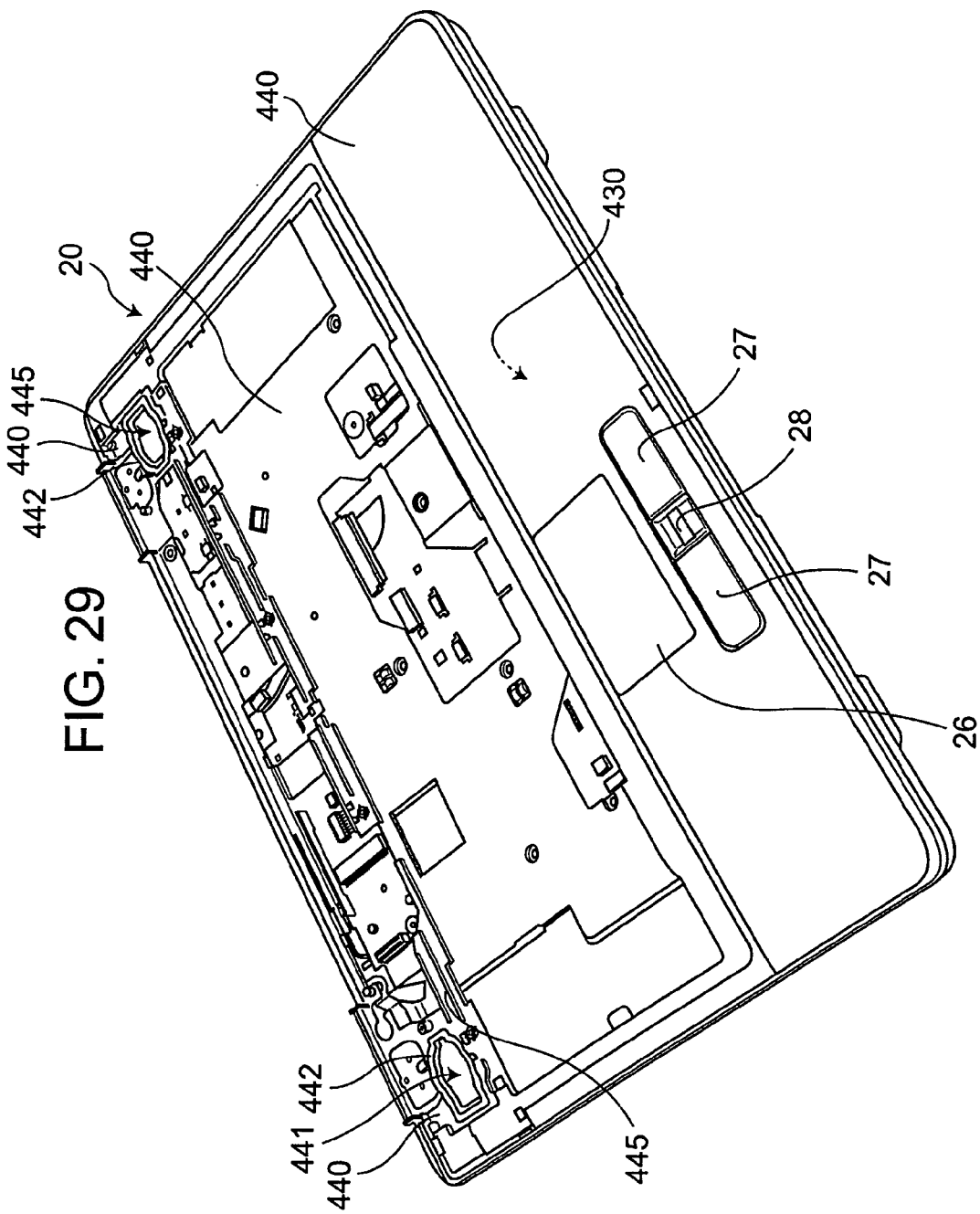
FIG. 29 is a diagram that illustrates the top face of the operational unit in a state in which the speakers in the state illustrated in FIG. 28 are removed.

FIG. 28 is a diagram that illustrates the top face of the operational unit 20 in a state in which both the cover member that covers the speakers and the like and the keyboard are removed. FIG. 29 is a diagram that illustrates the top face of the operational unit 20 in a state in which the speakers in the state illustrated in FIG. 28 are removed.

The board 440 that supports the speakers 450 also serves as a support member that spreads under and supports the keyboard 25. The board 440 forms a part of the outer face of the operational unit 20 on a side forward of the keyboard 25. Thus, the board 440 is a top cover that covers the top side of the enclosure 21 of the operational unit 20. Here, in the board 440, a part between the speaker placement sections 441 (see FIG. 22) and an area spreading under the keyboard is connected by a thin arm section 445. Further forward of the keyboard 25 when viewed from the speakers 450, the HDD unit 430 is mounted. The HDD unit 430 is a component comparatively vulnerable to vibration, and the arm section 445 of the board 440 is an idea to make the transmission of vibration of the speaker 450 to the keyboard and the HDD unit 430 difficult.

Click Button Structure

Figure 30:
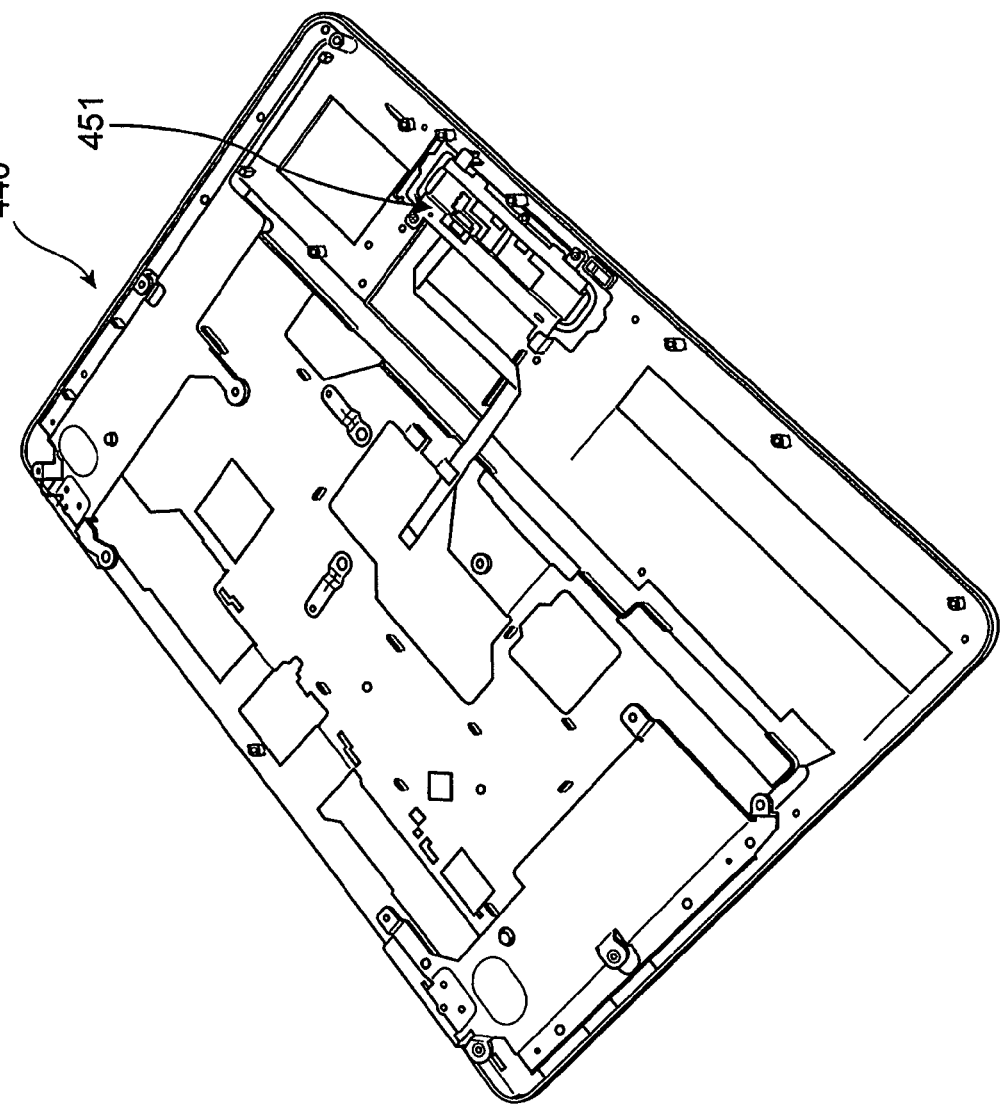
FIG. 30 is a diagram that illustrates the reverse side of a top cover that also serves as a board supporting the speakers.
Figure 31:
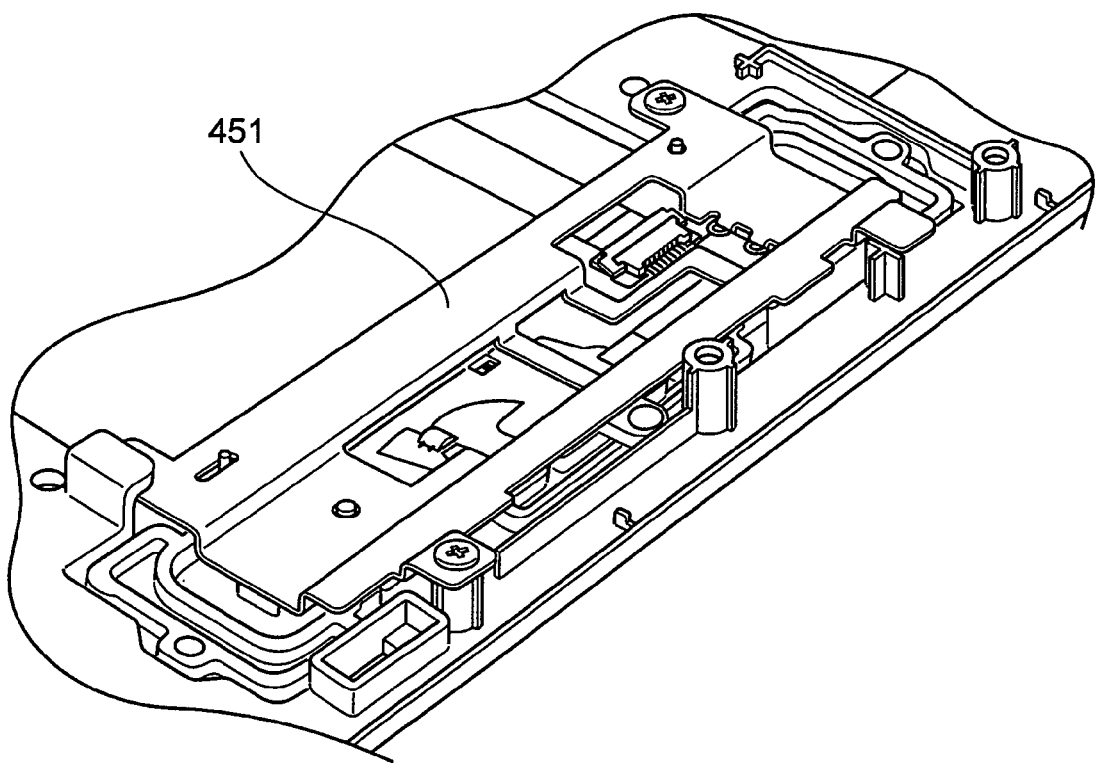
FIG. 31 is an enlarged perspective diagram that illustrates a support metallic member on the reverse side of the top cover.

FIG. 30 is a diagram that illustrates the reverse side of the top cover that also serves as the board supporting the speakers. FIG. 31 is an enlarged perspective diagram that illustrates a support metallic member 451 on the reverse side of the top cover.

FIG. 30 and FIG. 31 illustrate the support metallic member 451 disposed on the side opposite to the side where elements such as the fingerprint sensor 28 and the operation buttons 27 (for example, see FIG. 2 and FIG. 29) are provided. The support metallic member 451 is illustrated with the underside facing upward.

Figure 32:
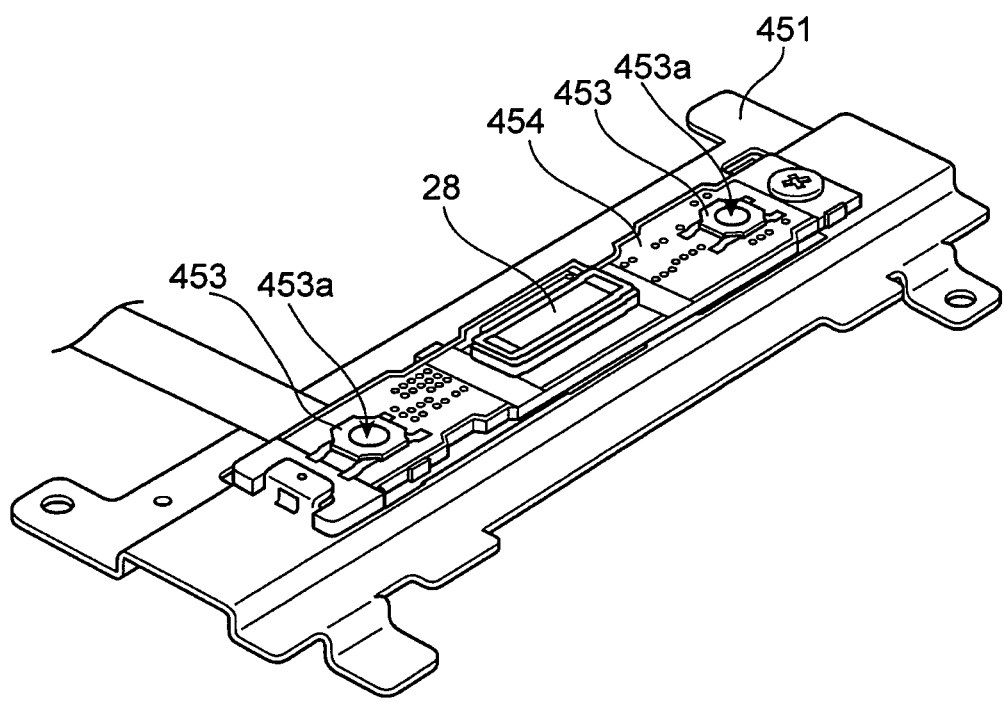
FIG. 32 is an enlarged perspective diagram that illustrates the top face of the support metallic member removed from a front cover.

FIG. 32 is an enlarged perspective diagram that illustrates the top face of the support metallic member 451 removed from the front cover, opposite to the underside illustrated in FIG. 30.

As illustrated in FIG. 32, a circuit board 454 is fixed to the top face of the support metallic member 451. Mounted in the center between the left and right of the circuit board 454 is the fingerprint sensor 28, and switches 453 are mounted on the left and right, respectively. The fingerprint sensor 28 is exposed on the top face of the operational unit 20 through an aperture 446 (see FIG. 33) formed in the top cover. Further, each of the switches 453 on the left and right changes its state in response to a press of a pressing point 453a in the center of each of the switches 453. Each of the switches 453 has such a structure that its pressing point 453a is pressed by the corresponding operation button 27 (see FIG. 2 and FIG. 29) on the top face of the operational unit 20 when this operation button 27 is depressed.

Figure 33:
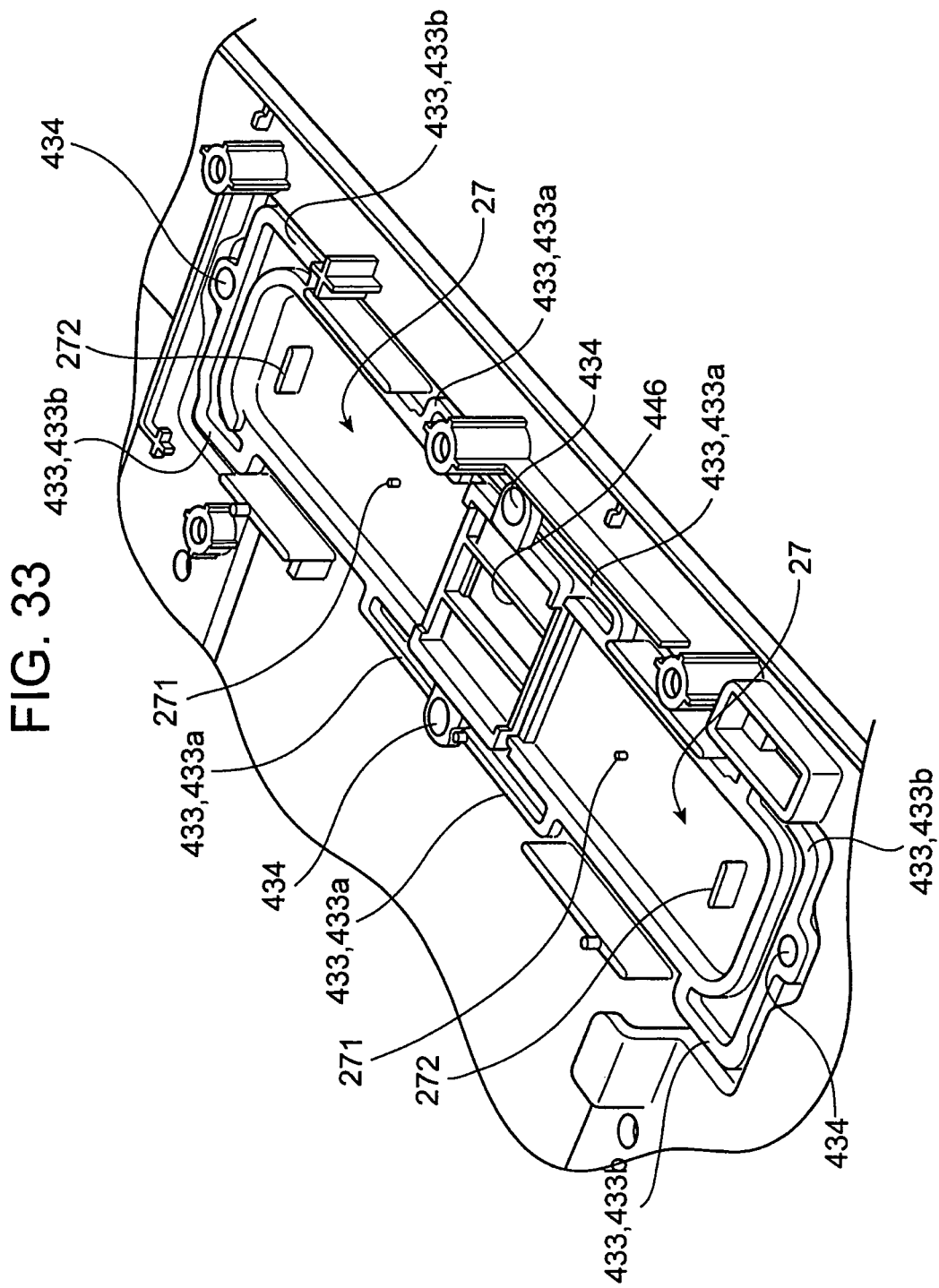
FIG. 33 is a perspective diagram that illustrates the inner faces of two operation buttons between which a fingerprint sensor is interposed, in a state in which the support metallic member with a circuit board is removed.
Figure 34:
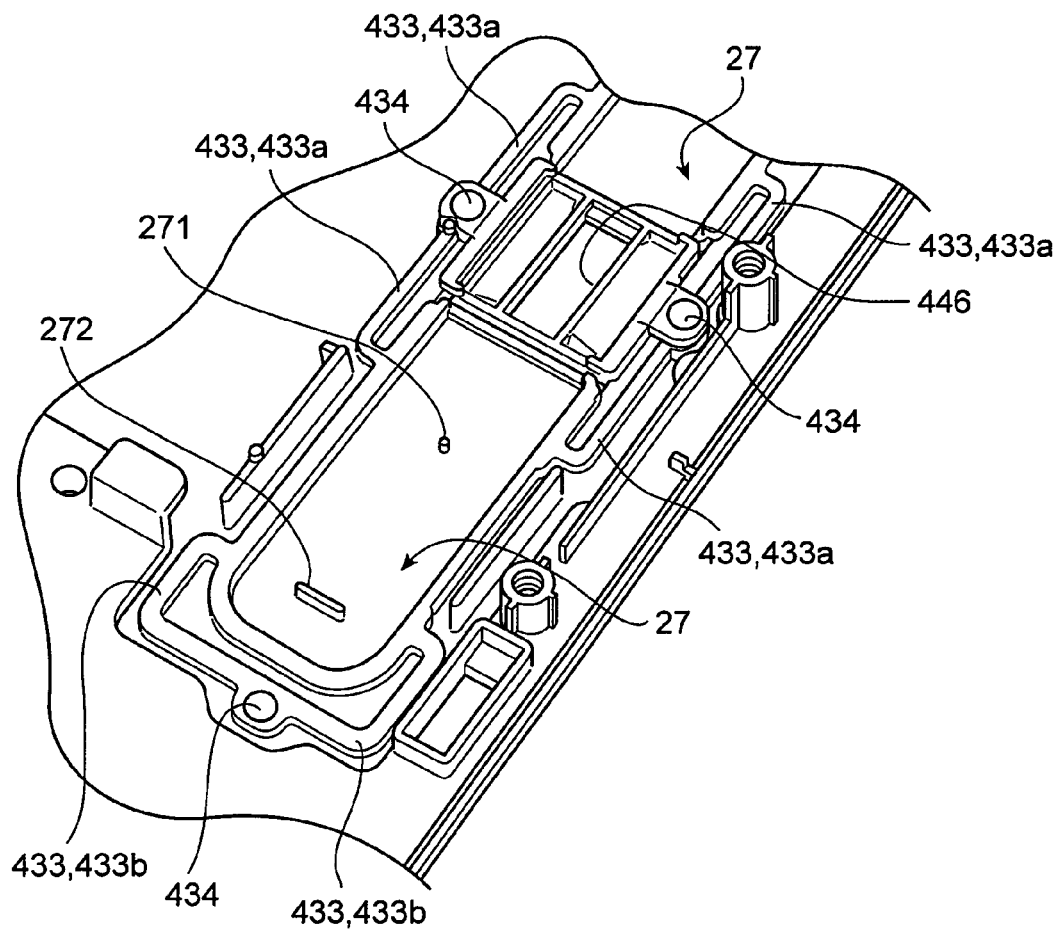
FIG. 34 is an enlarged perspective diagram that illustrates the inner face of an operation switch on the right.
Figure 35:
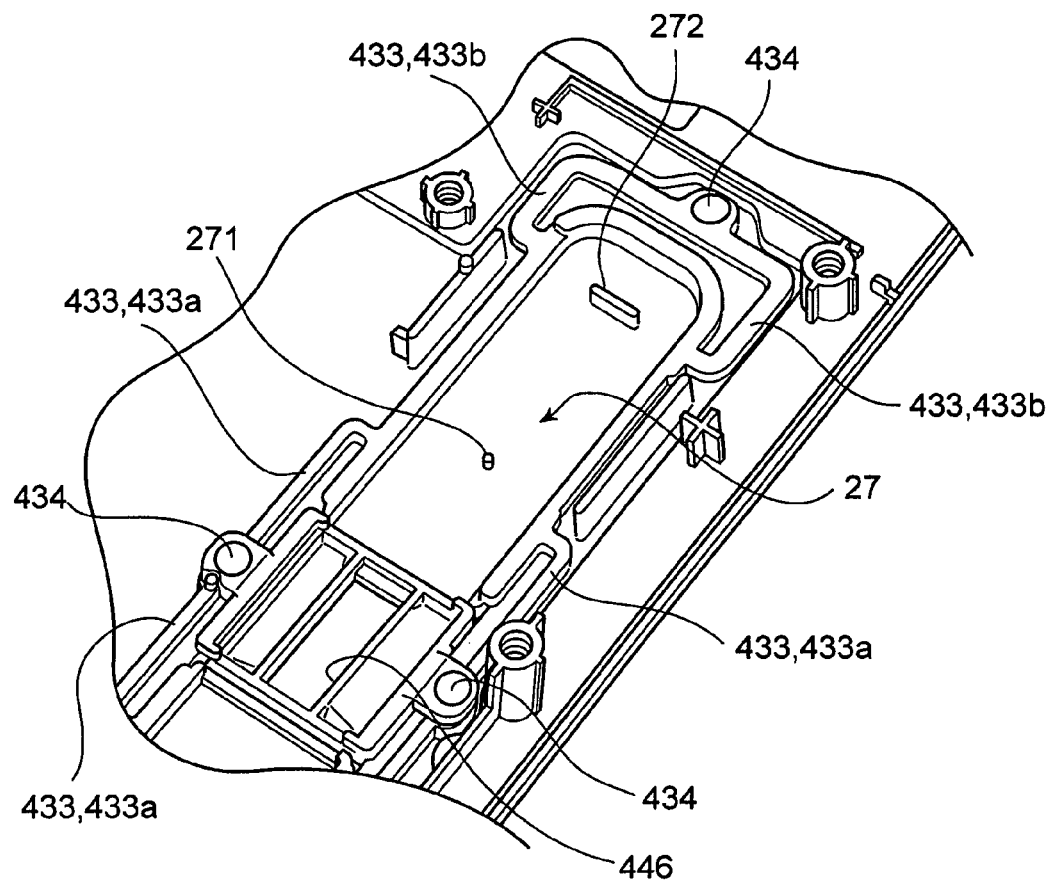
FIG. 35 is an enlarged perspective diagram that illustrates the inner face of an operation switch on the left.

FIG. 33 is a perspective diagram that illustrates the inner faces of the two operation buttons 27 between which the fingerprint sensor is interposed, in a state in which the support metallic member 451 with the circuit board 454 illustrated in FIG. 31 and FIG. 32 are removed. FIG. 34 and FIG. 35 are enlarged perspective diagrams that illustrate the inner face of each of the operation switches 27 on the left and right.

As illustrated in FIG. 33 through FIG. 35, each of the operation buttons 27 has a substantially rectangular shape that is laterally long. Each of the operation buttons 27 has an action pin 271 that protrudes from the inner face at a position shifted from the center of the rectangular shape and closer to an opening 446 that exposes the fingerprint sensor 48. The effect pins 271 are respectively formed at the positions facing the pressing points 453a of the switches 453 in the circuit board 454 (see FIG. 32). In other words, the distance between the centers of the respective two operation buttons 27 is larger than the distance between the two switches 453 mounted on the circuit board 454. When the operation button 27 is pressed, the action pin 271 pushes down the pressing point 453a of the switch 453, thereby changing the state of the switch 453. Further, each of the operation switches 27 has a rib 272 that protrudes from the inner face at a position opposite the action pin 271 across the center of the rectangular shape. When the operation switch 27 is pressed hard, the rib 272 abuts on the top face of the support metallic member 451 (see FIG. 32) so that the operation button 27 is not pressed any further.

Furthermore, four resilient arms 433 extend from the circumference of each of the operation buttons 27 and are fixed to the top cover by fixing pins 434. These resilient arms 433 support the operation buttons 27 on the top cover and displace the operation buttons 27 by elastically deforming when the operation buttons 27 are depressed. Here, among the four resilient arms 433 for each of the operation buttons 27, two resilient arms 433a closer to the aperture 446 are relatively small in width and two resilient arms 433b away from the aperture 446 are relatively large in width. This is because the action pin 271 of each of the operation buttons 27 is provided at the position closer to the aperture 446. In other words, because the size of each of the operation buttons 27 is considerably large in a lateral direction as compared to the width of a finger, either a part closer to the aperture 446 or a part away from the aperture 446 of the operation button 27 may be pressed. Therefore, it is preferable that the switch 453 (see FIG. 32) be reliably pressed by the action pin 271 when any position of the operation button 27 is pressed.

Here, by reducing the diameters of the resilient arms 433a supporting the side closer to the aperture 446 of the operation button 27, the part closer to the aperture 446 is supported with a relatively small coefficient of elasticity. On the other hand, by increasing the diameters of the resilient arms 433a supporting the side away from the aperture 446 of the operation button 27, the part away from the aperture 446 is supported with a relatively large coefficient of elasticity. Accordingly, reliable depression of the switch 453 is realized. In other words, when the part closer to the aperture 446, i.e. the part closer to the resilient arm 433a than to the resilient arm 433b of the operation button 27, is pressed, the resilient arm 433a closer to the aperture 446 is deformed by the force exerted by such pressing and causes the action pin 271 to push the switch 453. In contrast, when the part away from the aperture 446, i.e. the part closer to the resilient arm 433b than to the resilient arm 433a of the operation button 27, is pressed, the force pressing the operation button 27 is transmitted to the resilient arm 433a that supports the part closer to the aperture 446 of the operation button 27, thereby deforming this resilient arm 433a. This is because the part away from the aperture 446 of the operation button 27 is hard to deform since this part is supported by the resilient arm 433b of a relatively large diameter. Accordingly, even when the part away from the aperture 446 of the operation button 27 is pressed, the switch 453 is reliably pushed by the action pin 271.

Here, if the action pin 271 is formed in the center of the operation button 27, it may be desired to so dispose the switch 453 (see FIG. 32) as to face the action pin 271, increasing the size of the circuit board 454 mounted with the switch 453 as well as the size of the support metallic member 451. In this case, space required for the circuit board 454 and the like to dispose components is increased, failing to meet demands for downsizing and implementation of higher density.

Meanwhile, it is conceivable to decrease the size of the operation button 27 so that the action pin 271 is positioned in the center of the operation button 27, while maintaining the position of the switch 453 illustrated in FIG. 32. However, since the arrangement position and size of the operation button 27 affects operability and design, there is a case in which it is difficult to position the center of the operation button 27 above the switch 453.

Here, this concern is addressed by varying the thicknesses of the resilient arms 433, thereby improving flexibility in the size and arrangement position of the operation button 27 with respect to the arrangement position of the switch 453.

Incidentally, when the part closer to the action pin 271 of the operation button is supported with a relatively small coefficient of elasticity and the part away from the action pin 271 of the operation button is supported with a relatively large coefficient of elasticity, reliable depression of the switch 453 may be realized. Here, reliable depression of the switches 453 is realized by adjusting the thickness of the resilient arms 433. However, other elements may be adjusted with or without the adjustment of the width of the resilient arm 433. Such other elements include the length of the resilient arms, the number of the resilient arms, and the position for connection with the operation button 27. In other words, the longer the resilient arm 433 is, the smaller the coefficient of elasticity may be, while the shorter the resilient arm 433 is, the larger the coefficient of elasticity may be. Further, the larger the number of the resilient arms 433 is, the larger the coefficient of elasticity may be. Furthermore, the closer the position of the resilient arm 433 for connection with the operation button 27 is brought to the action pin 271 of the operation button 27, the larger the influence of the depression of the operation button 27 on the press of the action pin 271 may be.

Connector Attachment Structure

Figure 36:
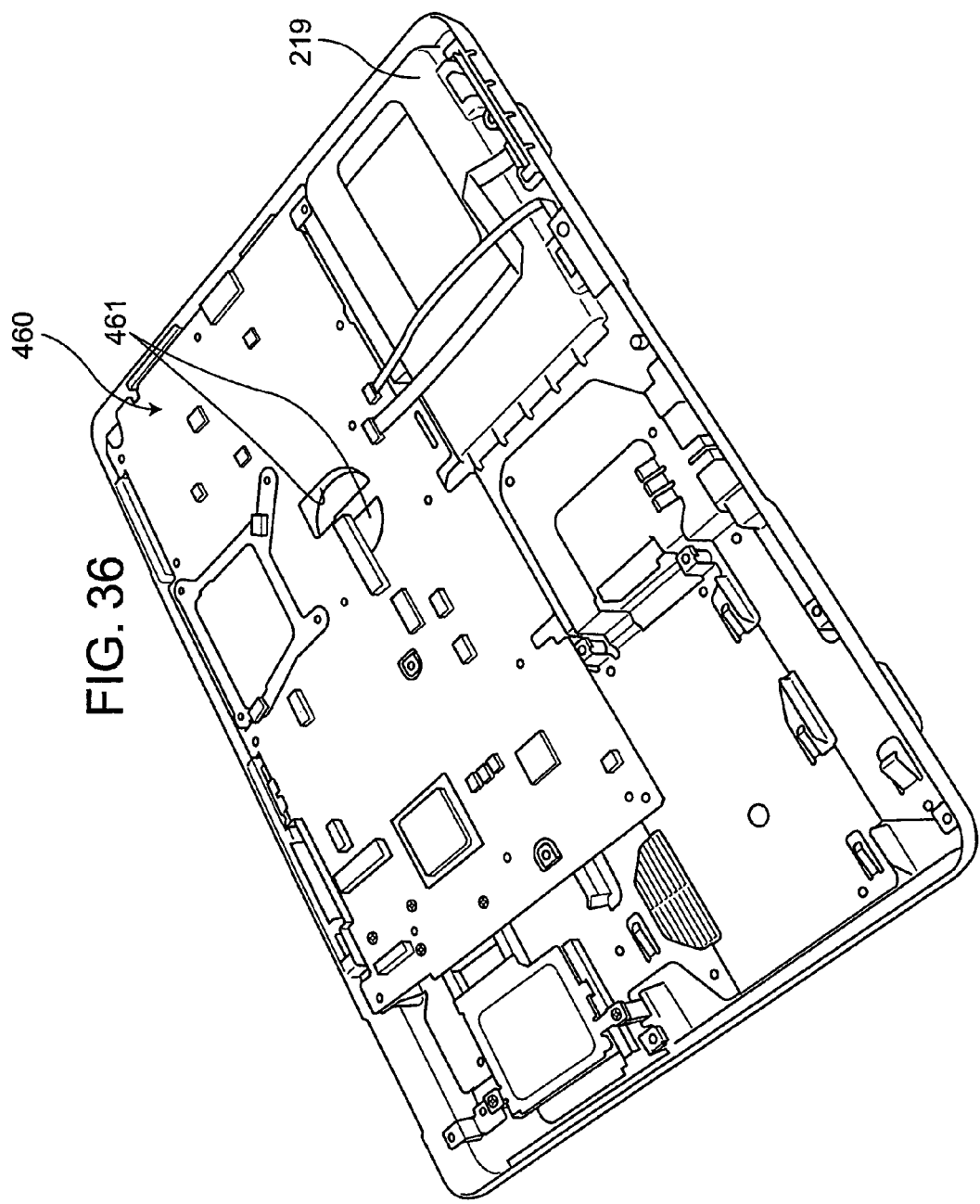
FIG. 36 is a perspective diagram of a state in which the top cover of the operational unit is removed.

FIG. 36 is a perspective of a state in which the top cover of the operational unit is removed.

FIG. 36 illustrates the state in which the top cover (board) 440 illustrated in FIG. 30 in the state illustrated in FIG. 29 is removed.

FIG. 36 illustrates the inner side of a bottom cover 219 that serves as the bottom side of the enclosure 21 (see FIG. 2) of the operational unit 20. Mounted on the bottom cover 219 is a main board 460 that widely spreads. In the main board 460 illustrated in FIG. 36, apertures 461 for sending air to a fan 471 (see FIG. 37) that will be described later are formed.

Figure 37:
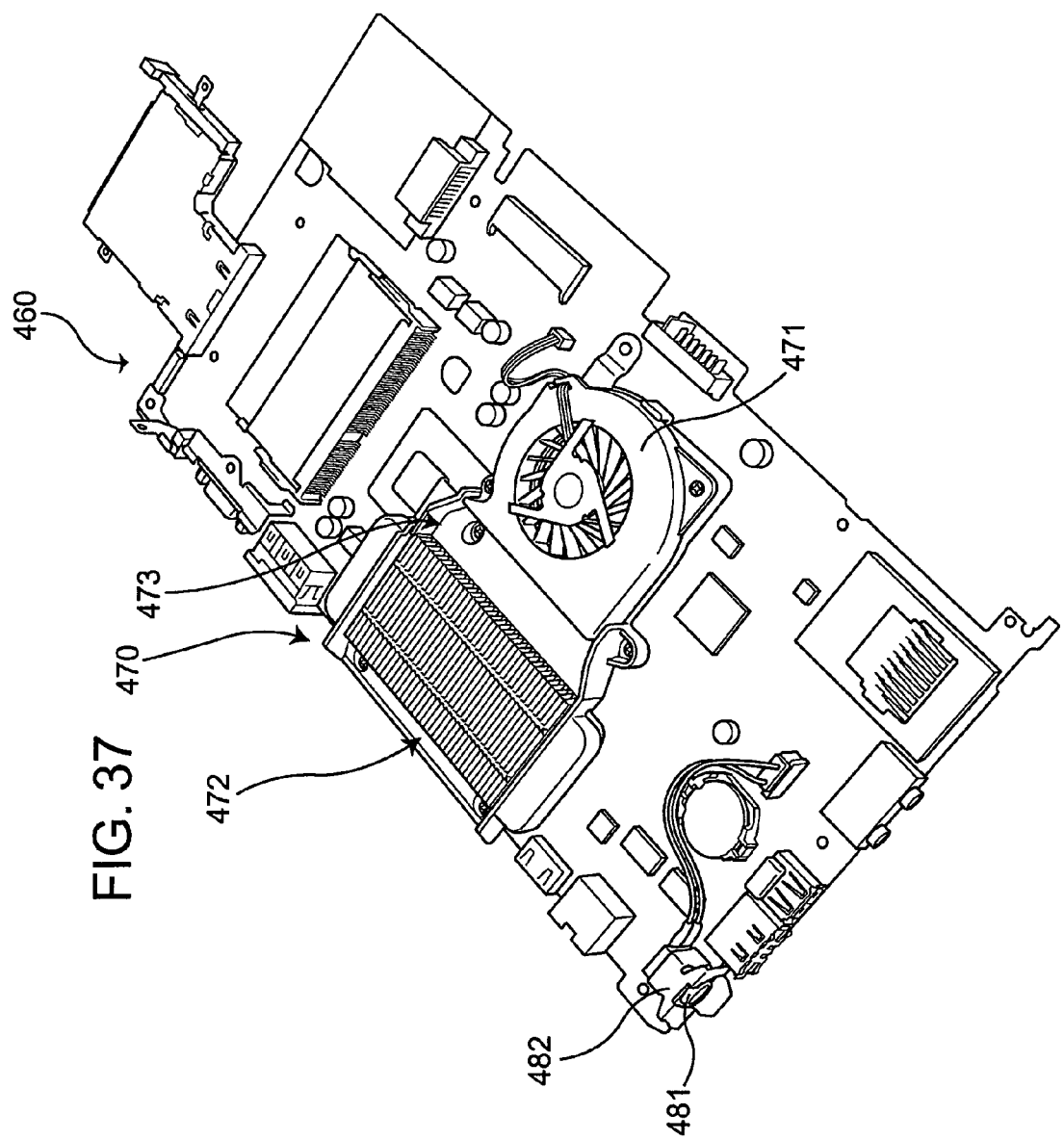
FIG. 37 is a perspective diagram of a main board.

FIG. 37 is a perspective diagram that illustrates the reverse side of the side illustrated in FIG. 36 of the main board 460.

On the main board 460 illustrated in FIG. 37, multiple components are densely arranged. Here, of these multiple components, only those necessary for the following description will be described. As illustrated in FIG. 37, there is mounted a radiating module 470 for cooling a CPU module 462 (see FIG. 45) that is a heat-producing module with air. The radiating module 470 includes the fan 471, radiating fins 472, and a substrate 473 that supports the fan 471 and radiating fins 472. The details of the radiating module 470 will be described later. Further, on the main board 460 illustrated in FIG. 37, there are mounted a power-supply connector 481 and a support metallic member 482 that supports the connector 481. In the following, the support metallic member 482 that supports the power-supply connector 481 will be described first.

Figure 38:
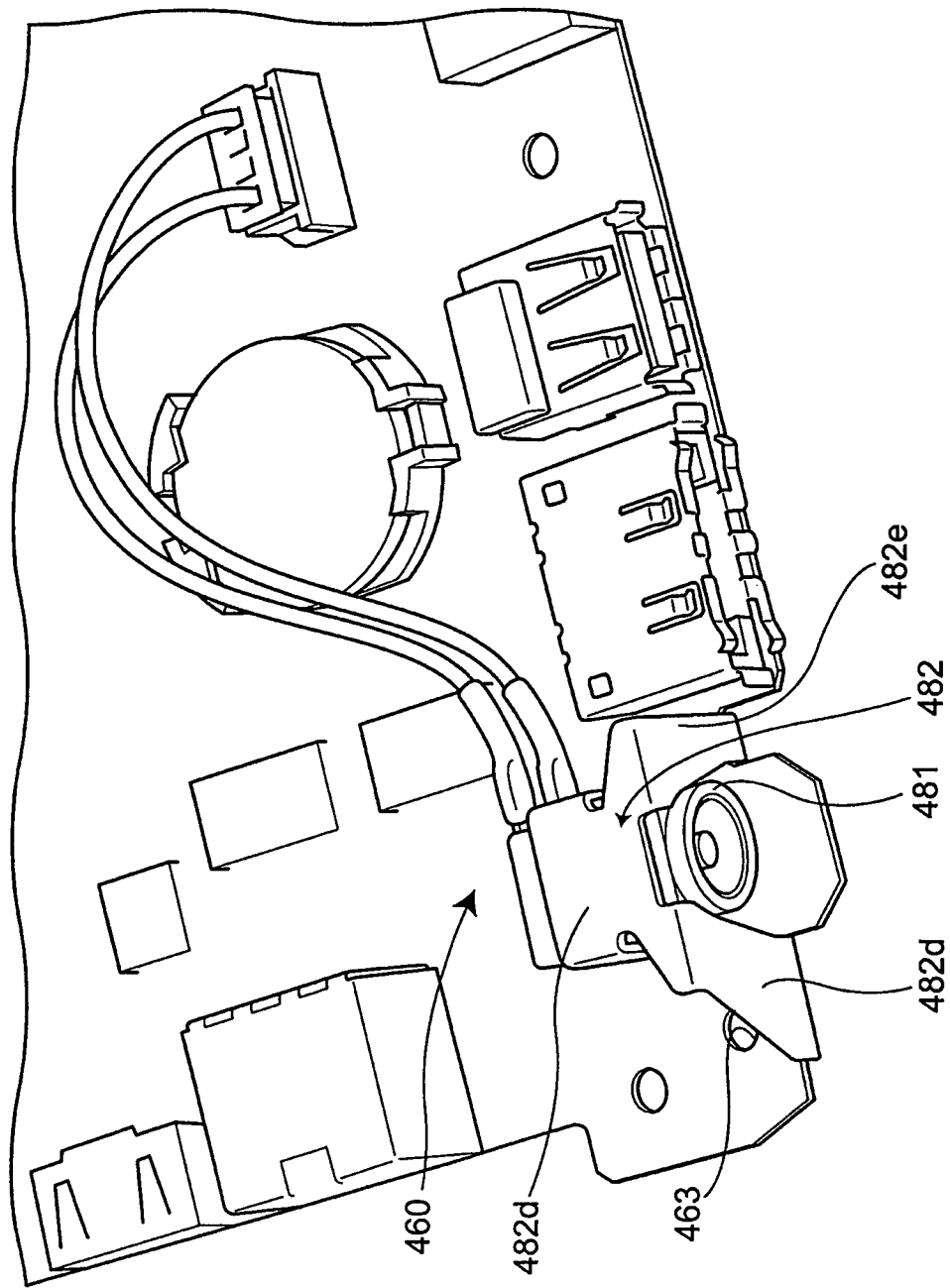
FIG. 38 is an enlarged perspective diagram of a power-supply connector on the side illustrated in FIG. 37 of the main board.
Figure 39:
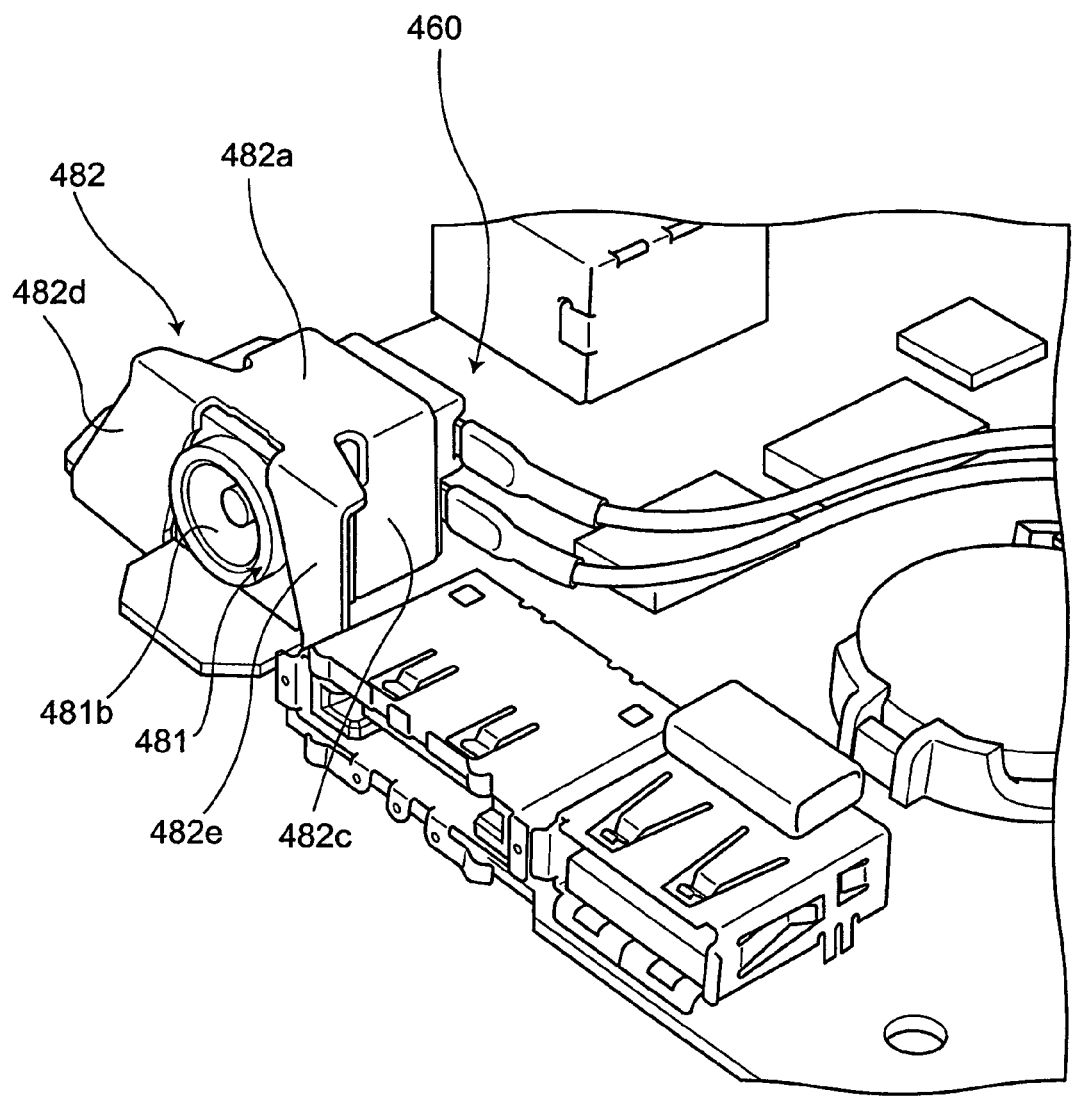
FIG. 39 is an enlarged perspective diagram of the power-supply connector, in which the side illustrated in FIG. 37 of the main board is viewed from another viewpoint.
Figure 40:
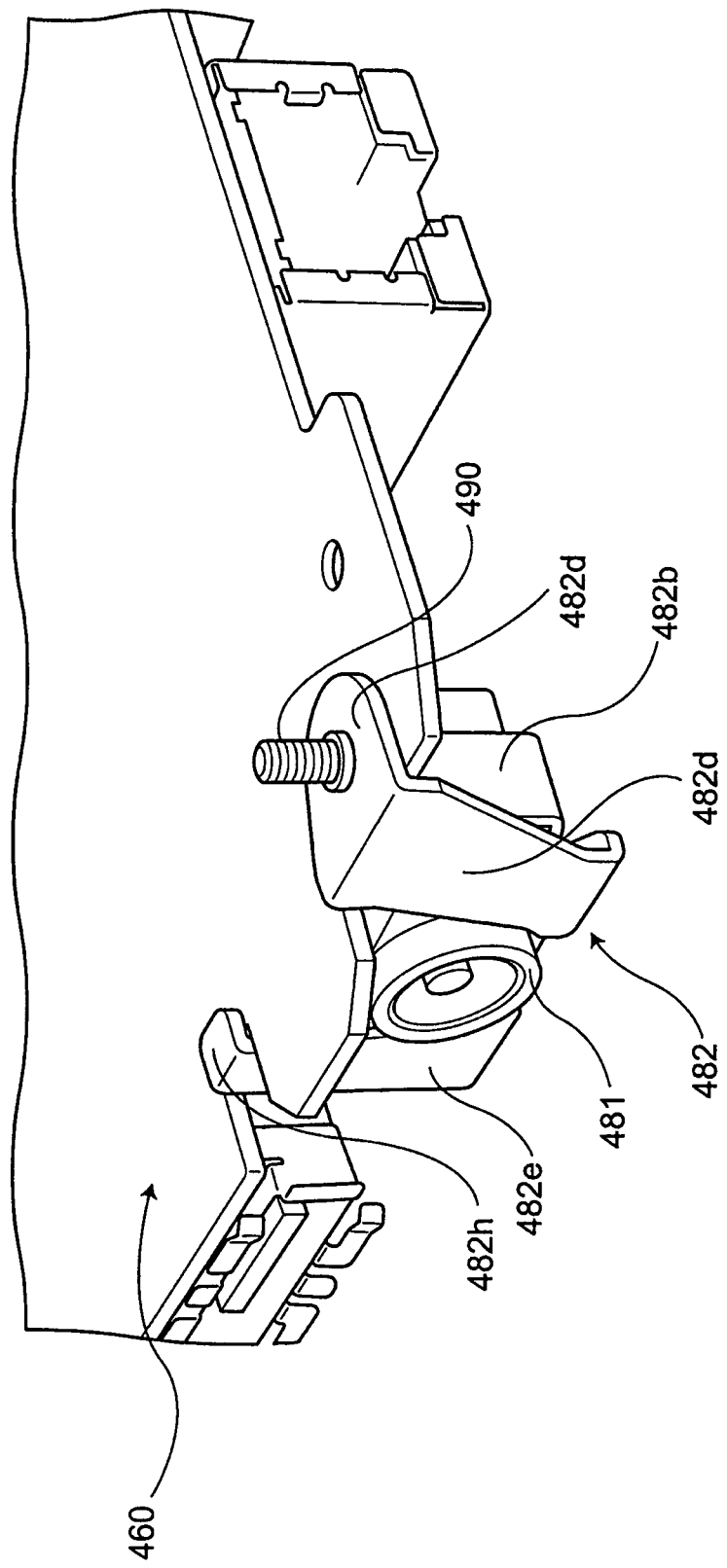
FIG. 40 is an enlarged perspective diagram of the power-supply connector on the reverse side of the side illustrated in FIG. 37 of the main board.
Figure 41:
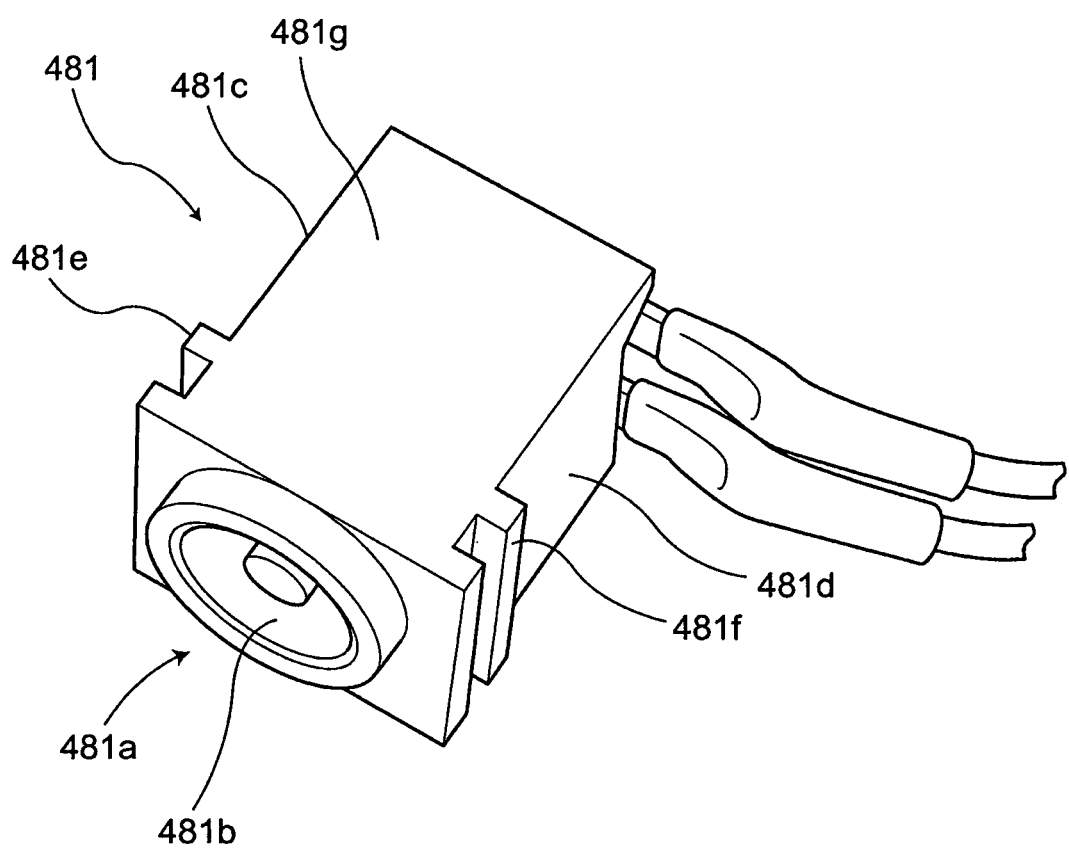
FIG. 41 is a perspective diagram of the power-supply connector alone.
Figure 42:
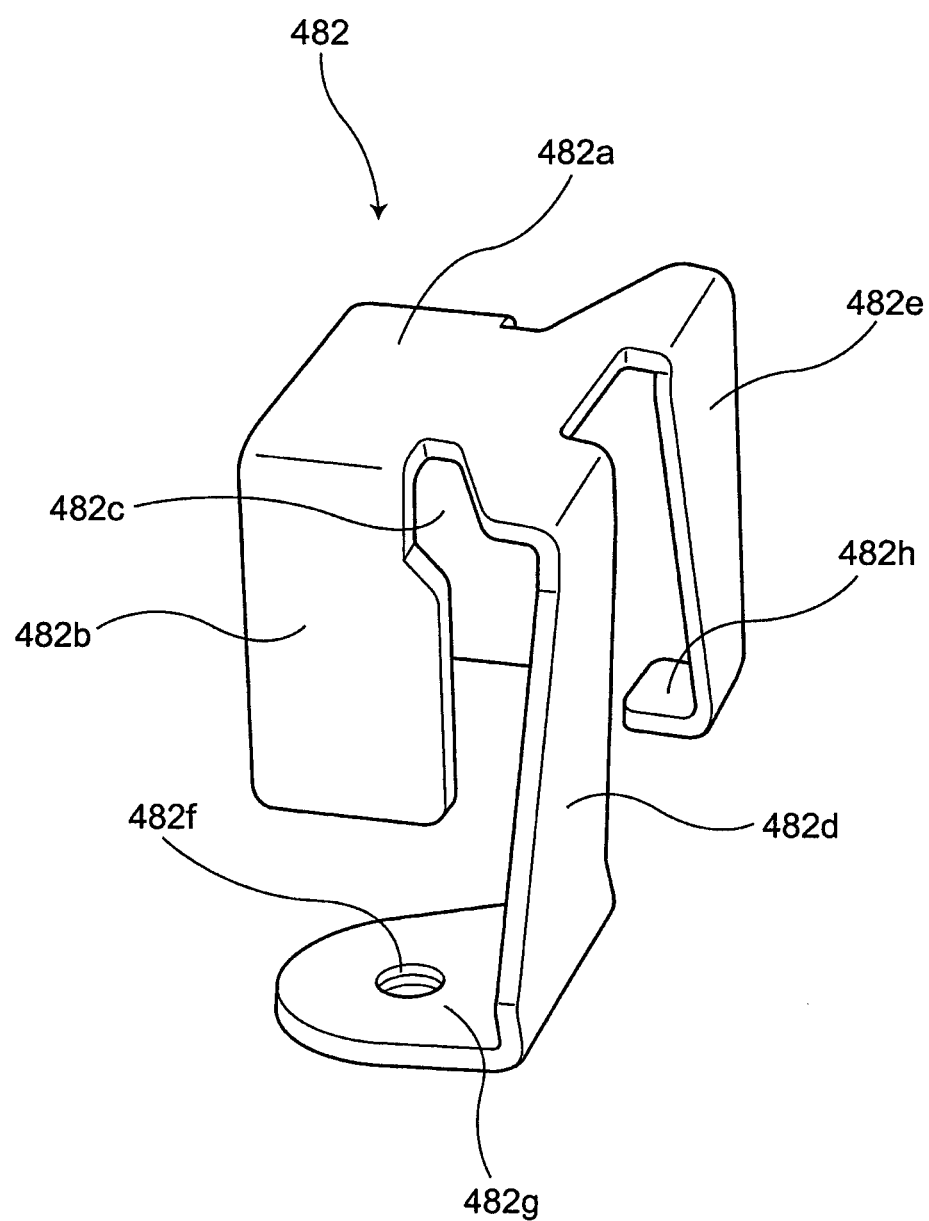
FIG. 42 is a perspective diagram that illustrates a support metallic member.
Figure 43:
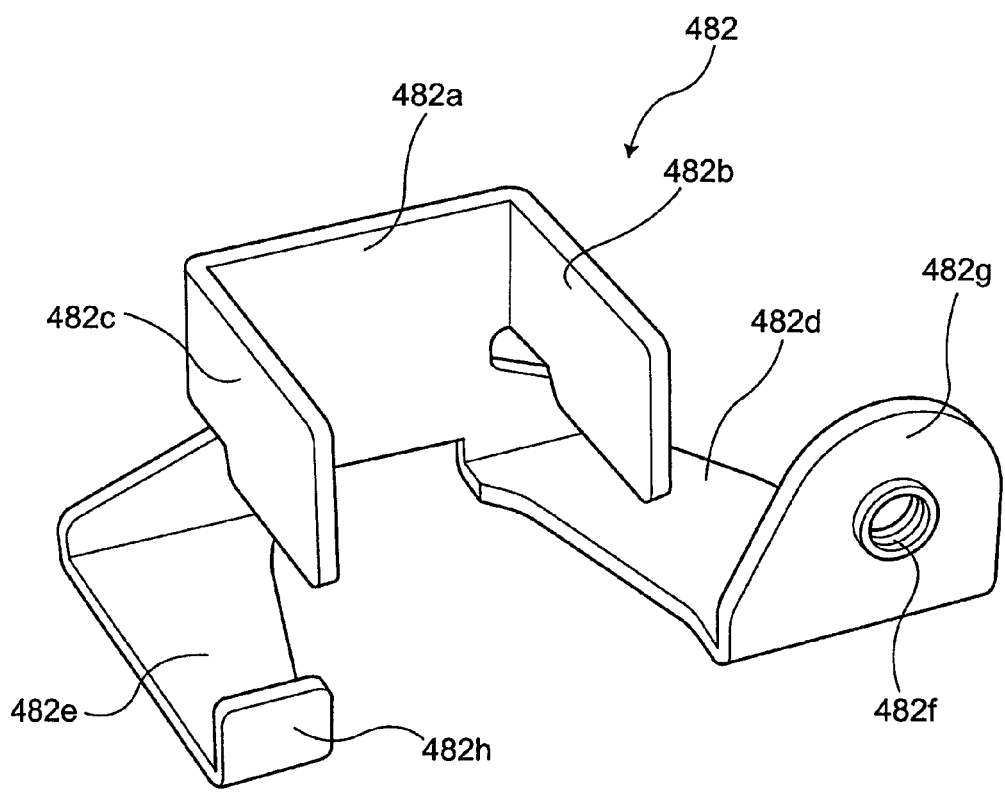
FIG. 43 is a perspective diagram that illustrates the support metallic member when viewed from another viewpoint.
Figure 44:
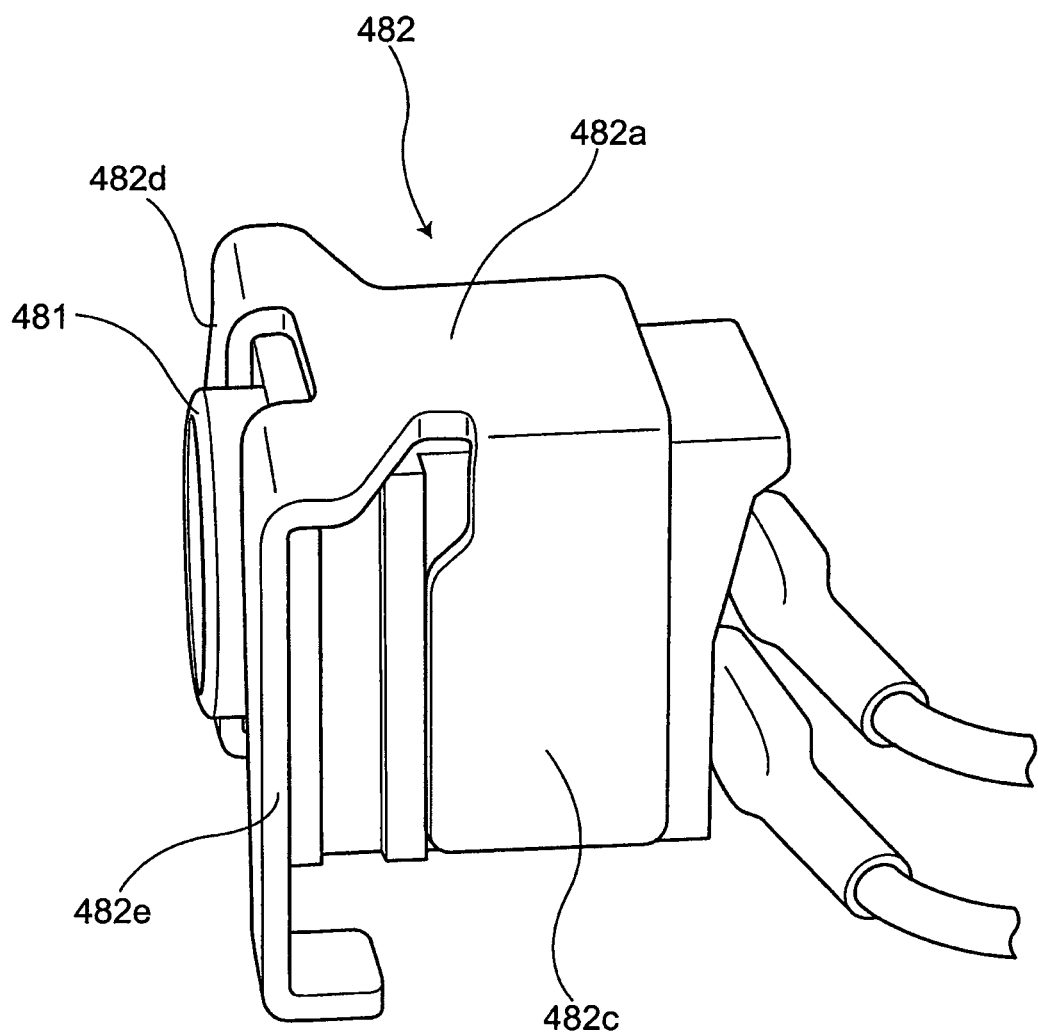
FIG. 44 is a perspective diagram that illustrates a state in which the support metallic member is coupled to the power-supply connector.

FIG. 38 and FIG. 39 are enlarged perspective diagrams of the power-supply connector 481, in which the side illustrated in FIG. 37 of the main board 460 is viewed from different viewpoints. In FIG. 38, a screw 490 (see FIG. 40) for fixing the support metallic member 482 to the main board 460 is removed and a hole 463 through which the screw 490 is to pass is illustrated. FIG. 40 is an enlarged perspective diagram of the power-supply connector 481 on the reverse side of the side illustrated in FIG. 37 of the main board 460, namely, the side illustrated in FIG. 36. FIG. 41 is a perspective diagram of the power-supply connector 481 alone, and FIG. 42 and FIG. 43 are perspective diagrams that illustrate the support metallic member 482 when viewed from different viewpoints. FIG. 44 is a perspective diagram that illustrates a state in which the support metallic member 482 is coupled to the power-supply connector 481.

The power-supply connector 481 illustrated here is disposed right inside the power-supply port 211 on the right flank of the operational unit 20 illustrated in FIG. 3. The power-supply connector 481 is to be coupled to the connector of the AC adaptor (not illustrated) inserted into the power-supply port 211.

Here, the face (face illustrated in FIG. 37 through FIG. 39) of the main board 460 on which side the power-supply connector 481 is disposed is referred to as "first face," while the face opposite to the first face is referred to as "second face" (face illustrated in FIG. 36 and FIG. 40).

As illustrated in FIG. 41, the power-supply connector 481 has an aperture 481b on a front face 481a, and projections 481e and 481f vertically extending are formed on side faces 481c and 481d on the left and right. On the other hand, as illustrated in FIG. 42 and FIG. 43, the support metallic member 482 includes: a base section 482a to be in contact with a top face 481g of the connector 481 (see FIG. 41); and bent sections 482b and 482c that are bent from the base section 482a and to be contact with the side faces 481c and 481d of the connector 481, respectively. The support metallic member 482 includes pressing sections 482d and 482e on the left and right, which are formed at positions on the left and right of the aperture 481b of the connector 481 to sandwich the aperture 481b and hold the left and right edges of the front face 481a of the connector 481. The support metallic member 482 includes a fixing member 482g which is bent from the tip of the pressing section 482d on the left toward the second face of the main board 460 and in which a screw hole 482f is formed. Further, the support metallic member 482 includes a hook section 482h which is bent from the tip of the pressing section 482e on the right toward the second face of the main board 460 and engaged in the main board 460.

As illustrated in FIG. 44, the support metallic member 482 supports the connector 481 by holding the front face 481a (see FIG. 41) of the connector 481 and the projections 481e and 481f vertically extending along the left and right flanks by using the pressing sections 482d and 482e on the left and right and the bent sections 482b and 482c on the left and right.

As illustrated in FIG. 38 and FIG. 39, the support metallic member 482 supports the connector 481 disposed at a predetermined position on the first face of the main board 460. In this supporting state, the fixing member 482g and hook section 482h of the support metallic member 482 extend from the left and right between which the connector 481 is interposed toward the second face of the main board 460, thereby fixing the connector 481 on the first face of the main board 460. In the main board 460, there is formed the hole 463 (see FIG. 38) to be aligned with the screw hole 482f formed in the fixing member 482g of the support metallic member 481. The support metallic member 482 is fixed to the main board 460 with the single screw 490 inserted from the first face of the main board 460 (see FIG. 40) through the hole 463 in the main board 460 and the screw hole 482f of the support metallic member 482.

Conventionally, in order to fix a support metallic member that supports a connector, a metal sheet is prepared as another member and a main board is screwed with the metal sheet and the support metallic member that sandwich the main board, or the support metallic member is screwed to a component or member right next to the support metallic member.

In contrast, here, the support metallic member 482 is screwed to the main board 460 without another component or member. Here, the support metallic member 482 is fixed without increasing the number of components for fixing the support metallic member 482 or limiting the layout of the components or members Cooling Air-Passage Structure Now, the radiating module 470 in the main board 460 illustrated in FIG. 37 will be described.

Figure 45:
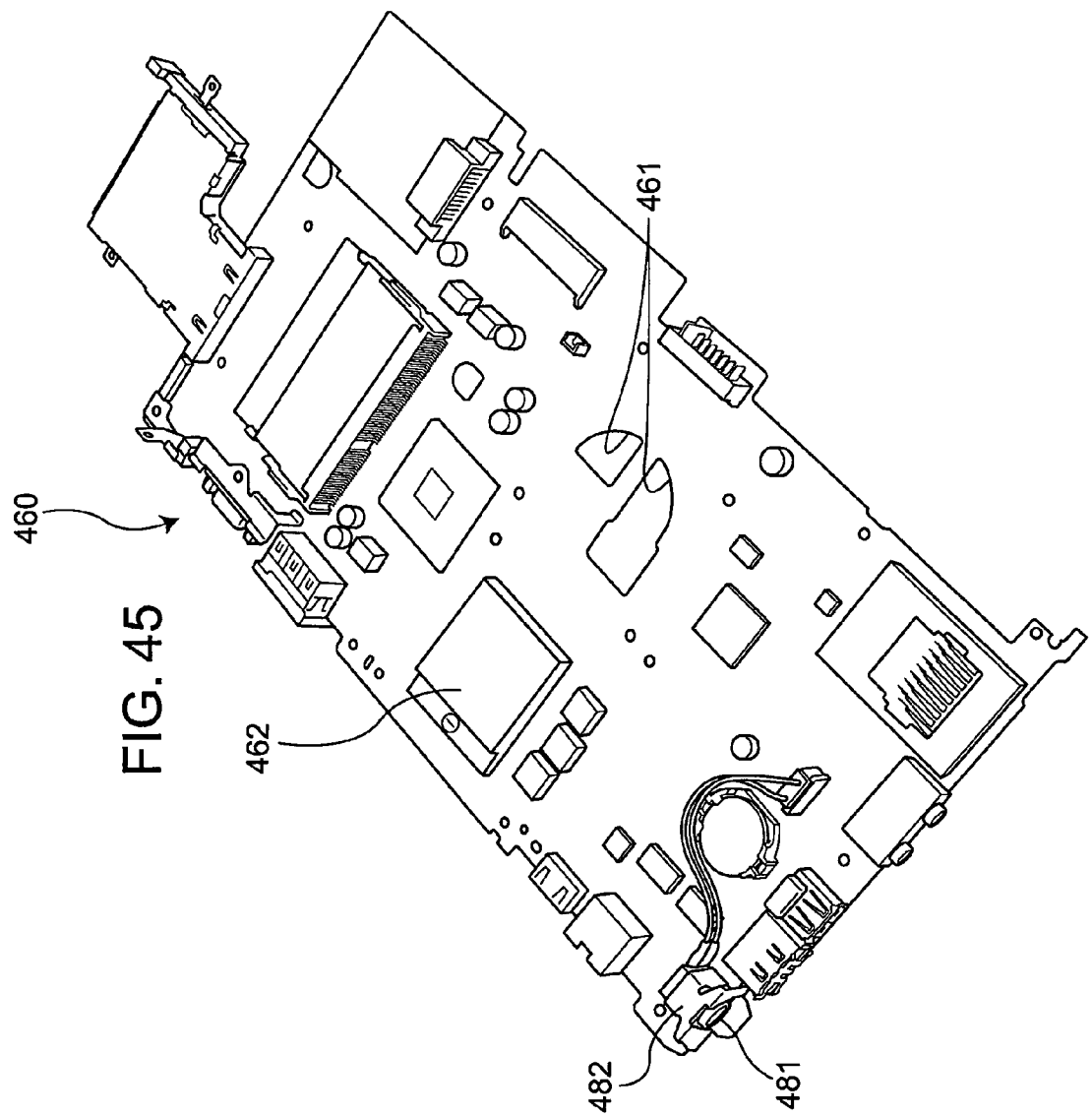
FIG. 45 is a perspective diagram that illustrates a first face of the main board in a state in which a radiating module is removed.

FIG. 45 is a perspective diagram that illustrates the first face depicted in FIG. 37, of the main board 460 in a state in which the radiating module is removed.

Figure 47:
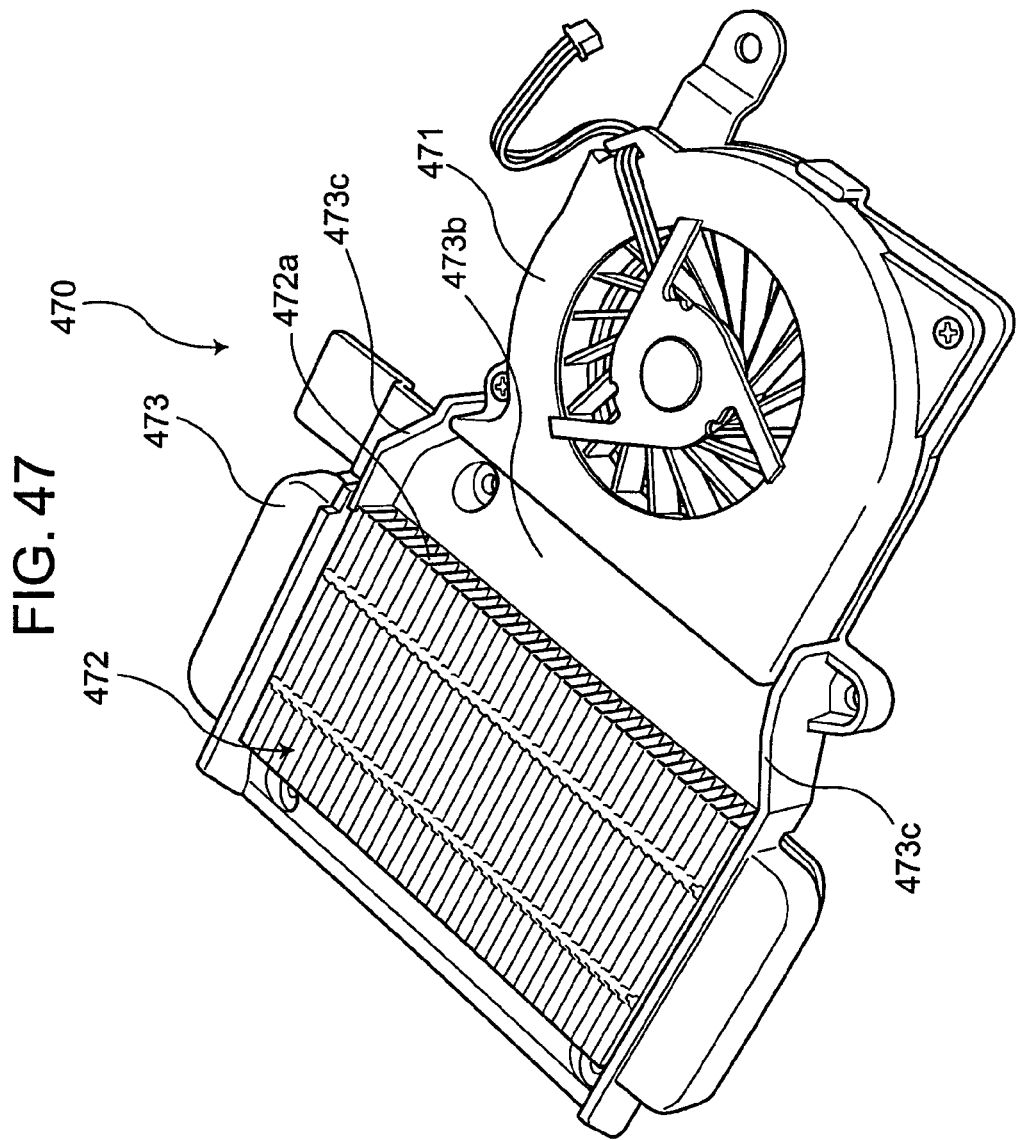
FIG. 47 is a perspective diagram of the radiating module.

FIG. 45 illustrates the CPU module 462 in which the apertures 461 are formed to take in the air on the second face (the face opposite to the first face illustrated in FIG. 37 and FIG. 45) of the main board 460 and send the air to the fan 471 (see FIG. 37 and FIG. 47). The radiating fins 472 are in intimate contact with the CPU module 462. The CPU module 462 produces heat while operating and it is preferable to cool the CPU module 462 by the radiating module 470 forcibly.

Figure 46:
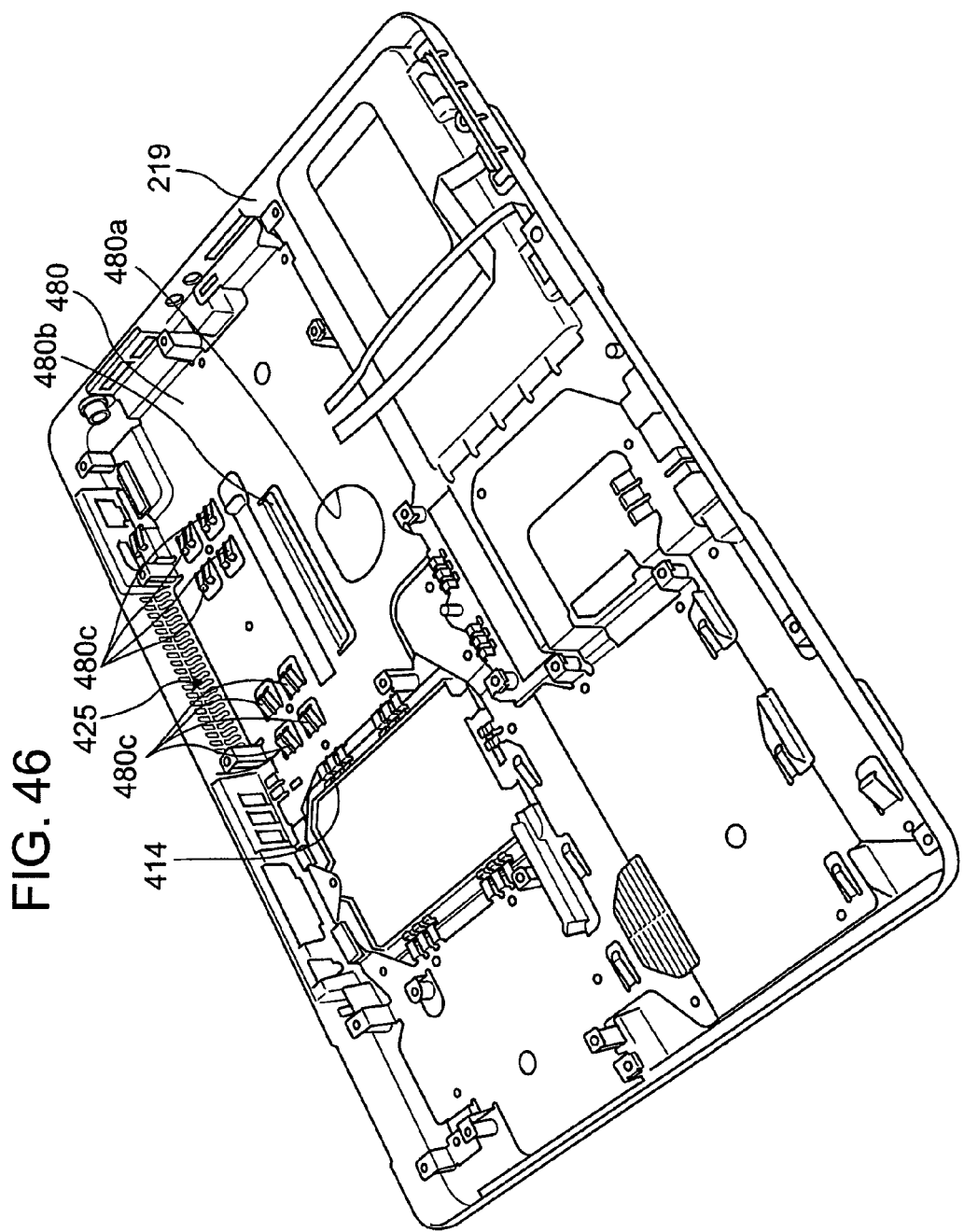
FIG. 46 is a perspective diagram that illustrates the inner side of the bottom cover in a state in which the main board is removed.

FIG. 46 is a perspective diagram that illustrates the inner side of the bottom cover 219 in a state in which the main board is removed.

The bottom cover 219 forms a part of the enclosure 21 (see FIG. 2) of the operational unit 20 and covers the bottom side of the operational unit 20. In the bottom cover 219, the air discharge openings 425 (see also FIG. 6) are formed to discharge the air blown out from the fan 471 (see FIG. 37 and FIG. 47) and passing the radiating fins 472. Further, the HDD unit housing opening 414 in which the HDD unit 430 is to be arranged is formed in the bottom cover 219 (see also FIG. 10). Furthermore, in the inner side of the bottom cover 219, there is a shield board 480 spreading to protect electronic components on the main board 460 from electromagnetic noise and to prevent electromagnetic noise produced by the electronic components on the main board 460 from leaking to the outside.

In the shield board 480, an aperture 480a is formed at a position facing the fan 471 (see FIGS. 37 and 47), and the bottom cover 219 is exposed. The aperture 480a is provided to form space in front of an air intake of the fan 471 so that the air is taken in by the fan 471 as much as possible.

At a position adjacent to the aperture 480a of the shield board 480, there is formed a cut-out-and-raised piece 480b that is formed by cutting out and raising a part of the shield board 480. Furthermore, at a position closer to the air discharge openings 425 than to the cut-out-and-raised piece 480b, plural cut-out-and-raised pieces 480c are formed. These cut-out-and-raised pieces 480c are provided to contact and ground the radiating fins 472 and the substrate 473 (see FIG. 47) of the radiating module 470.

Here, the main board 460 illustrated in FIG. 45 is so disposed, in a state of being mounted with the radiating module 470 (i.e. the state illustrated in FIG. 37), as to have space against the shield board 480 and have the first face illustrated in FIG. 45 directed to the shield board 480.

FIG. 47 is a perspective diagram of the radiating module 470. FIG. 47 illustrates a face facing the shield board 480 depicted in FIG. 46.

Figure 48:
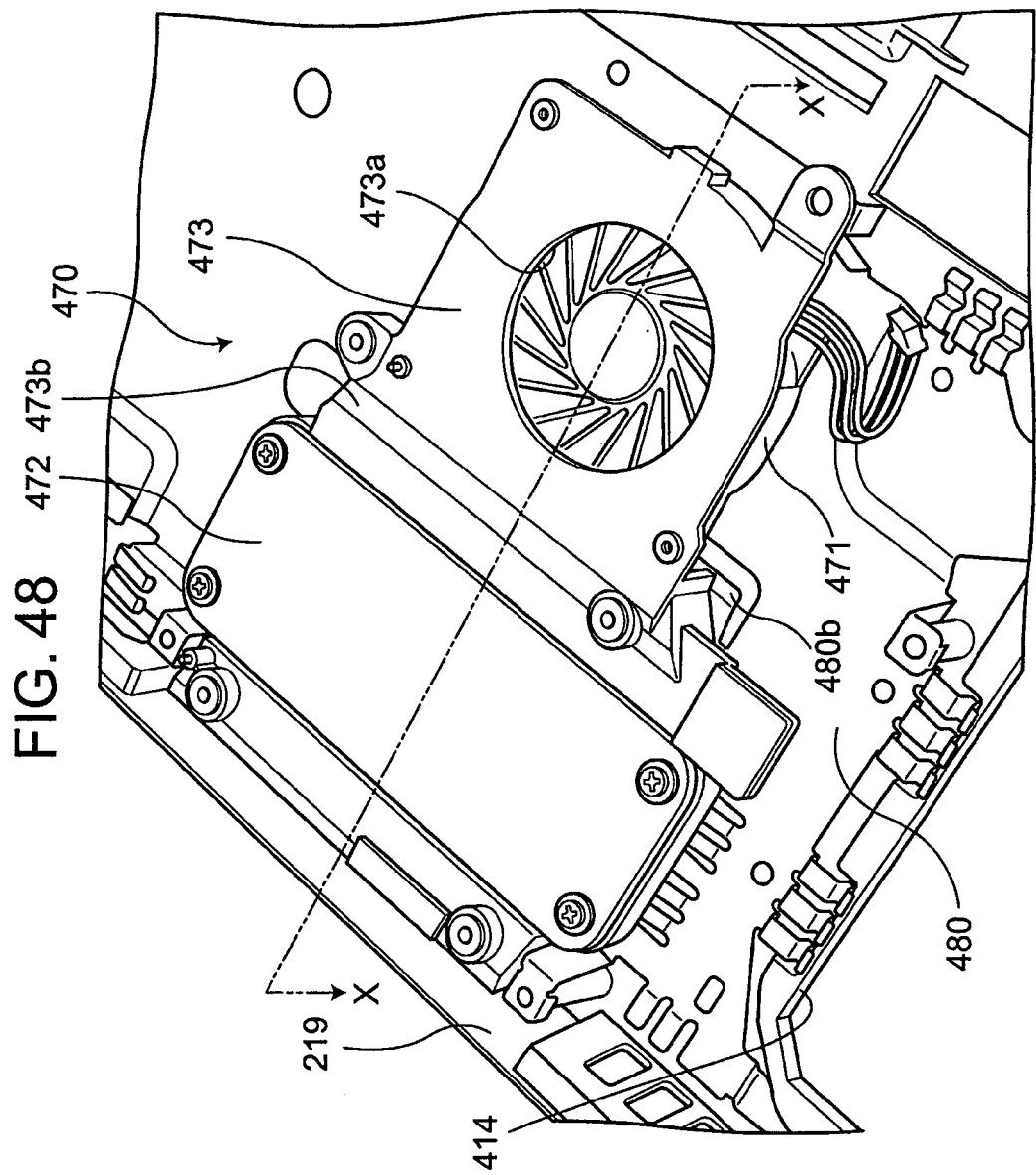
FIG. 48 is a perspective diagram that illustrates a state in which the radiating module being removed from the main board is disposed at a predetermined position within the bottom cover.

FIG. 48 is a perspective diagram that illustrates a state in which the radiating module 470 being removed from the main board is disposed at a predetermined position within the bottom cover 219.

The radiating module 470 includes the fan 471, the radiating fins 472, and the substrate 473 that supports these fan 471 and radiating fins 472. The substrate 473 is a die-cast metal member that is thick and heavy. As illustrated in FIG. 48, an aperture 473a to make the air flow into the fan 471 is formed in a part supporting the fan 471 of the substrate 473. The air is sucked into the fan 471 from the second face (opposite to the first face illustrated in FIG. 45) side of the main board after passing through the aperture 473a formed in the substrate 473 and the apertures 461 (see FIG. 45) formed in the main board 460. The fan 471 is supported at a position with space against the shield board 480 (see FIG. 46), and the air is also sucked into the fan 471 from the shield board 480 side.

The fan 471 takes in the air from its upper and lower air intakes in this way and blows out the air toward the radiating fins 472. The radiating fins 472 are pressed against the substrate 473 by a spring (not illustrated) in a direction toward the CPU module 462 (going away from the shield board 480) so that the radiating fins 472 are brought into intimate contact with the CPU module 462 mounted on the first face of the main board 460. The radiating fins 472 intimately contact the CPU module 462 with this pressing by the spring and absorb heat from the CPU module 462 during operation of the CPU module 462. These radiating fins 472 are in intimate contact and pressed against the CPU module 462 so that the radiating fins 472 is displaced to a position where air inlets 472a of the radiating fins 472 take in the air from the fan 471. The radiating fins 472 displaced to that position and the substrate 473 are touched by the cut-out-and-raised pieces 480c so that the radiating fins 472 and the substrate 47 are grounded.

Here, it is desirable that the fan 471 take in the air from both the top and bottom faces within the operational unit 20, and it is preferable that the radiating fins 472 be in intimate contact with the CPU module 462 on the main board 460. Meanwhile, the operational unit 20 is made as thin as possible. When the fan 471 and the radiating fins 472 are disposed at positions that meet these desirable conditions, the radiating fins 472 are arranged at positions further shifted toward the underside (toward where the shield board 480 is provided) than the fan 471 in a thickness direction of the operational unit 20. Therefore, in the substrate 473 of the radiating module 470, a slope 473b is formed between the fan 471 and the radiating fins 472. The slope 473b is provided to let the air from the fan 471 flow smoothly into the air inlets 472a of the radiating fins 472. Further, on the substrate 473, a pair of walls 473c are provided at opposite sides of the part where the slope 473b is formed between the fan 471 and the radiating fins 472 so as to prevent sideway leakage of the air from the fan 471. After being mounted on the main board 460, the radiating module 470 is disposed, as illustrated in FIG. 48, at a position where the air sent from the fan 471 and passing the radiating fins 472 is discharged from the air discharge openings 425 (see FIG. 6 and FIG. 46) to the outside.

Figure 49:
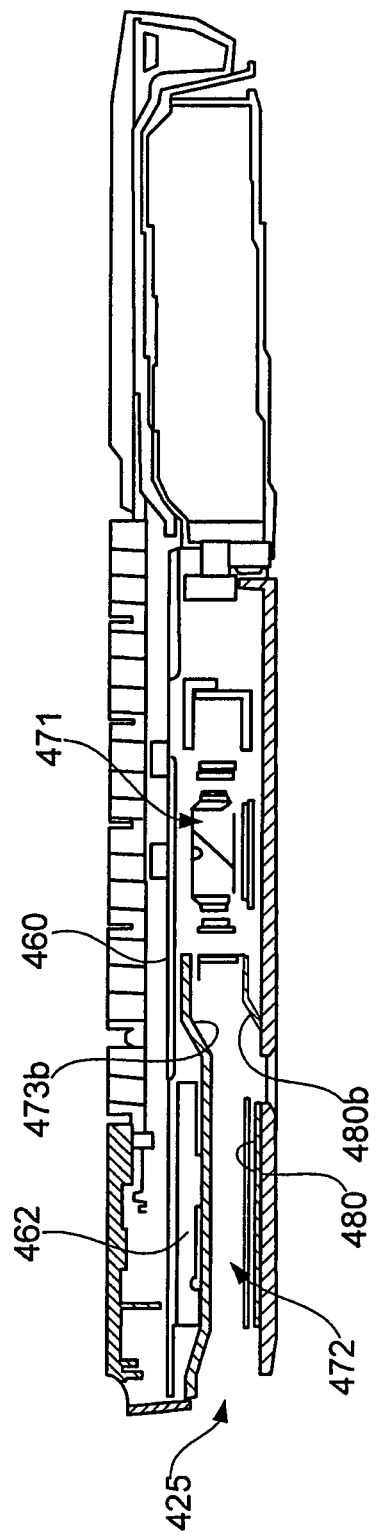
FIG. 49 is a sectional view taken along a line X-X illustrated in FIG. 48.

FIG. 49 is a sectional view taken along a line X-X in FIG. 48.

As described above, in the substrate 473 of the radiating module 470, the slope 473b and the pair of walls 473c are formed on an airflow passage between the fan 471 and the radiating fins 472 (see FIG. 47). In this state however, the air from the fan 471 leaks out to the shield board 480, thereby impairing efficiency. Therefore, here, the cut-out-and-raised piece 480b (see FIG. 46 and FIG. 48) is formed in the shield board 480. The cut-out-and-raised piece 480b is so shaped as to block the airflow passage between the fan 471 and the radiating fins 472 and guide the air flowing along the slope 473b diagonally. In other words, the slope 473b of the substrate 473, the pair of walls 473c and the cut-out-and-raised piece 480b of the shield board 480 form a duct structure between the fan 471 and the radiating fins 472 to guide the air. In this way, by forming only the cut-out-and-raised piece 480b in the shield board 480, the duct structure is formed without adding another member, improving radiation efficiency.

Hook Structure in Display Section

Here, there will be described a hook structure, illustrated in FIG. 2 as an example, including elements such as: the hook 33 on the upper part of the front face of the display unit 30; and the locking release button 34 that protrudes from the top face (front-end face in the closed state) 301 in the open state of the display unit 30. The hook 33 is a locking projection that goes into the locking hole 29 formed in the top face of the operational unit 20 thereby making the display unit 30 enter the closed state when the display unit 30 is closed on the operational unit 20. Further, the locking release button 34 is a button that shifts the hook 33 to the unlocked position by being pressed, thereby releasing the locking in the locking hole 29.

Figure 50:
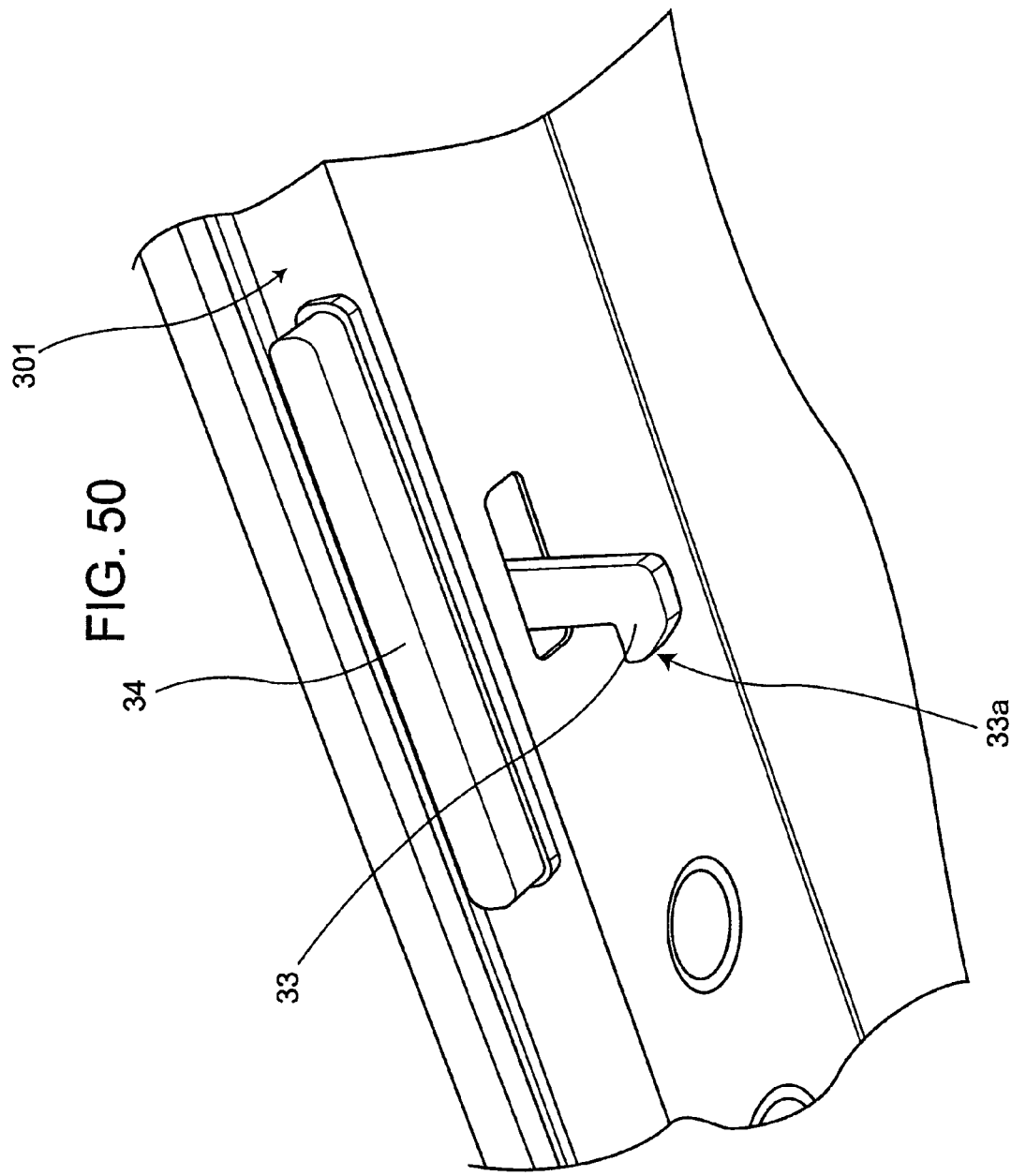
FIG. 50 is a diagram that illustrates a state in which a locking release button projects from the top face (front-end face) of the display unit.
Figure 51:
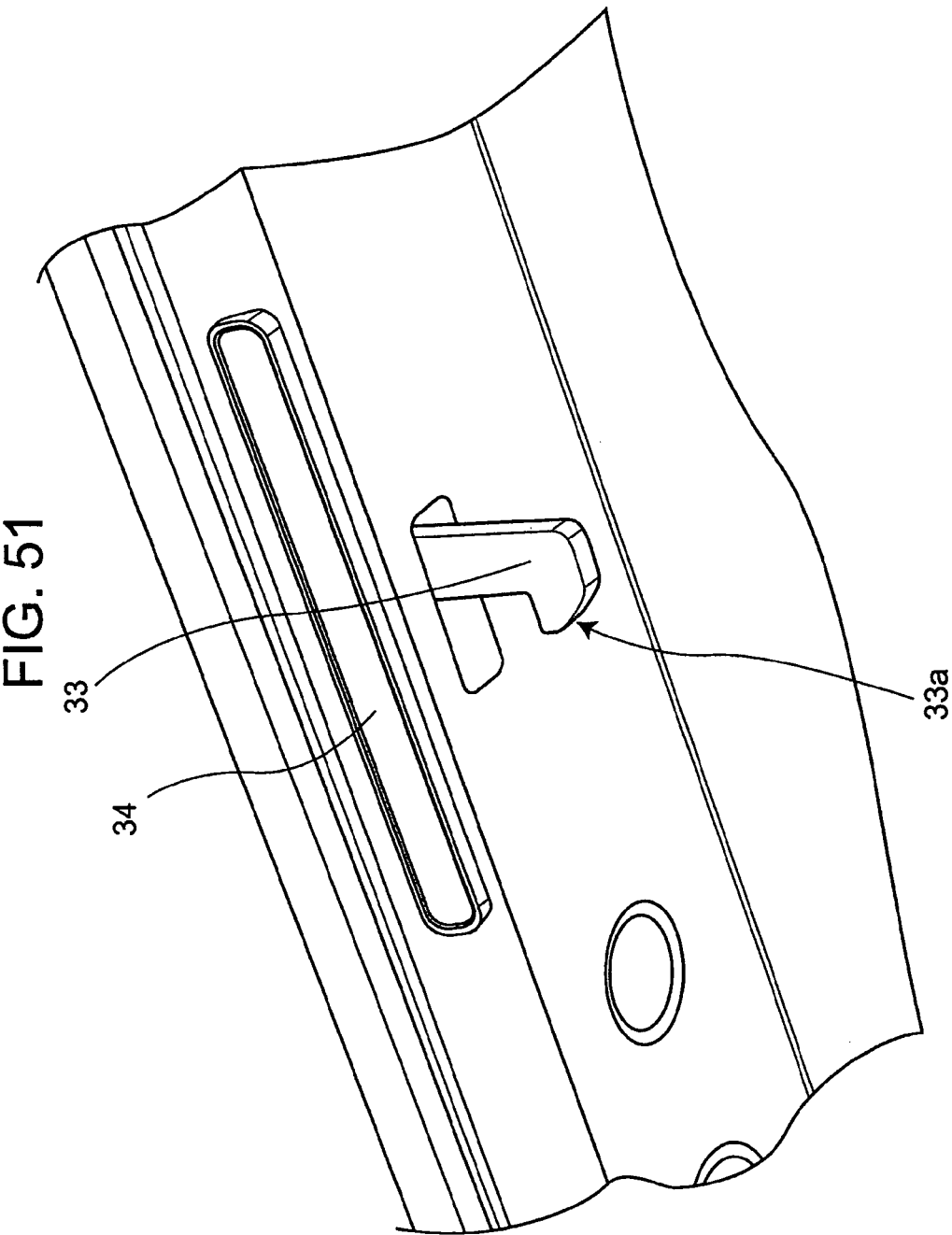
FIG. 51 is a diagram that illustrates a state in which the locking release button is depressed.

FIG. 50 and FIG. 51 are enlarged perspective diagrams of the hook 33 and the locking release button 34 provided in the display unit 30 (see FIG. 2). FIG. 50 illustrates a state in which the locking release button 34 projects from the top face (front-end face) 301 of the display unit 30, and FIG. 51 illustrates a state in which the locking release button 34 is depressed.

When the display unit 30 is closed on the operational unit 20 in the state in which the locking release button 34 illustrated in FIG. 50 remains projecting from the top face (front-end face) 301, the hook 33 enters the locking hole 29 of the operational unit 20. When entering the hole 29, the hook 33 is pushed sideway once by way of a slope 33a, and then returns to the position illustrated in FIG. 50 and locked in the locking hole 29.

When the locking release button 34 is pressed as illustrated in FIG. 51, the hook 33 moves sideway, releasing the engagement in the locking hole 29 when the display unit 30 is the closed state, so that the display unit 30 is brought to a state in which the display unit 30 is allowed to be lifted.

Figure 52:
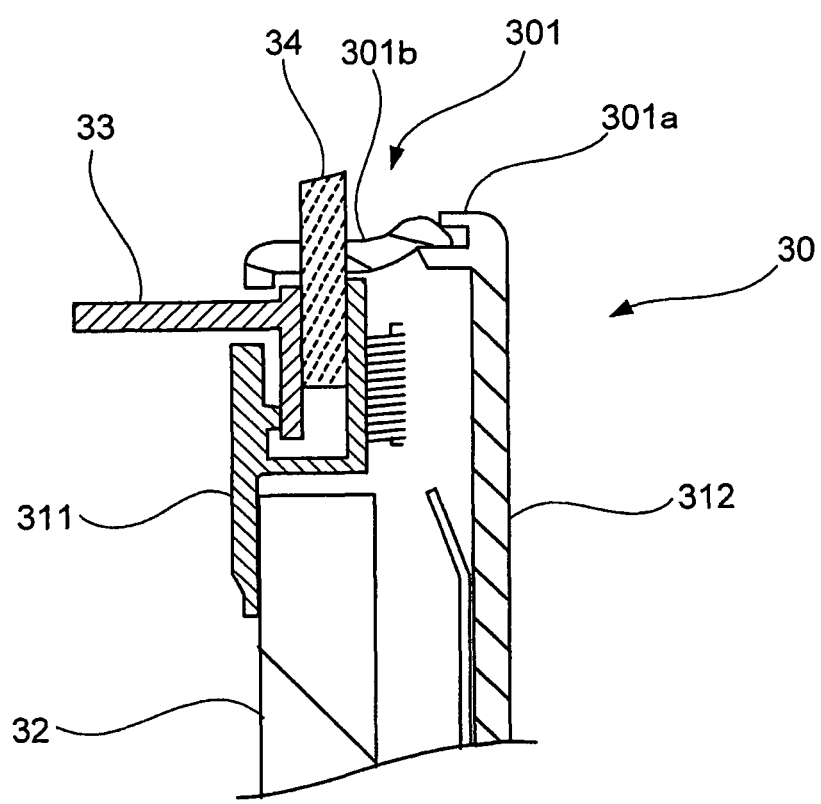
FIG. 52 is a sectional view of a hook and the locking release button of the display unit.

FIG. 52 is a sectional view of the hook 33 and the locking release button 34 of the display unit 30.

In the top face 301 of the display unit 30 in the open state, there is formed a first face 301a that is horizontally extends from the rear to the front of the display unit 30 up to a midpoint. Following the first face 301a, a descending slope is formed as a second face 301b. Incidentally, the first face 301a may be formed as an ascending slope extending from the rear to the front. Here, the second face 301b is a curved face where a part closer to the first face 301a (rear side) is formed to be steeper.

The enclosure 31 of the display unit 30 includes: the front cover 311 (see also FIG. 2) that covers the edge of the display screen 32 on the front of the display unit 30; and the rear cover 312 (see also FIG. 1) that covers the rear of the display unit 30. The second face 301b of the top face 301 in the open state is formed on the front cover 311. The locking release button 34 protrudes from the front cover 311. Therefore, when shifting the display unit 30 in the closed state to the open state, a user pushes the locking release button 34 and then, while pushing the locking release button 34, the user holds the second face 301b with a finger thereby lifting the front-end face (top face in the open state) 301 of the display unit 30, which is excellent in operability. The second face (slope) 301b may be formed only around the locking release button 34. However, when the second face 301b is provided on the entire left and right of the front-end face (top face in the open state) 301, the display unit 30 looks thin thanks to the slope (second face) 301b, which is advantageous also in terms of design.

Figure 53:
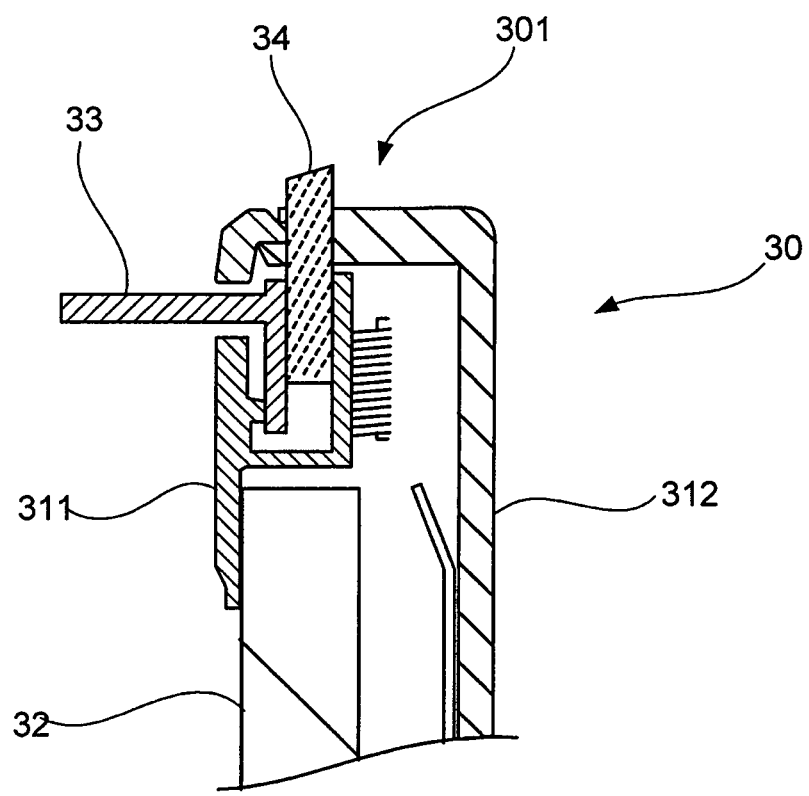
FIG. 53 is a diagram that corresponds to FIG. 52 and illustrates a comparative example.

FIG. 53 is a diagram that corresponds to FIG. 52 and illustrates a comparative example.

In the comparative example illustrated in FIG. 53, the locking release button 34 protrudes from the rear cover 312 side of the top face (front-end face) 301. In this case, the second face (slope) 301b illustrated in FIG. 52 is not formed or formed only in a small area in a thickness direction. Therefore, there is no part to be held with a finger even if the locking release button 34 is pressed, making it difficult to lift the display unit 30 when shifting the display unit 30 to the open state, which is poor in operability. Also, it is difficult to make the display unit 30 look thin, which is disadvantageous also in terms of design.

Figure 54:
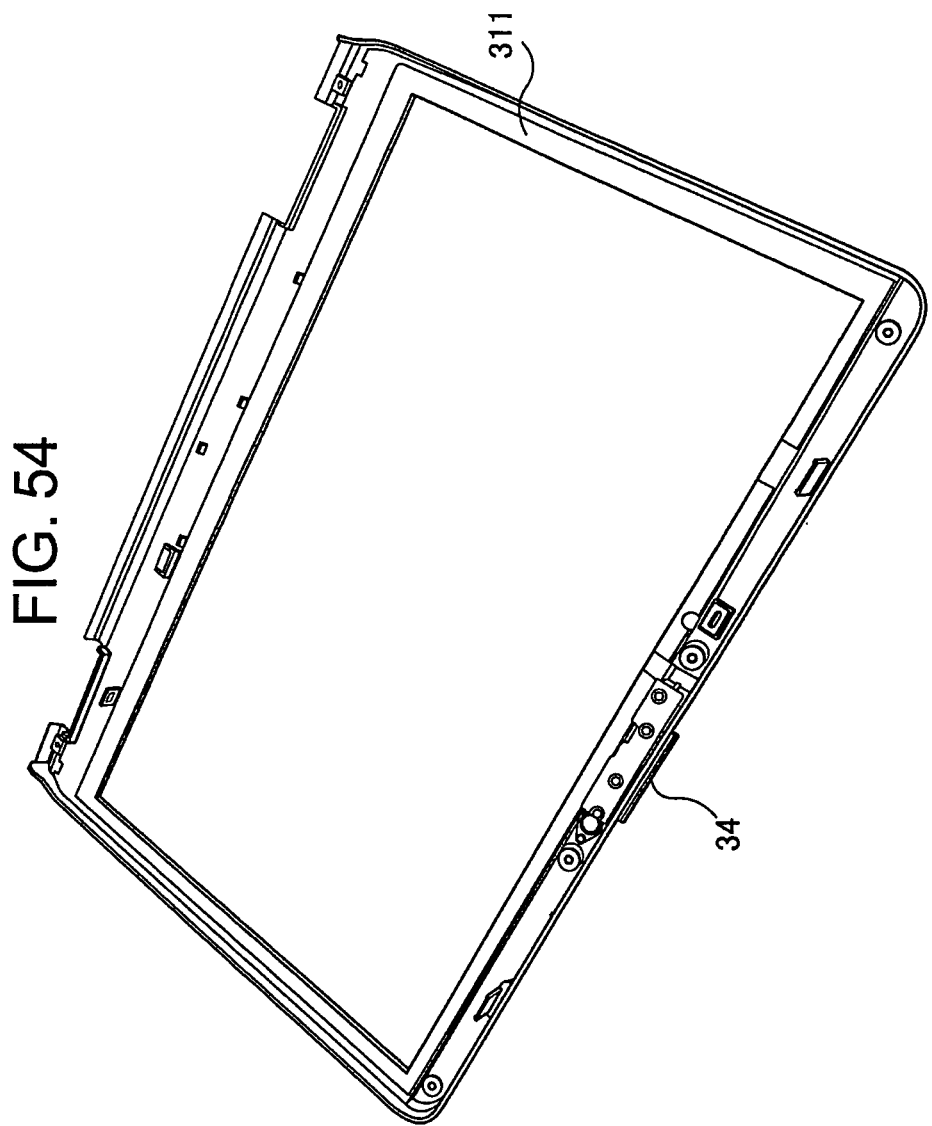
FIG. 54 is a perspective diagram that illustrates the inner face of the front cover of the display unit.
Figure 55:
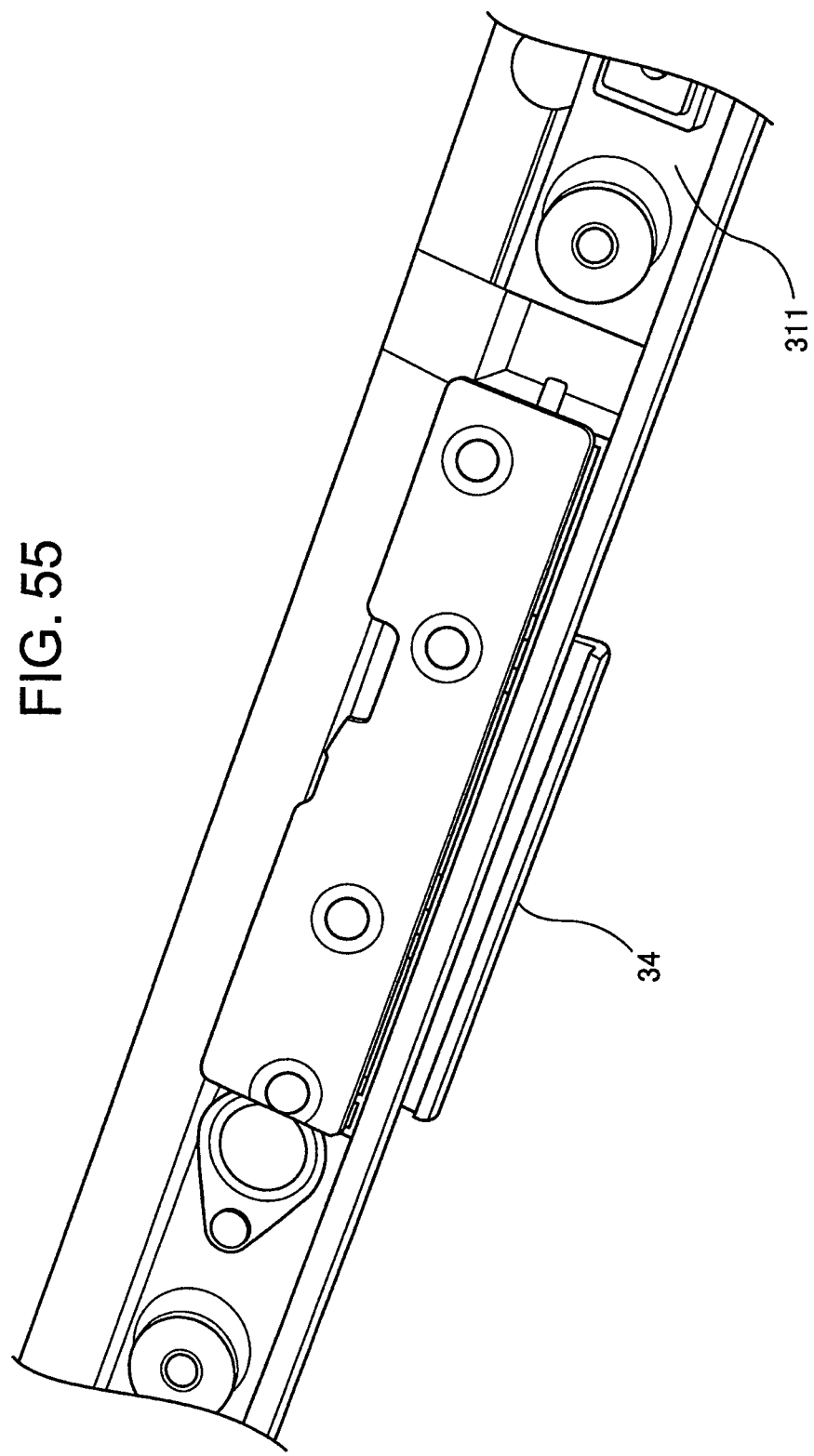
FIG. 55 is an enlarged perspective diagram of a hook structure including the hook and the like on the inner face of the front cover.

FIG. 54 is a perspective diagram that illustrates the inner face of the front cover 311 of the display unit. FIG. 55 is an enlarged perspective diagram of the hook structure including the hook and the like on the inner face of the front cover 311.

The hook structure including the hook 33, the locking release button 34 and the like is incorporated in the inside of the front cover 311 as illustrated.

Figure 56:
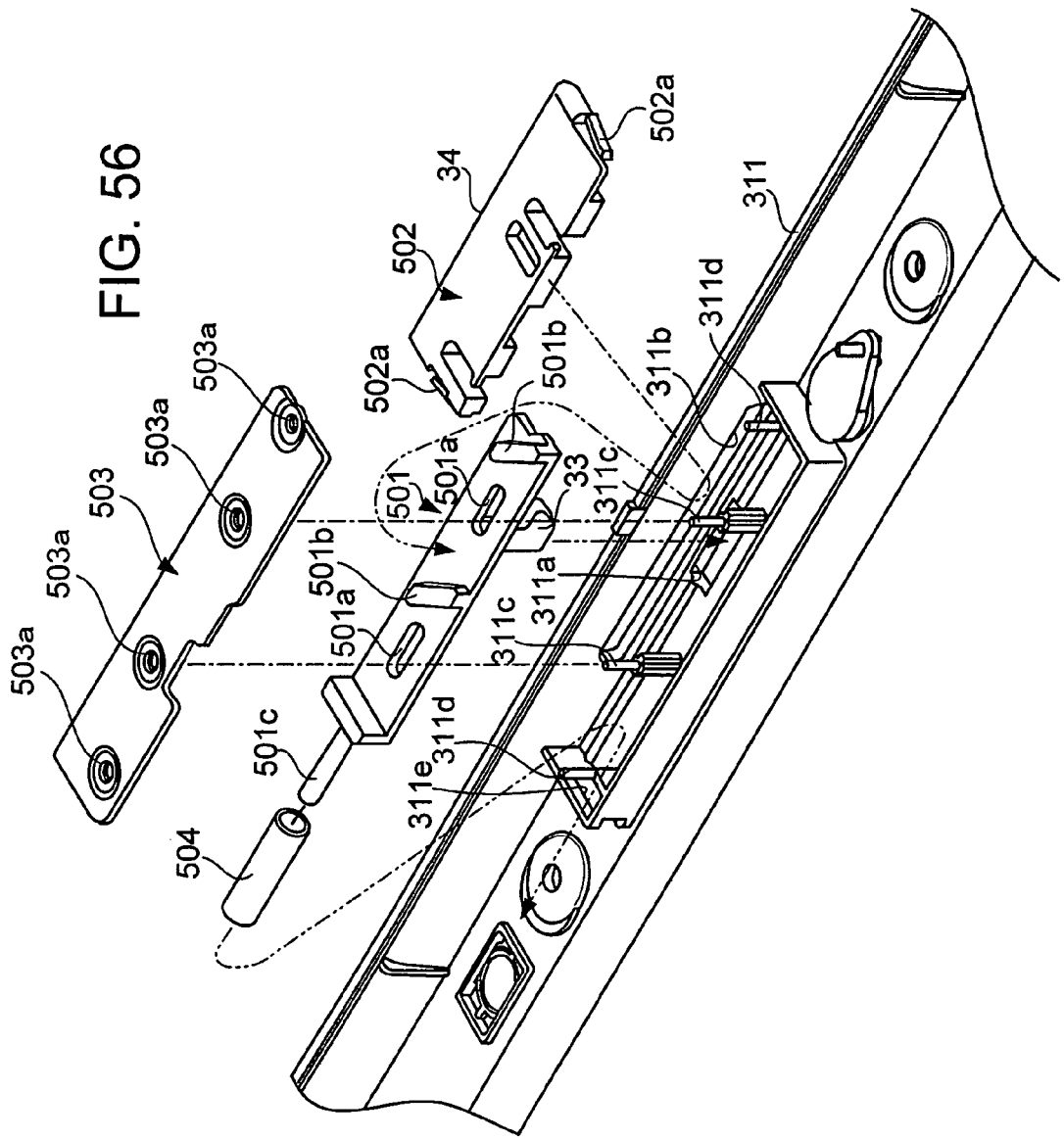
FIG. 56 is an exploded perspective diagram of the hook structure.

FIG. 56 is an exploded perspective diagram of the hook structure.

Here, there are illustrated: the front cover 311; a first hook member 501 to be incorporated in the front cover 311 and having the hook 33 formed thereon; a second hook member 502 in which the locking release button 34 is formed; a hook holder 503; and a coil spring 504.

The first hook member 501 is disposed in a state in which the hook 33 protrudes from an aperture 311a formed in the upper part of the front face of the front cover 311 in the open state and two pins 311c standing on the front cover 311 are inserted into two slots 501a of the first hook member 501. Further, at this time, the coil spring 504 is attached to an arm 501c extending from a side of the first hook member 501, the tip of the arm 501c protrudes from an aperture 311e of the front cover 311, and the coil spring 504 is in a state of being interposed between a circumferential wall of the aperture 311e and the first hook member 501. Furthermore, in the first hook member 501, two guiding projections 501b that extend diagonally are formed on a face on which the second hook member 502 is to be placed.

Figure 57:
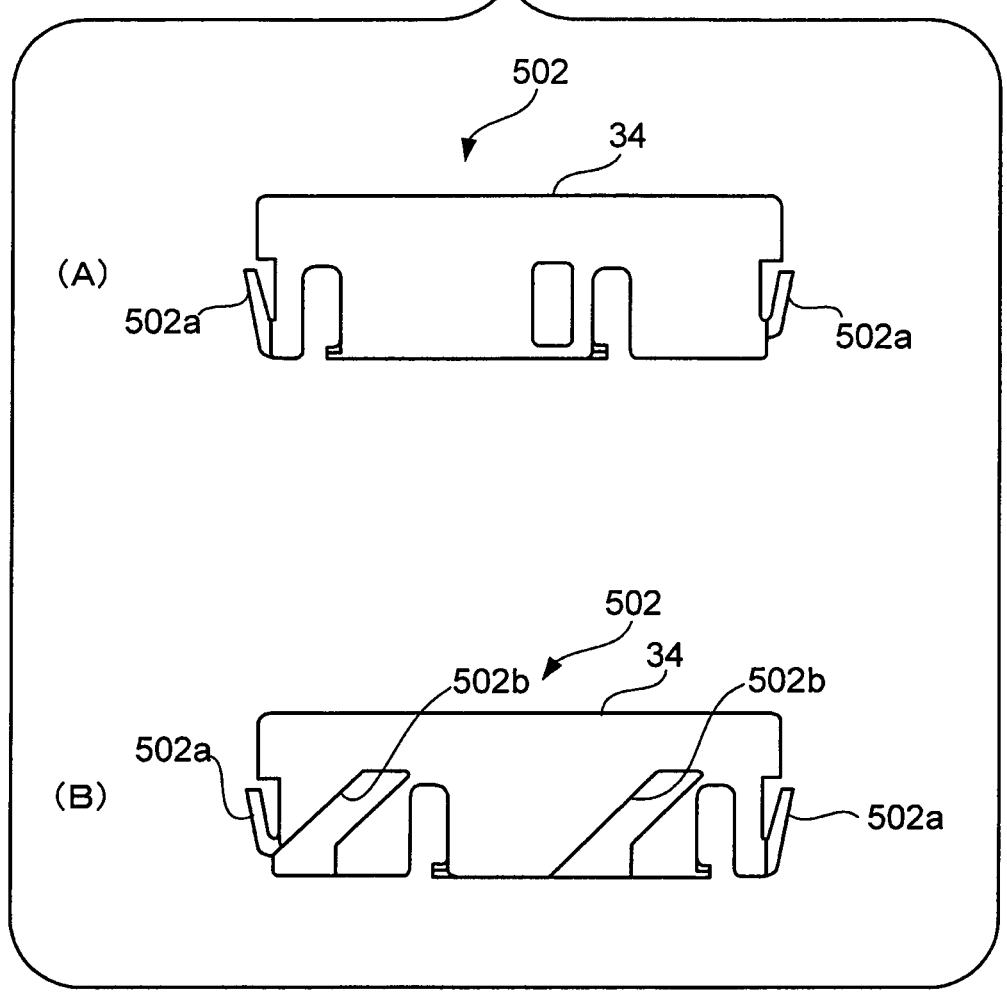
FIG. 57 illustrates plan views of a face (A) on a hook holder side and a face (B) on a first hook member side, of a second hook member.
Figure 58:
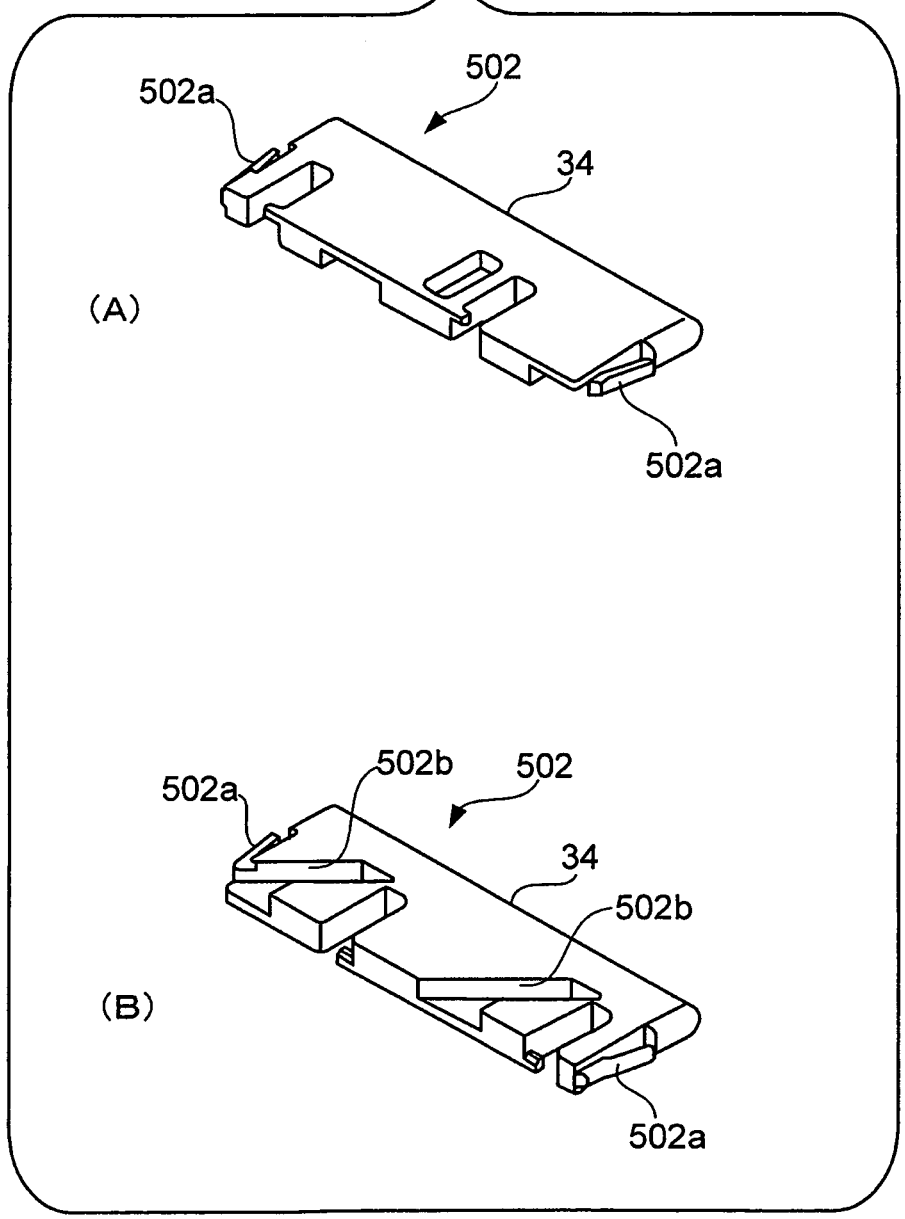
FIG. 58 illustrates perspective diagrams of the face (A) on the hook holder side and the face (B) on the first hook member side, of the second hook member 502.

FIG. 57 illustrates plan views of a face (A) on the hook holder side and a face (B) on the first hook member side, of the second hook member 502. FIG. 58 illustrates perspective diagrams of the face (A) on the hook holder side and the face (B) on the first hook member side, of the second hook member 502. On both sides of the second hook member 502, locking claws 502a are formed. On the top face of the front cover 311 in the open state, an aperture 311b from which the locking release button 34 protrudes is formed as illustrated in FIG. 56. The second hook member 502 including the locking release button 34 is externally inserted into the aperture 311b of the front cover 311. Then, the locking claws 502a on both sides of the second hook member 502 are bent inward once by being pushed by opposite edges of the aperture 311b. Subsequently, when the second hook member 502 is inserted up to a position where the locking claws 502a pass through the aperture 311b, the locking claws 502a return to the original separated positions so that the locking claws 502a are engaged in the inner face of the front cover 311, preventing removable of the second hook member 502. Here, assembly of the hook structure is made easy by providing a structure in which the second hook member 502 is externally inserted into the aperture 311b as described above. Further, in the face on the first hook member 501 side of the second hook member 502, two guiding slots 502b extending diagonally are formed. Into these guiding slots 502b extending diagonally, the guiding projections 501b extending diagonally of the first hook member 501 are inserted. Therefore, when the locking release button 34 is pressed, the second hook member 502 moves inward of the front cover 311 so that the guiding projections 501b extending diagonally of the first hook member 501 are pushed by the guiding slots 502b extending diagonally of the second hook member 502. Then, the first hook member 501 moves sideway against the pressing by the coil spring 504, shifting the hook 33 to the unlocked position (see FIG. 51). When a finger leaves the locking release button 34, the first hook member 501 is pushed and thereby returned to the original position due to the pressing force of the coil spring 504, and in response to this movement, the second hook member 502 moves in a direction that enables the locking release button 34 to protrude.

In the front cover 311, there are formed two pins 311d in addition to the two pins 311c that enter the two slots 501a of the first hook member 501 to guide the movement of the first hook member 501. These four pins 311c and 311d are inserted into and fixed by four holes 503a of the hook holder 503, respectively.

Here, with the locking structure described above, there is realized a structure in which the display unit 30 is locked on the operational unit 20 in the closed state and this locking is released at a press of the locking release button 34.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An electronic device comprising:
   a speaker;
   a board that includes a speaker placement section in which the speaker is disposed; and
   a double-faced adhesive tape that surrounds the speaker placement section of the board and adheres to an edge of a back surface of the speaker opposite to a sound emitting surface of the speaker and to the board so as to cause the board to support the speaker,
   wherein the double-faced adhesive tape intermittently overlaps the edge of the back surface of the speaker at a plurality of positions and adheres to the plurality of positions without contacting the edge of the back surface of the speaker at other than the plurality of positions, each pair of the plurality of positions being separated by a space.
2. The electronic device according to claim 1, wherein
   the speaker is a shape of a rectangle when viewed from a direction perpendicular to the sound emitting surface, and the double-faced adhesive tape has a shape of surrounding the speaker placement section along a track that overlaps the back surface of the speaker at four corners of the rectangle and deviates outward from the speaker at a center in each of four sides of the rectangle.

3. The electronic device according to claim 1, wherein the double-faced adhesive tape has a shape of seamlessly going around the speaker placement section.

4. The electronic device according to claim 1, wherein the board has an opening at the speaker placement section and the double-faced adhesive tape surrounds an edge of the opening.

5. The electronic device according to claim 1, wherein
the board has a pin standing on an edge of the speaker placement section and provided to position the speaker, and
the speaker has an opening into which the pin is inserted, and the speaker is supported by the board via the double-faced adhesive tape in a state in which the pin is inserted into the opening.

6. The electronic device according to claim 1, further comprising a hard disk drive unit which is loaded with a hard disk medium and records information on the hard disk medium.

7. The electronic device according to claim 1, wherein
the electronic device is an electronic device that includes an operational unit having a keyboard on a top surface thereof and a display unit having a display screen and being openably and closably supported on the operational unit, and
the speaker is mounted on the operational unit and emits sound from the top surface of the operational unit.

* * * * *